(12) United States Patent
Kothari et al.

(10) Patent No.: US 7,848,003 B2
(45) Date of Patent: Dec. 7, 2010

(54) SEMI-TRANSPARENT/TRANSFLECTIVE LIGHTED INTERFEROMETRIC DEVICES

(75) Inventors: Manish Kothari, Cupertino, CA (US); Gaurav Sethi, Dublin, CA (US); Jonathan Charles Griffiths, Fremont, CA (US); Kasra Khazeni, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 86 days.

(21) Appl. No.: 12/207,270

(22) Filed: Sep. 9, 2008

(65) Prior Publication Data

US 2009/0073540 A1  Mar. 19, 2009

Related U.S. Application Data

(60) Provisional application No. 60/994,073, filed on Sep. 17, 2007.

(51) Int. Cl.
*G02B 26/00* (2006.01)
*G02F 1/03* (2006.01)

(52) U.S. Cl. ...................................... 359/290; 359/247

(58) Field of Classification Search ................. 359/247, 359/290, 291, 295, 315
See application file for complete search history.

(56) References Cited

U.S. PATENT DOCUMENTS

| 3,990,784 A | 11/1976 | Gelber |
| 5,005,719 A | 4/1991 | Phillips et al. |
| 5,278,590 A | 1/1994 | Phillips et al. |
| 5,638,084 A | 6/1997 | Kalt |
| 5,835,255 A | 11/1998 | Miles |
| 5,986,796 A | 11/1999 | Miles |
| 6,055,090 A | 4/2000 | Miles |
| 6,195,196 B1 | 2/2001 | Kimura et al. |
| 6,794,119 B2 | 9/2004 | Miles |
| 6,841,081 B2 | 1/2005 | Chang et al. |
| 6,861,277 B1 | 3/2005 | Monroe et al. |
| 2002/0024711 A1 | 2/2002 | Miles |
| 2004/0027701 A1 | 2/2004 | Ishikawa |
| 2004/0076802 A1 | 4/2004 | Tompkin et al. |

(Continued)

FOREIGN PATENT DOCUMENTS

EP  1 640 317 A2  3/2006

(Continued)

OTHER PUBLICATIONS

International Search Report and Written Opinion for co-pending Application No. PCT/US2008/075736, mailed May 7, 2009 in 20 pages.
Invitation to Pay Additional Fees for Application No. PCT/US2008/75736, mailed Jan. 14, 2009 in 8 pages.

(Continued)

*Primary Examiner*—William C Choi
(74) *Attorney, Agent, or Firm*—Knobbe, Martens, Olson & Bear LLP

(57) ABSTRACT

In certain embodiments, a device is provided that utilizes both interferometrically reflected light and transmitted light. Light incident on the device is interferometrically reflected from a plurality of layers of the device to emit light in a first direction, the interferometrically reflected light having a first color. Light from a light source is transmitted through the plurality of layers of the device to emit from the device in the first direction, the transmitted light having a second color.

28 Claims, 47 Drawing Sheets

U.S. PATENT DOCUMENTS

| | | |
|---|---|---|
| 2004/0222418 A1 | 11/2004 | Mochizuki |
| 2004/0233503 A1 | 11/2004 | Kimura |
| 2005/0001797 A1 | 1/2005 | Miller, IV et al. |
| 2006/0066641 A1 | 3/2006 | Gally et al. |
| 2006/0066935 A1 | 3/2006 | Cummings et al. |
| 2007/0077525 A1 | 4/2007 | Davis et al. |

FOREIGN PATENT DOCUMENTS

| | | |
|---|---|---|
| EP | 1 640 762 | 3/2006 |
| EP | 1 640 776 | 3/2006 |
| EP | 1 640 776 A | 3/2006 |
| EP | 1 640 779 A2 | 3/2006 |
| EP | 1 640 780 | 3/2006 |
| EP | 1 640 780 A | 3/2006 |
| EP | 1 802 114 | 6/2007 |
| WO | WO 95/30924 | 11/1995 |
| WO | WO 02/25348 A | 3/2002 |
| WO | WO 2006/036386 A1 | 4/2006 |

OTHER PUBLICATIONS

European Search Report for Application No. 08153787.0-2217 mailed Jan. 29, 2009 in 3 pages.
R.S. Longhurts, "Geometrical and Physical Optics", Longmans, Chapter IX: Multiple Beam Interferometry, pp. 153-157, 1963.
S. Tolansky, "Multiple-Beam Interferometry of Surfaces and Films", Oxford at the Clarendon Press, Chapter II, Multiple-Beam Interference, pp. 8-11, 1948.
International Search Report and Written Opinion for International application No. PCT/US2008/080651, mailed on Jul. 4, 2009.
International Search Report and Written Opinion for International application No. PCT/US2009/035737, mailed on Jul. 17, 2009.
Magel, G.A. (1996) Integrated optic devices using micromachined metal membranes. SPIE 2686:54-63.
Miles, M.W. (1997) A new reflective FPD technology using interferometric modulation. Journal of the SID 5(4):379-382.
Miles, M.W. (2003) Interferometric Modulation: MOEMS as an Enabling Technology for High-Performance Reflective Displays. Proc. Of SPIE 4985:131-139.
International Preliminary Report on Patentability in application No. PCT/US2008075736, dated Jan. 4, 2010, in 13 pages.

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

SEMI-TRANSPARENT/TRANSFLECTIVE LIGHTED INTERFEROMETRIC DEVICES

CROSS-REFERENCE TO RELATED APPLICATIONS

The present application claims the benefit of priority from U.S. Provisional Application No. 60/994,073, filed Sep. 17, 2007, which is incorporated in its entirety by reference herein.

BACKGROUND

1. Field

The field of the disclosure relates generally to ornamental and image displaying devices utilizing interferometry.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In certain embodiments, a device is provided which includes a substrate that is at least partially optically transparent. The device of certain embodiments also includes a first layer over the substrate, wherein the first layer is partially optically absorptive, partially optically reflective, and partially optically transmissive, and a second layer over the substrate and spaced from the first layer, the first layer located between the substrate and the second layer, wherein the second layer is partially optically absorptive, partially optically reflective, and partially optically transmissive. The device of certain embodiments also includes a light source responsive to a signal and positioned relative to the substrate such that the first layer and the second layer are located between the substrate and the light source. Light emitted from the device in a first direction comprises a first portion of light incident on the substrate, transmitted through the substrate, transmitted through the first layer, reflected by the second layer, transmitted through the first layer, transmitted through the substrate, and emitted from the substrate in the first direction. The light emitted in the first direction can also include a second portion of light incident on the substrate, transmitted through the substrate, reflected by the first layer, transmitted through the substrate, and emitted from the substrate in the first direction. In certain embodiments, the light emitted in the first direction also includes a third portion of light from the light source incident on the second layer, transmitted through the second layer, transmitted through the first layer, transmitted through the substrate, and emitted from the substrate in the first direction.

In certain embodiments a device is provided comprising a first means for partially absorbing light, partially reflecting light, and partially transmitting light and a second means for partially absorbing light, partially reflecting light, and partially transmitting light, the second means spaced from the first means. The device of some embodiments also includes a means for generating light, wherein light emitted from the device in a first direction comprises a first portion of light incident on the first means, transmitted through the first means, reflected by the second means, transmitted through the first means, and emitted from the device in the first direction. The light emitted from the device in the first direction can also include a second portion of light incident on the first means, reflected by the first means, and emitted from the device in the first direction, and a third portion of light generated by the light generation means, incident on the second means, transmitted through the second means, transmitted through the first means, and emitted from the device in the first direction.

In certain embodiments, a method of displaying an image is provided. The method of certain embodiments includes providing a device comprising a substrate that is at least partially optically transparent. The device can also include a first layer over the substrate, wherein the first layer is partially optically absorptive, partially optically transmissive, and partially optically reflective, and a second layer over the substrate and spaced from the first layer, the first layer located between the substrate and the second layer, wherein the second layer is partially optically absorptive, partially optically transmissive, and partially optically reflective. In certain embodiments, the method includes positioning a light source responsive to a signal relative to the substrate such that the first layer and the second layer are located between the substrate and the light source, and emitting light from the device in a first direction. In certain embodiments, the emitted light comprises a first portion of light incident on the substrate, transmitted through the substrate, transmitted through the first layer, reflected by the second layer, transmitted through the first layer, transmitted through the substrate, and emitted from the device in the first direction. The emitted light can also include a second portion of light incident on the substrate, transmitted through the substrate, reflected by the first layer, transmitted through the substrate, and emitted from the device in the first direction. In certain embodiments, the emitted light includes a third portion of light from the light source incident on the second layer, transmitted through the second layer, transmitted through the first layer, transmitted through the substrate, and emitted from the device in the first direction.

DETAILED DESCRIPTION OF PREFERRED EMBODIMENTS

The following detailed description is directed to certain specific embodiments. However, the teachings herein can be embodied in a multitude of different ways. In this description, reference is made to the drawings wherein like parts are designated with like numerals throughout. Embodiments described herein may be used in decorative and architectural applications such as, for example, for decorative glass. Moreover, and as will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, decorative glass, packaging, and aesthetic structures (e.g., display of images on a piece of jewelry). MEMS devices of similar structure to those described herein can also be used in non-display applications such as in electronic switching devices.

In certain embodiments, a display device is provided that utilizes both interferometrically reflected light and transmitted light. Light incident on the display device is interferometrically reflected from a plurality of layers of the display device to emit light in a first direction, the interferometrically reflected light having a first color. Light from a light source is transmitted through the plurality of layers of the display device to emit from the display device in the first direction, the transmitted light having a second color.

Figure 1:
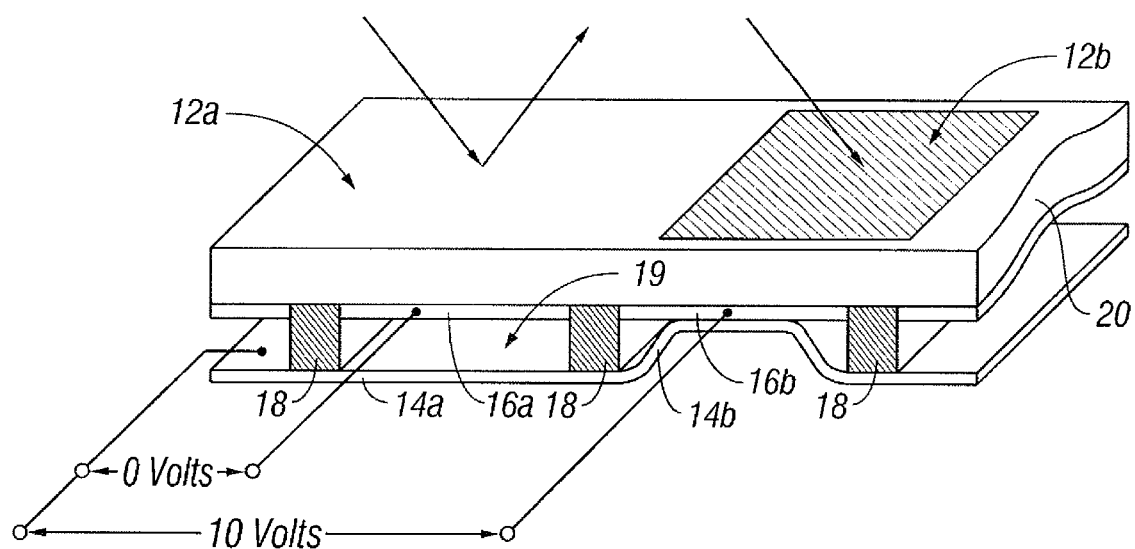
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light (e.g., visible light) that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14a, 14b, and these strips may form column electrodes in a display device. In other embodiments, layers 14a, 14b can be semi-transparent such that the device is capable of partially reflecting and partially transmitting visible light or other non visible wavelengths while retaining the interferometric properties described herein. In one embodiment, layers 14a, 14b can comprise transparent material which can provide mechanical stability. In certain embodiments, the layers 14a, 14b comprise another layer of a partially reflective material, such as Aluminum. In one embodiment, the transparent mechanical layer comprises a dielectric material, such as Silicon Oxynitride, Silicon Dioxide or Silicon Nitride. In certain embodiments, the transparent mechanical layer is approximately 1000 to 5000 Angstroms thick and the partially reflective layer comprises a highly conductive material, such as Aluminum, of approximately 30 to 300 Angstroms thickness. In other embodiments, the layers 14a, 14b are patterned into areas of varying transmission and reflectivity. In one embodiment, the variable transmission and reflectivity is achieved by varying the thickness of the reflective material. For example, increasing the thickness can create areas of increased reflectivity and decreased transmission.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
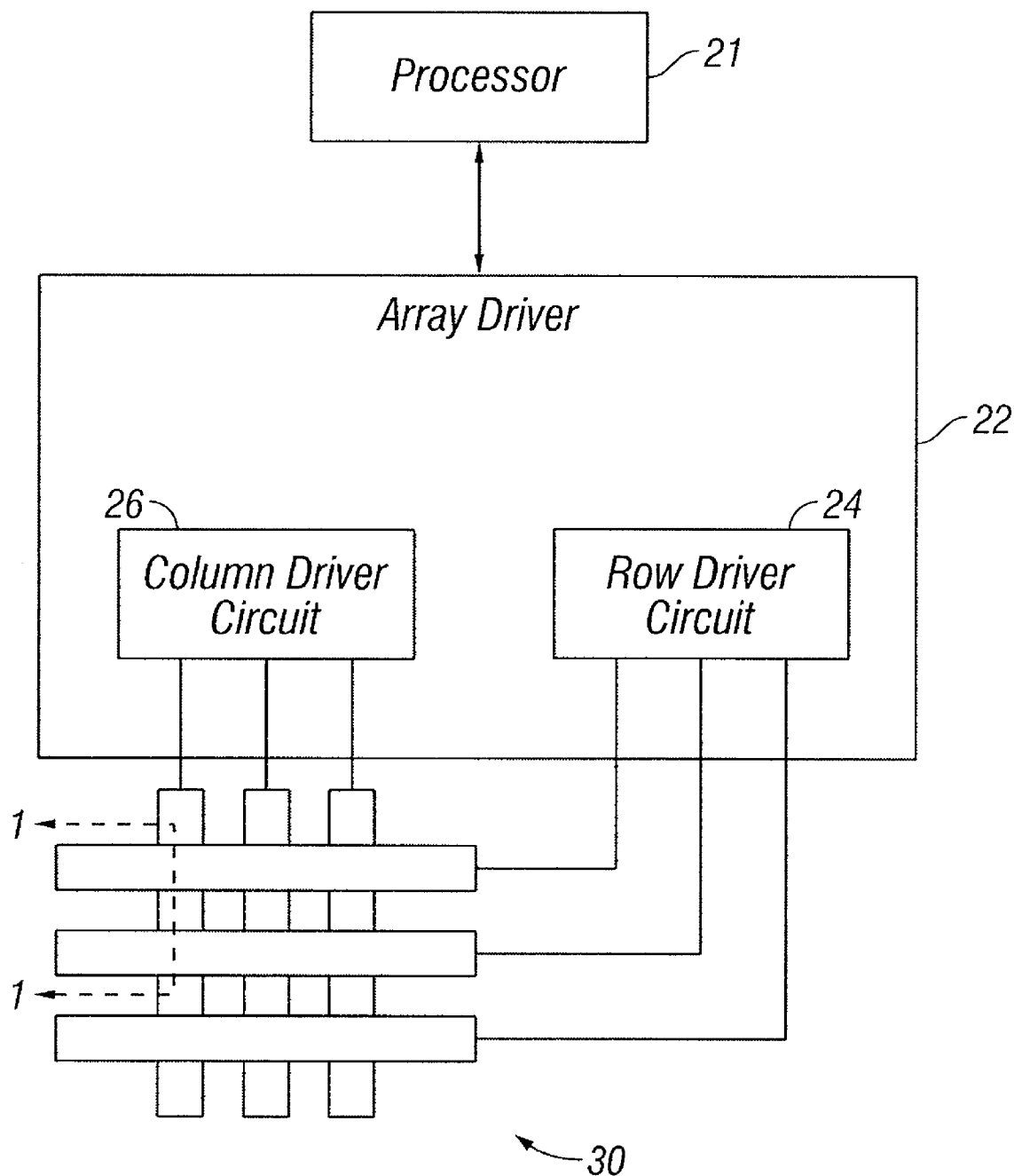
FIG. 2 is a system block diagram illustrating one embodiment of an electronic device incorporating a 3×3 interferometric modulator display.

FIG. 2 is a system block diagram illustrating one embodiment of an electronic device that may incorporate certain aspects described herein. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with certain embodiments described herein.

Figures 3, 4:
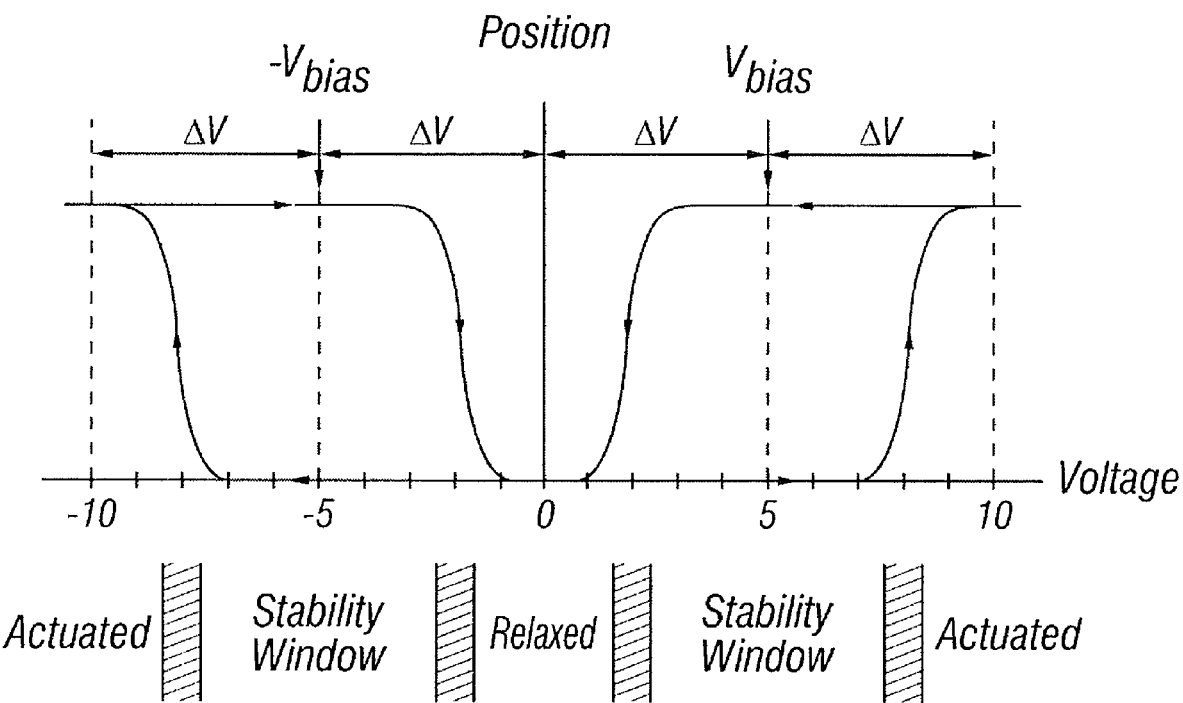
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
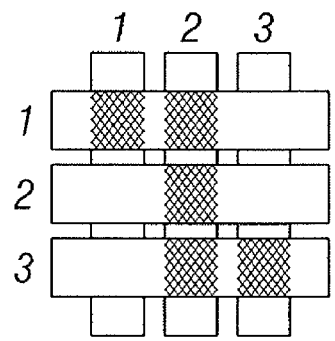
FIG. 5A illustrates one exemplary frame of display data in the 3×3 interferometric modulator display of FIG. 2.
Figure 5B:
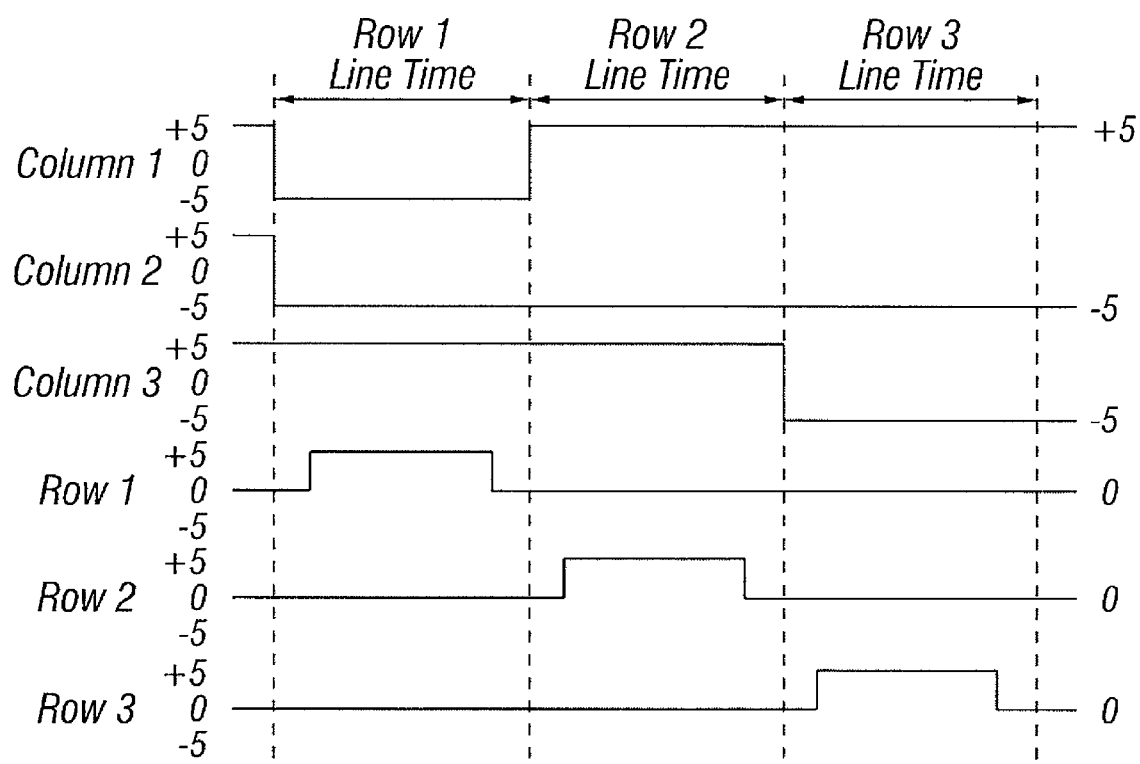
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
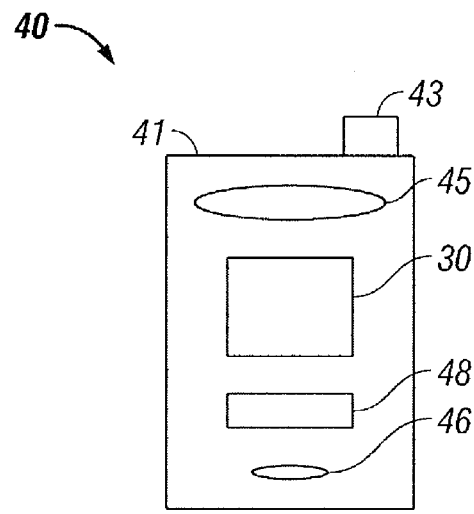
FIGS. 6A and 6B are system block diagrams illustrating an embodiment of a visual display device comprising a plurality of interferometric modulators.
Figure 6B:
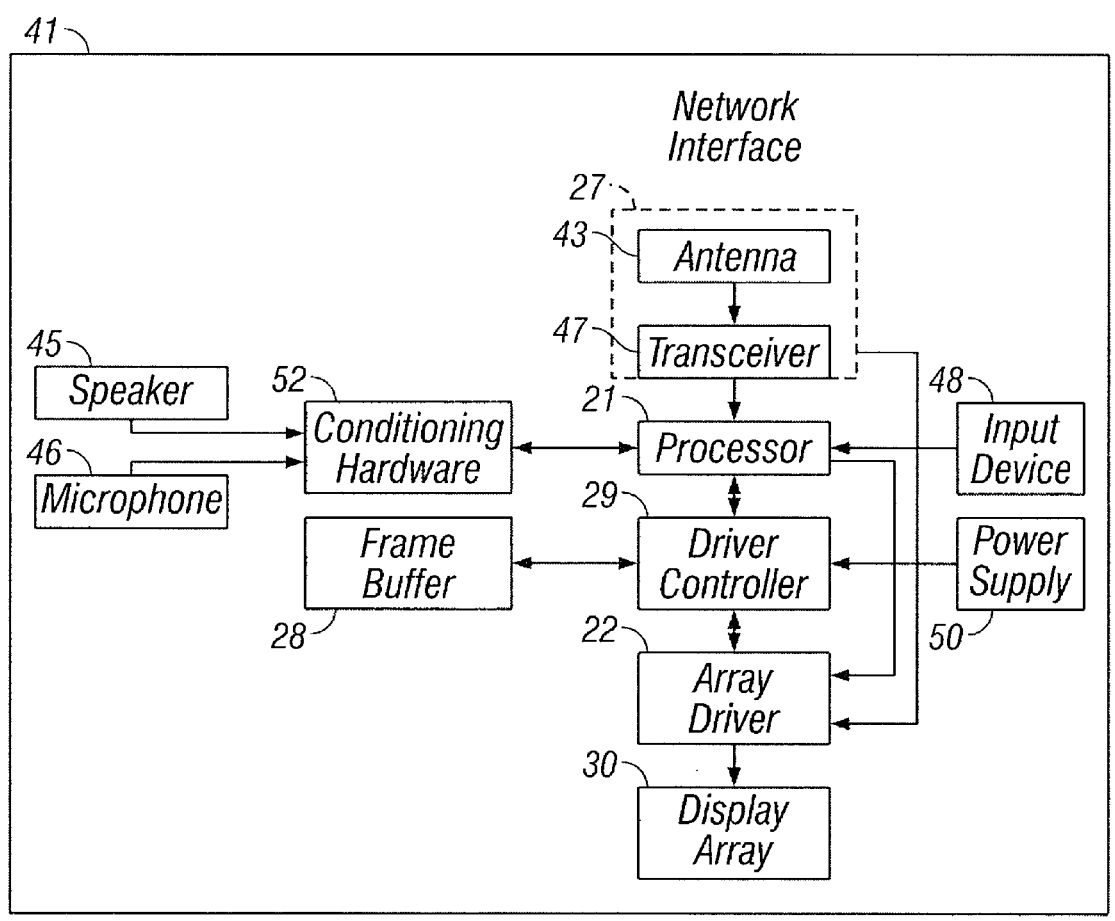

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
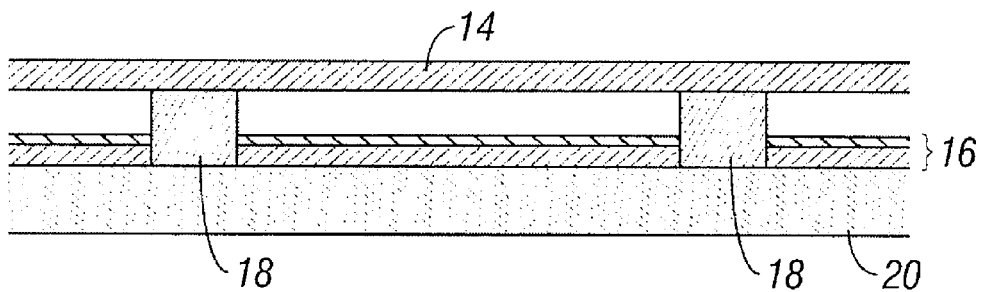
FIG. 7A is a cross section of the device of FIG. 1.
Figure 7B:
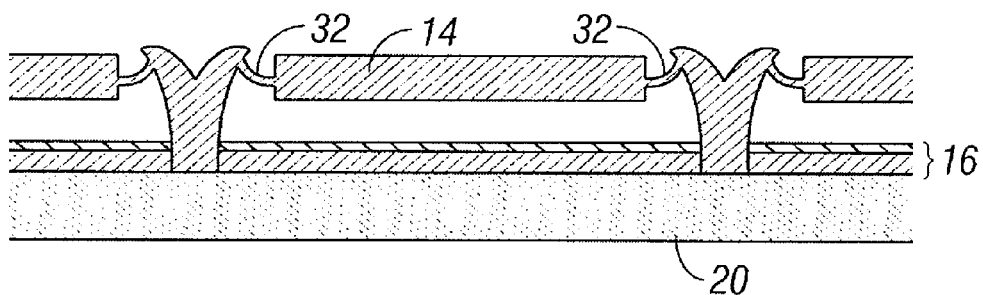
FIG. 7B is a cross section of an alternative embodiment of an interferometric modulator.
Figure 7C:
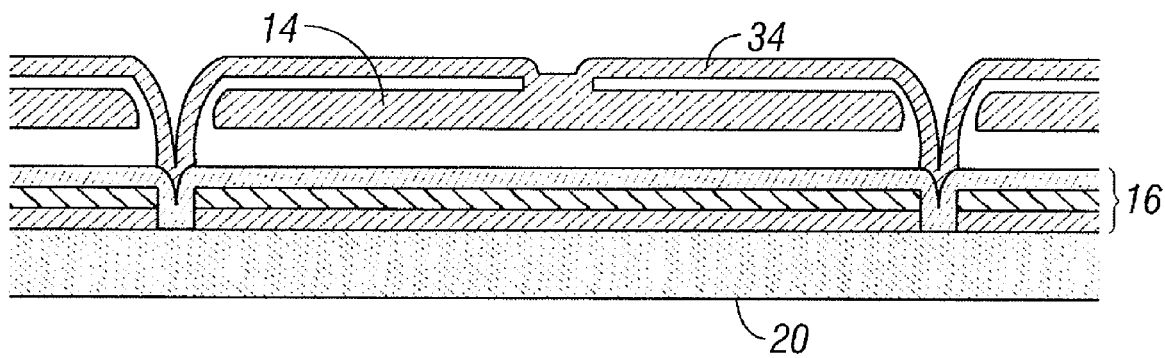
FIG. 7C is a cross section of another alternative embodiment of an interferometric modulator.
Figure 7D:
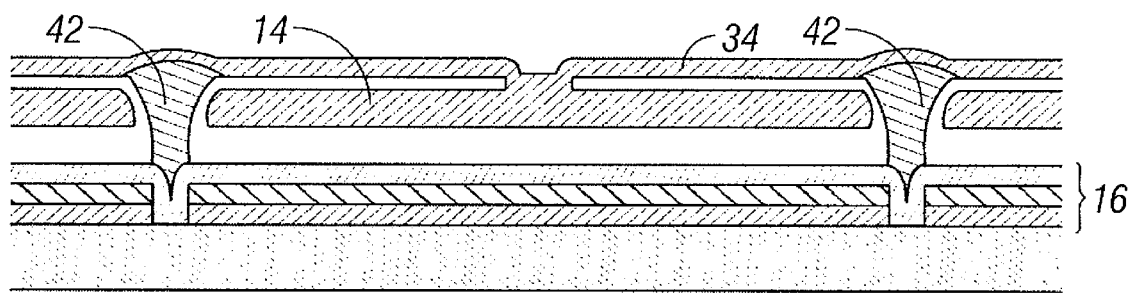
FIG. 7D is a cross section of yet another alternative embodiment of an interferometric modulator.
Figure 7E:
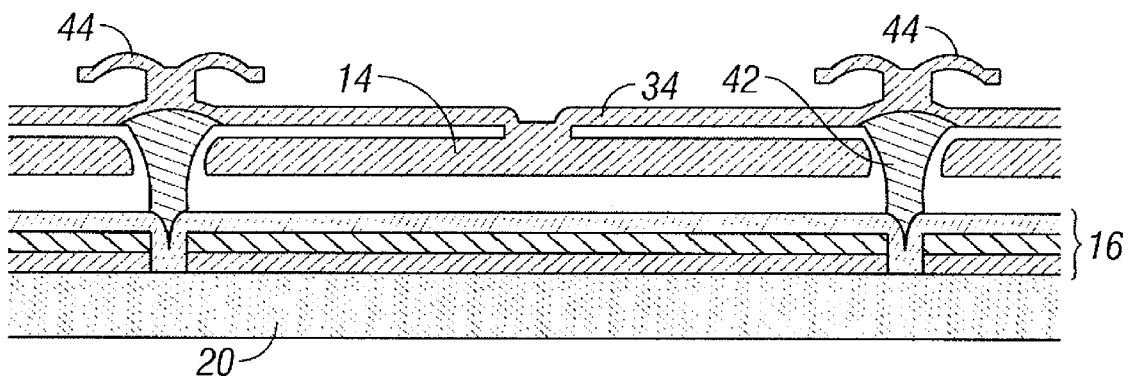
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deform able layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed, embodiments described herein may be used in ornamental and architectural devices and applications, such as for decorative glass. For example, in an architectural setting, a coated glass panel may provide an attractive decorative effect such that the glass appears to be one color from one side and a different color from the other side. Moreover, when a light source positioned on one side of the panel is turned on, the panel may appear to be another color. Certain other embodiments are used for display devices.

Figure 8:
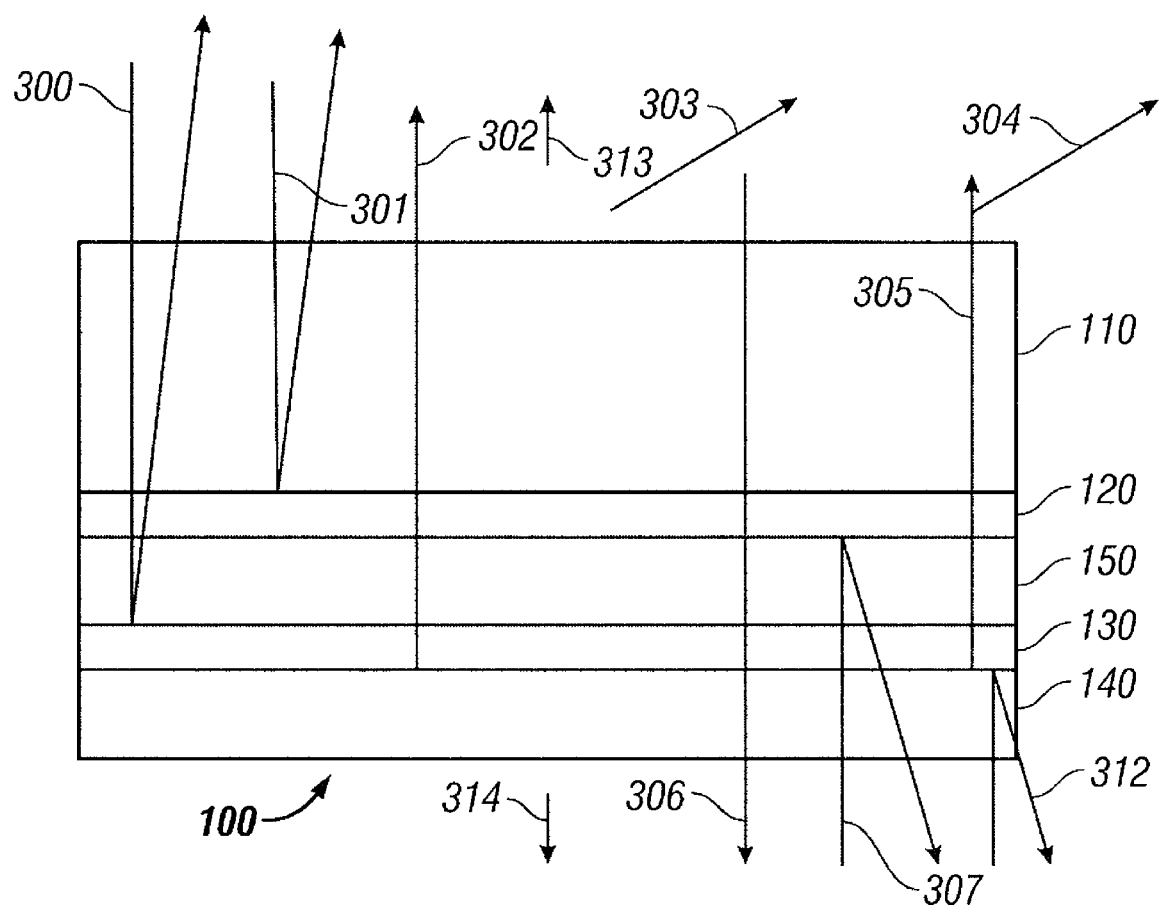
FIG. 8 schematically illustrates an example device in accordance with certain embodiments described herein.

FIG. 8 schematically illustrates an example device 100 in accordance with certain embodiments described herein. The device 100 comprises a substrate 110, a first layer 120, a second layer 130, and a light source 140. The substrate 110 is at least partially optically transparent. The first layer 120 is positioned over the substrate 110, and the first layer 120 is partially optically absorptive, partially optically reflective, and partially optically transmissive. The second layer 130 is positioned over the substrate 110 and is spaced from the first layer 120 with the first layer 120 located between the substrate 110 and the second layer 130. The second layer 130 is partially optically absorptive, partially optically reflective, and partially optically transmissive. In certain embodiments, the light source 140 is responsive to a signal and positioned relative to the substrate 110 such that the first layer 120 and the second layer 130 are located between the substrate 110 and the light source 140.

In certain embodiments, light emitted from the device 100 in a first direction 313 toward a viewer comprises a first portion 300 of light, a second portion 301 of light, and a third portion 302 of light. The first portion 300 of light is incident on the substrate 110, transmitted through the substrate 110, transmitted through the first layer 120, reflected by the second layer 130, transmitted through the first layer 120, transmitted through the substrate 110, and emitted from the substrate 110 in the first direction 313. The second portion 301 of light is incident on the substrate 110, transmitted through the substrate 110, reflected by the first layer 120, transmitted through the substrate 110, and emitted from the substrate 110 in the first direction 313. The third portion 302 of light is from the light source 140 and is incident on the second layer 130, transmitted through the second layer 130, transmitted through the first layer 120, transmitted through the substrate 110, and emitted from the substrate 110 in the first direction 313. In certain embodiments, at least the first portion 300 and the second portion 301 combine interferometrically to form the light emitted from the device 100 in the first direction 313. Similarly, in certain embodiments, the third portion 302 of light comprises interferometrically combined portions of light transmitted or reflected from the various layers of the device 100. Not included in this description is any stray light reflected from the surface of the substrate 110. Such stray light may be reduced by anti-reflection coatings which can be included on the substrate 110 in certain embodiments.

In certain embodiments, the substrate 110 comprises a glass or plastic material. In certain embodiments, the first layer 120 and the second layer 130 may comprise various materials with a positive extinction coefficient such as aluminum, chromium, molybdenum, titanium, carbon, silver, gold, and other such materials. In certain embodiments, for example, the first layer 120 comprises chromium. In certain embodiments, the second layer 130 comprises a metal layer (e.g., aluminum layer having a thickness of less than 300 Angstroms). In one embodiment, the second layer 130 comprises a metal having a thickness in the range of 30 to 300

Angstroms. In certain embodiments, the first layer has a thickness in the range of about 50 to 300 Angstroms. In one embodiment, for example, the first layer comprises chromium and the second layer comprises aluminum. The transmissivity of the second layer 130 in certain embodiments is dependent on the thickness of the second layer 130.

Figure 9A:
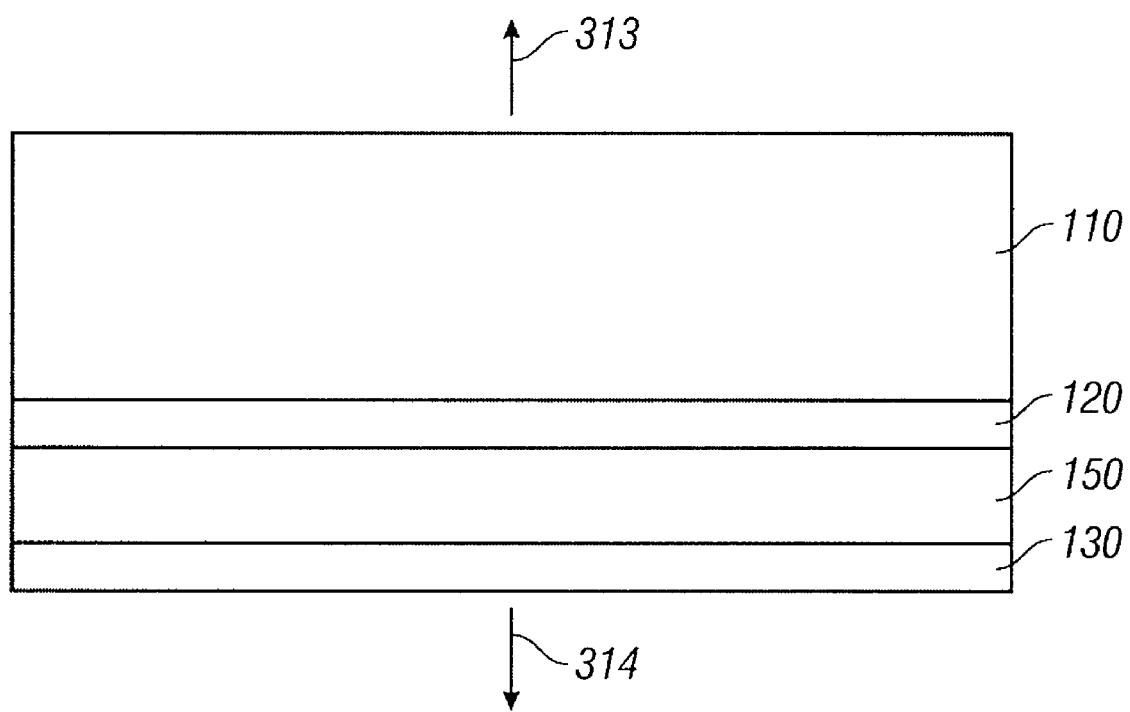
FIG. 9A schematically illustrates an example device in accordance with certain embodiments described herein.
Figure 9B:
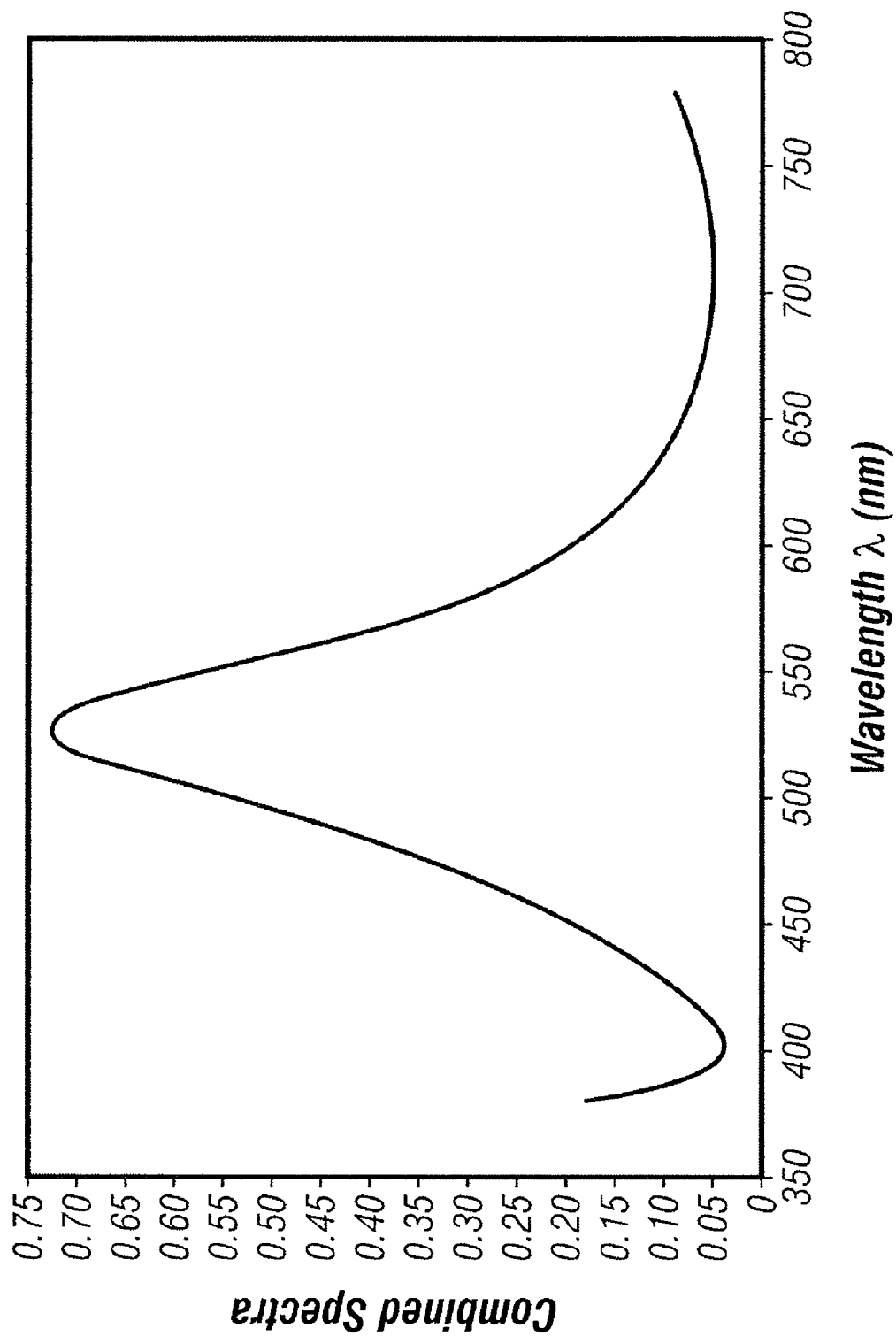
FIG. 9B shows the reflectivity of an example device in accordance with certain embodiments described herein.
Figure 9C:
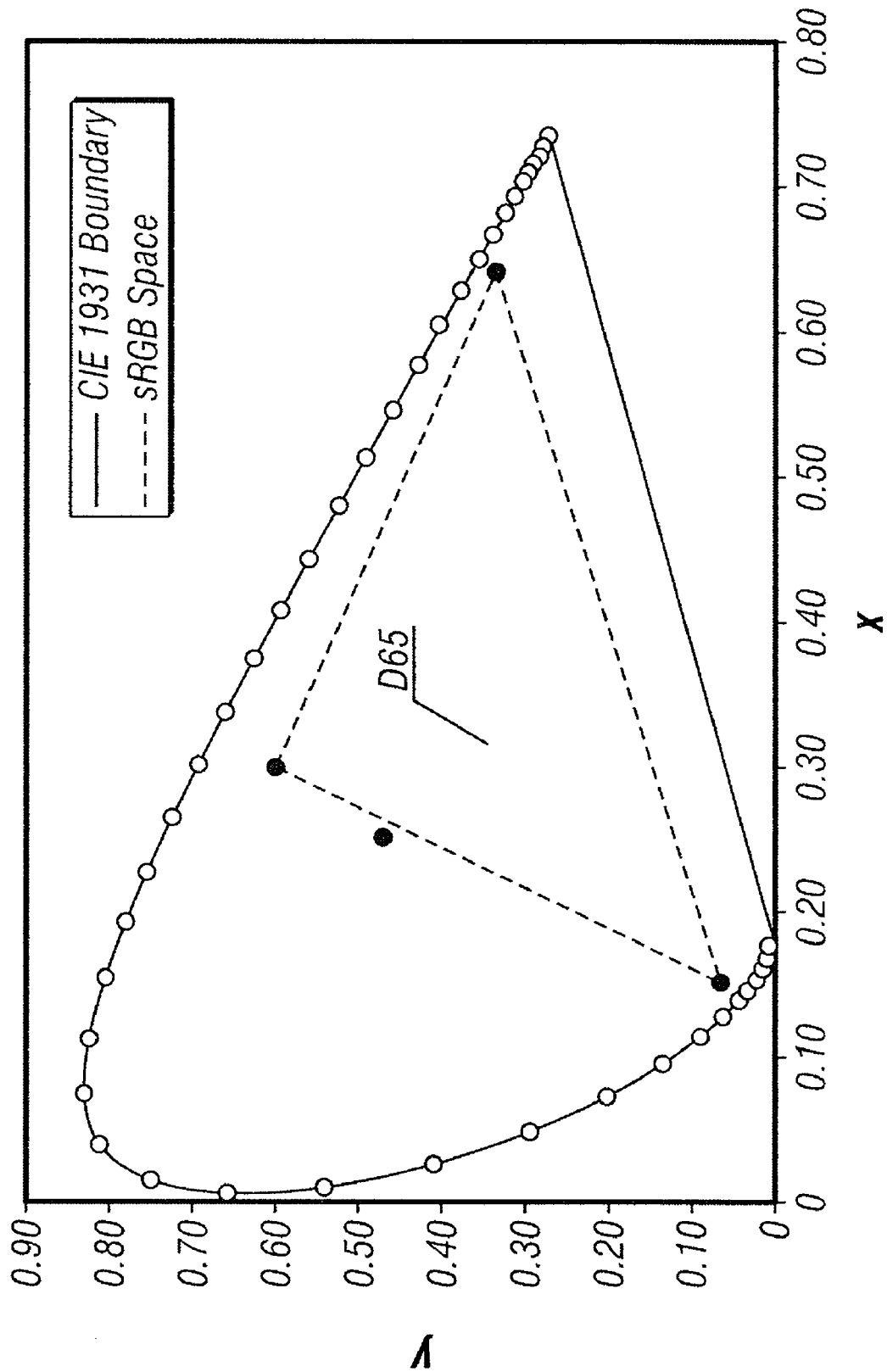
FIGS. 9C-9D show CIE chromaticity diagrams of an example device in accordance with certain embodiments described herein.
Figure 9D:
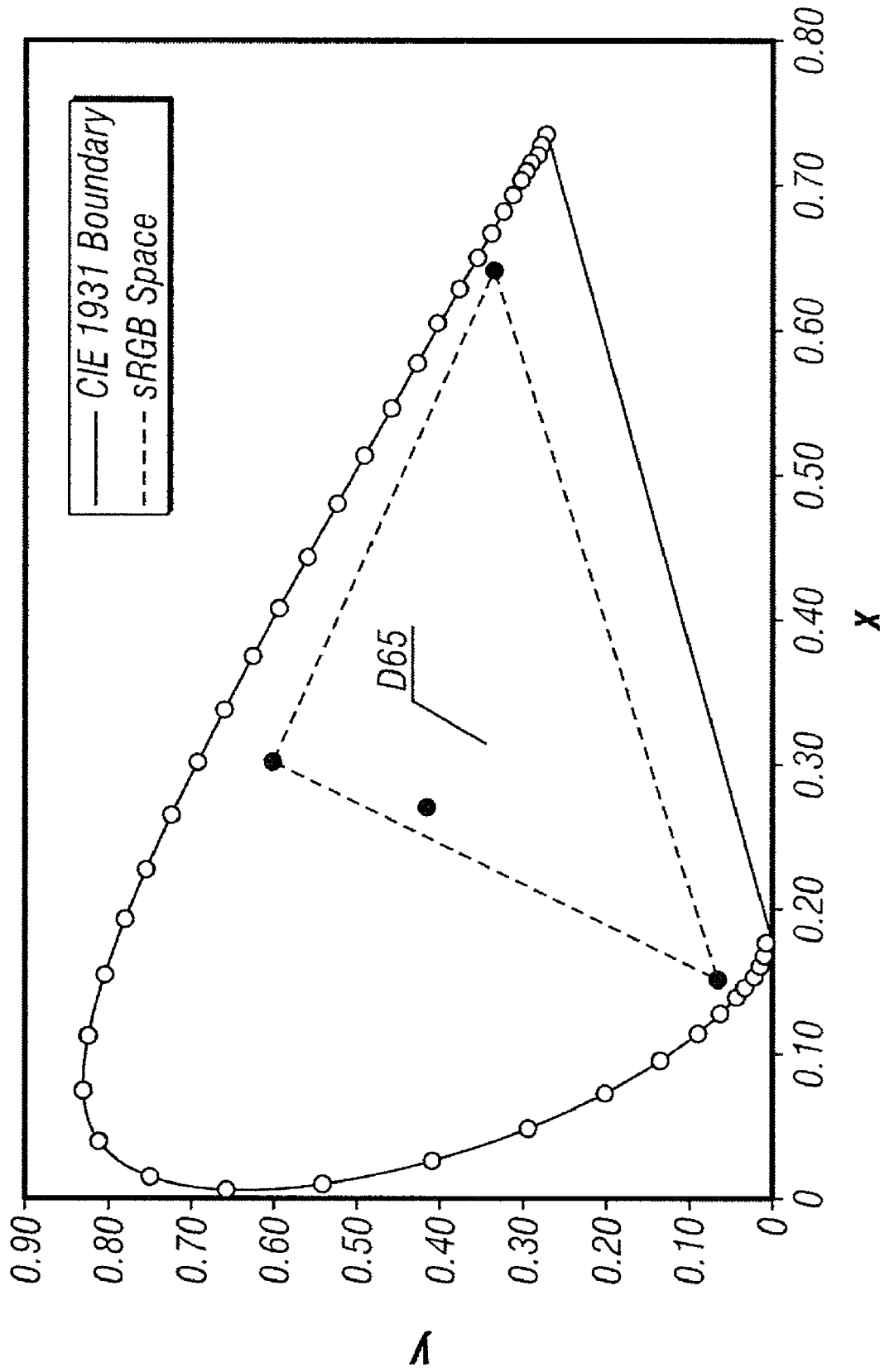
Figure 9E:
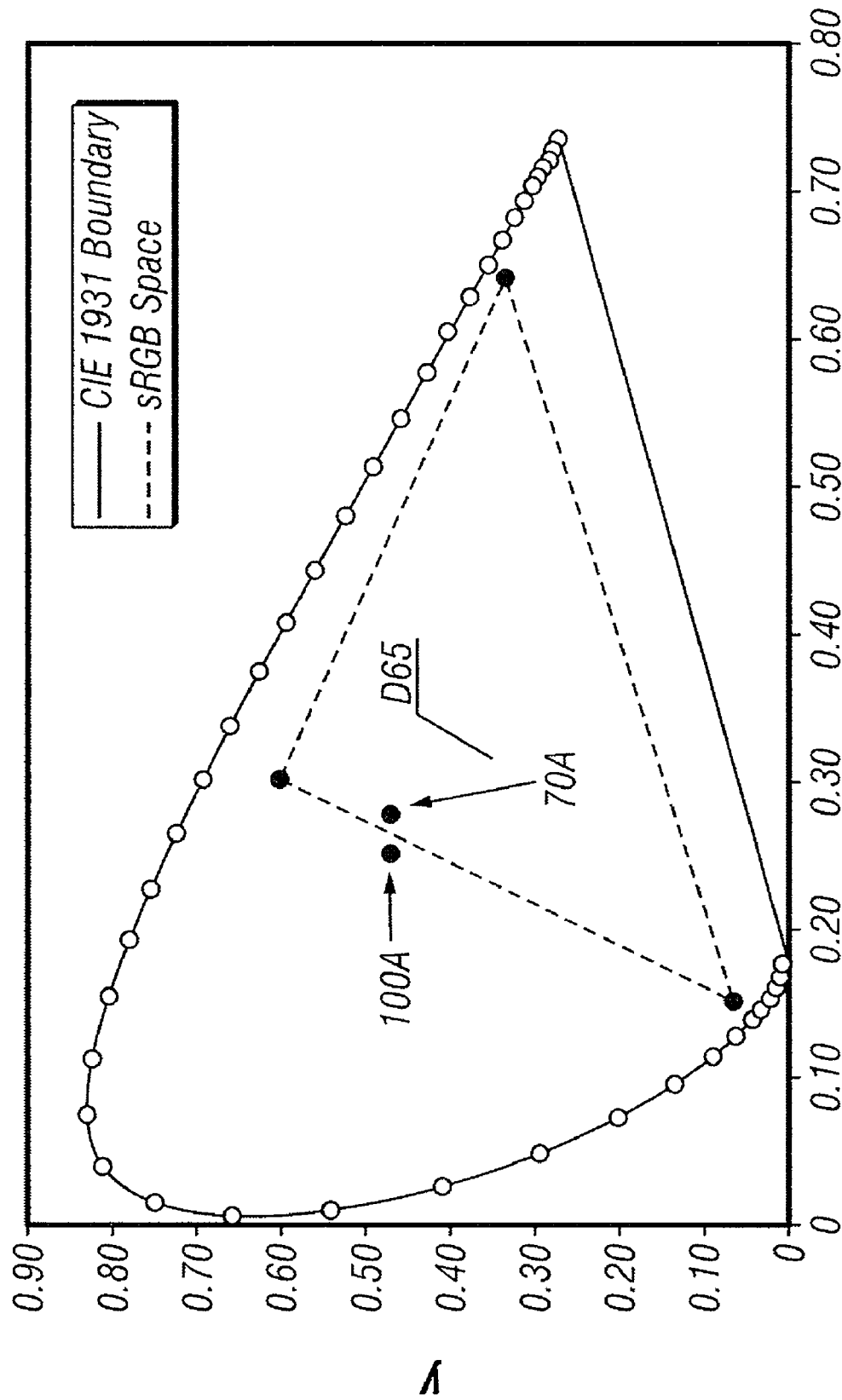
FIG. 9E shows a CIE chromaticity diagram of two example devices in accordance with certain embodiments described herein.
Figure 9F:
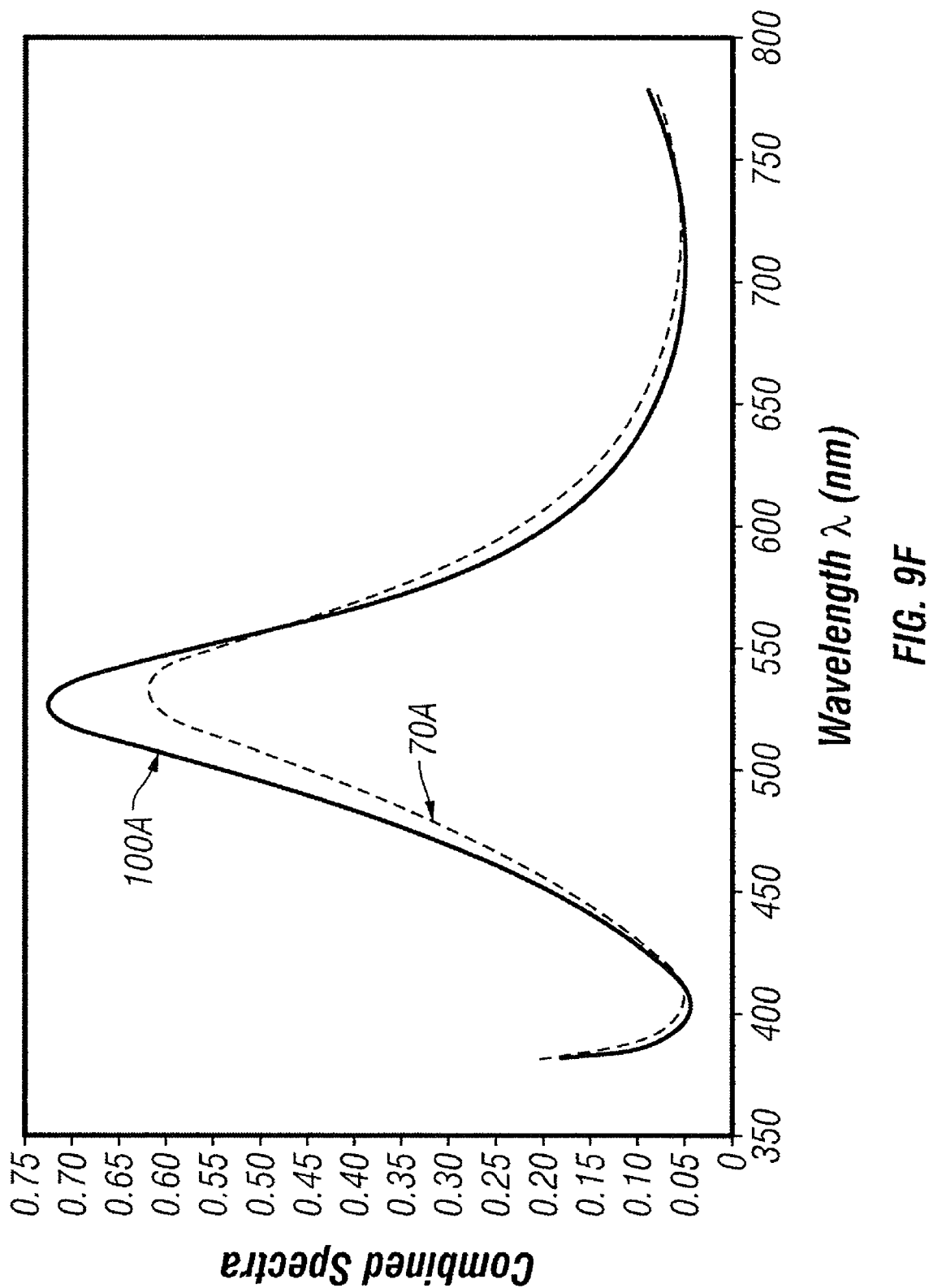
FIG. 9F shows the reflectivity of two example devices in accordance with certain embodiments described herein.
Figure 9G:
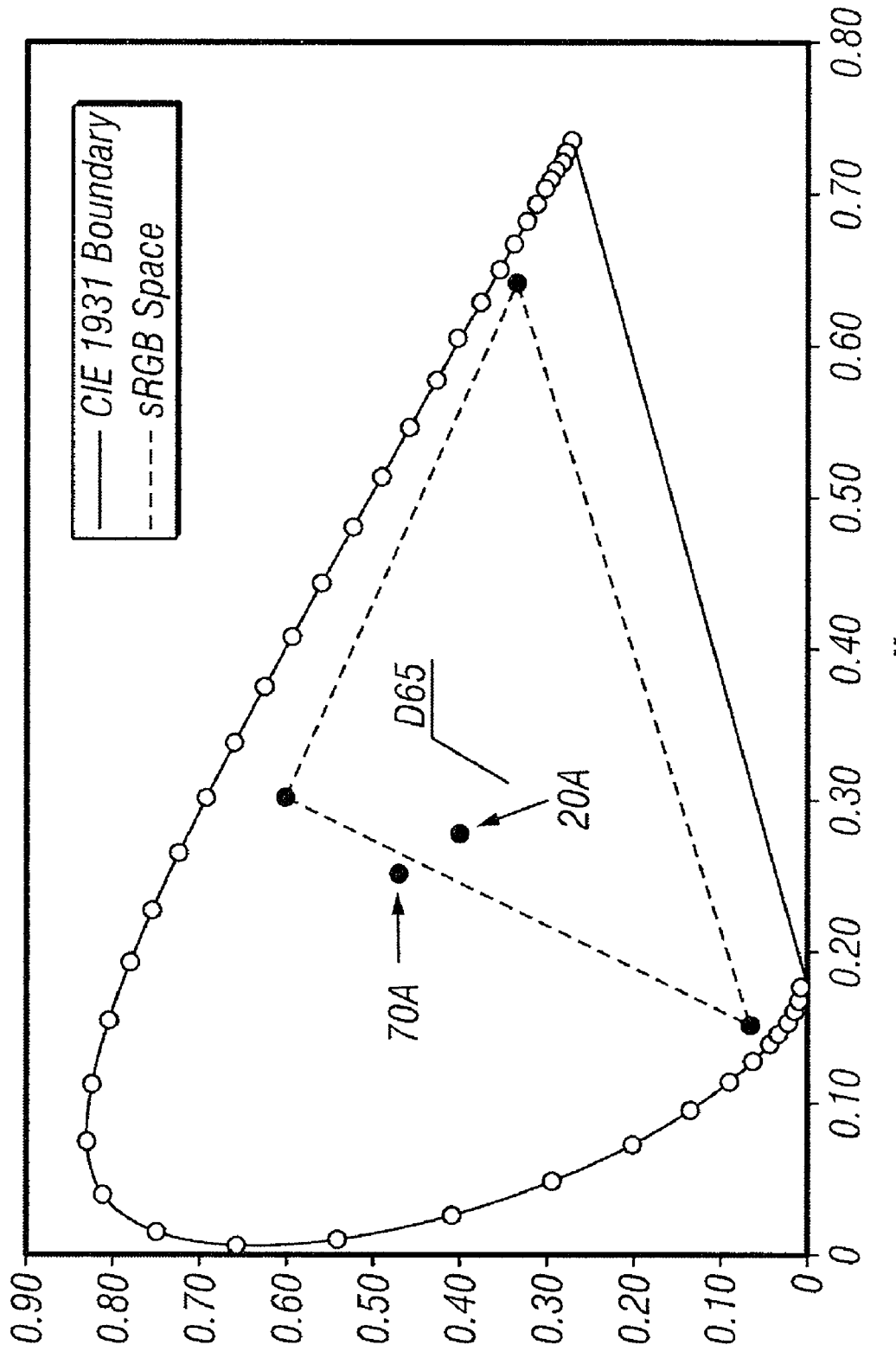
FIG. 9G shows a CIE chromaticity diagram of two example devices in accordance with certain embodiments described herein.
Figure 9H:
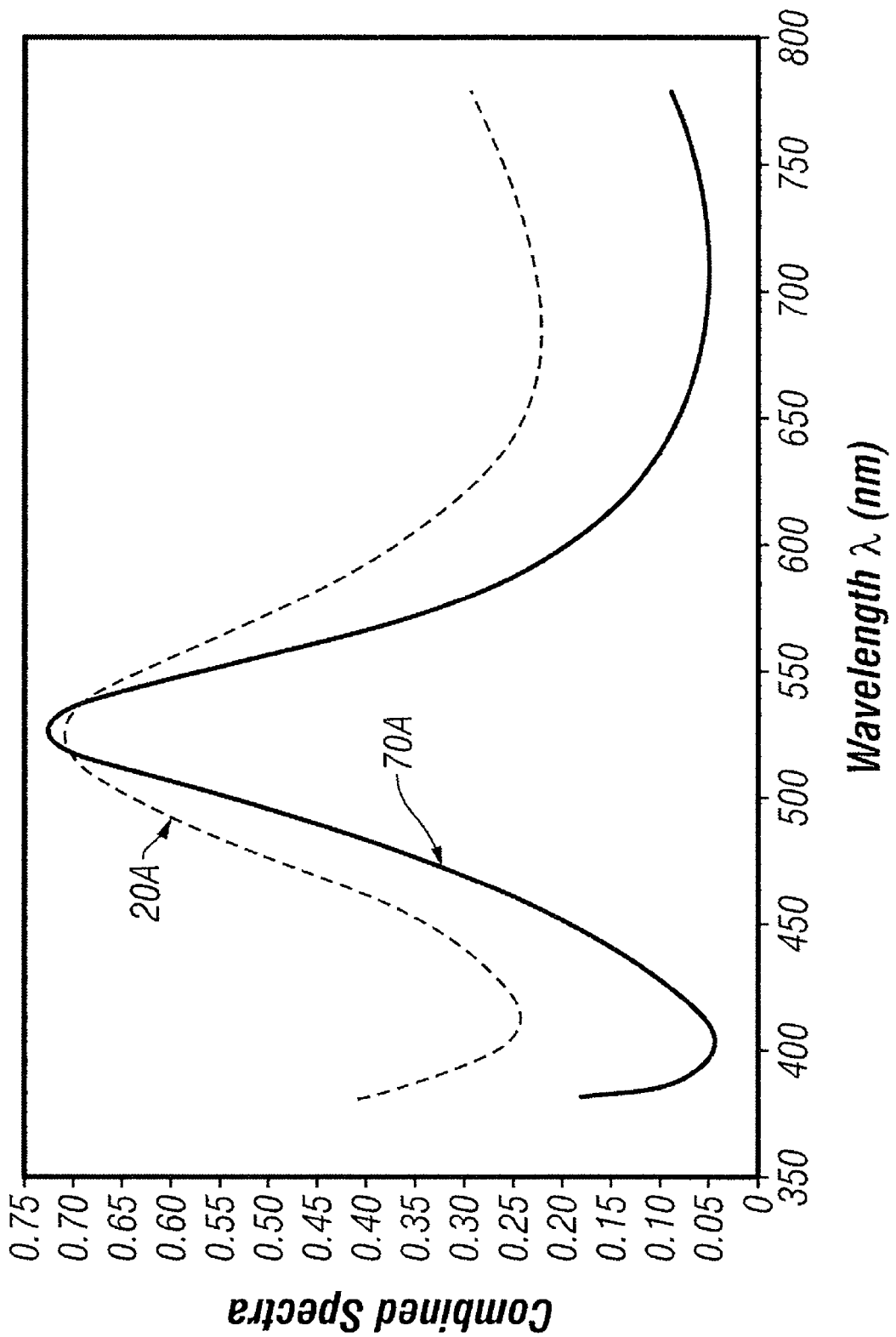
FIG. 9H shows the reflectivity of two example devices in accordance with certain embodiments described herein.

In certain embodiments, the first layer 120 is substantially optically absorptive. In other embodiments, the first layer 120 is substantially optically reflective. In yet other embodiments, the first layer 120 is substantially optically transmissive. In certain embodiments, the second layer 130 is substantially optically absorptive. In other embodiments, the second layer 130 is substantially optically reflective. In yet other embodiments, the second layer 130 is substantially optically transmissive. In one embodiment, for example, substrate 110 comprises glass of approximately 10 mm thickness with a refractive index of approximately 1.52, the layer 120 comprises Chromium of 70 Angstroms thickness, and the layer 130 comprises Aluminum of 100 Angstroms thickness. In the example embodiment, the layer 120 and the layer 130 are spaced by spacing dielectric layer 150 comprising Silicon Dioxide of 3400 Angstroms thickness to create an interferometric cavity capable of modifying the properties of light reflecting from or transmitted through the device by the process of optical interference (FIG. 9A). When illuminated from direction 300 the device of the example embodiment, the device 100 primarily reflects green light in the visible spectrum in direction 313 with a peak reflectivity of approximately 72% at a wavelength of approximately 530 nm measured normal to the device (FIG. 9B). This corresponds to a color point of x=0.26, y=0.47 in the standard CIE xyY color space as shown by the CIE Chromaticity diagram of FIG. 9C. When illuminated from direction 300 the example device transmits light in direction 314 having a transmission spectrum also peaking at a wavelength of approximately 530 nm, corresponding to a green color in the visible spectrum (FIG. 9D). In this embodiment, if the thickness of layer 130 is altered, the reflectivity and transmission may be altered. For example if the thickness of layer 130 is reduced to from 100 Angstroms to 70 Angstroms, peak reflectivity will be reduced to approximately 62%, while the peak reflectivity wavelength will be unchanged at approximately 530 nm, corresponding to a color point of x=0.28, y=0.47 in the standard CIE xyY color space when viewed normal to the device in direction 313 (FIGS. 9E-9F). In FIGS. 9E-9F, the labels "100A" and "70A" refer to the plots characterizing the embodiments described above having a layer 130 with a thickness of 100 Angstroms and 70 Angstroms, respectively. In another embodiment, substrate 110 comprises glass of approximately 10 mm thickness with a refractive index of approximately 1.52, layer 120 comprises Chromium of 20 Angstroms thickness, and layer 130 comprises Aluminum of 100 Angstroms thickness. The peak reflectivity of the device of this embodiment is approximately 71%, and peak reflectivity wavelength is approximately 530 nm in the visible spectrum, normal to the device, corresponding to a color point of x=0.29, y=0.40 in the standard CIE xyY color space (FIGS. 9G-9H). In this embodiment, layer 120 is primarily responsible for the saturation of the color reflected in direction 313, as shown by comparison to the embodiment described in which substrate 110 comprises glass of approximately 10 mm thickness, layer 120 comprises Chromium of 70 Angstroms thickness and layer 130 comprises Aluminum of 100 Angstroms thickness. In FIGS. 9G-9H, the labels "70A" and "20A" refer to the plots characterizing the embodiments described above having a layer 120 with a thickness of 70 Angstroms and 20 Angstroms, respectively. The embodiments described above will also exhibit angular color shift. As used herein, the term "color shift" refers to the change of color emitted from a side of the device 100 as a function of angle from a direction perpendicular to the first layer 120 and the second layer 130. For example, the color of light emitted from the device 100 and received by a viewer can be dependent on the angular position of the viewer relative to the device 100.

Figure 10:
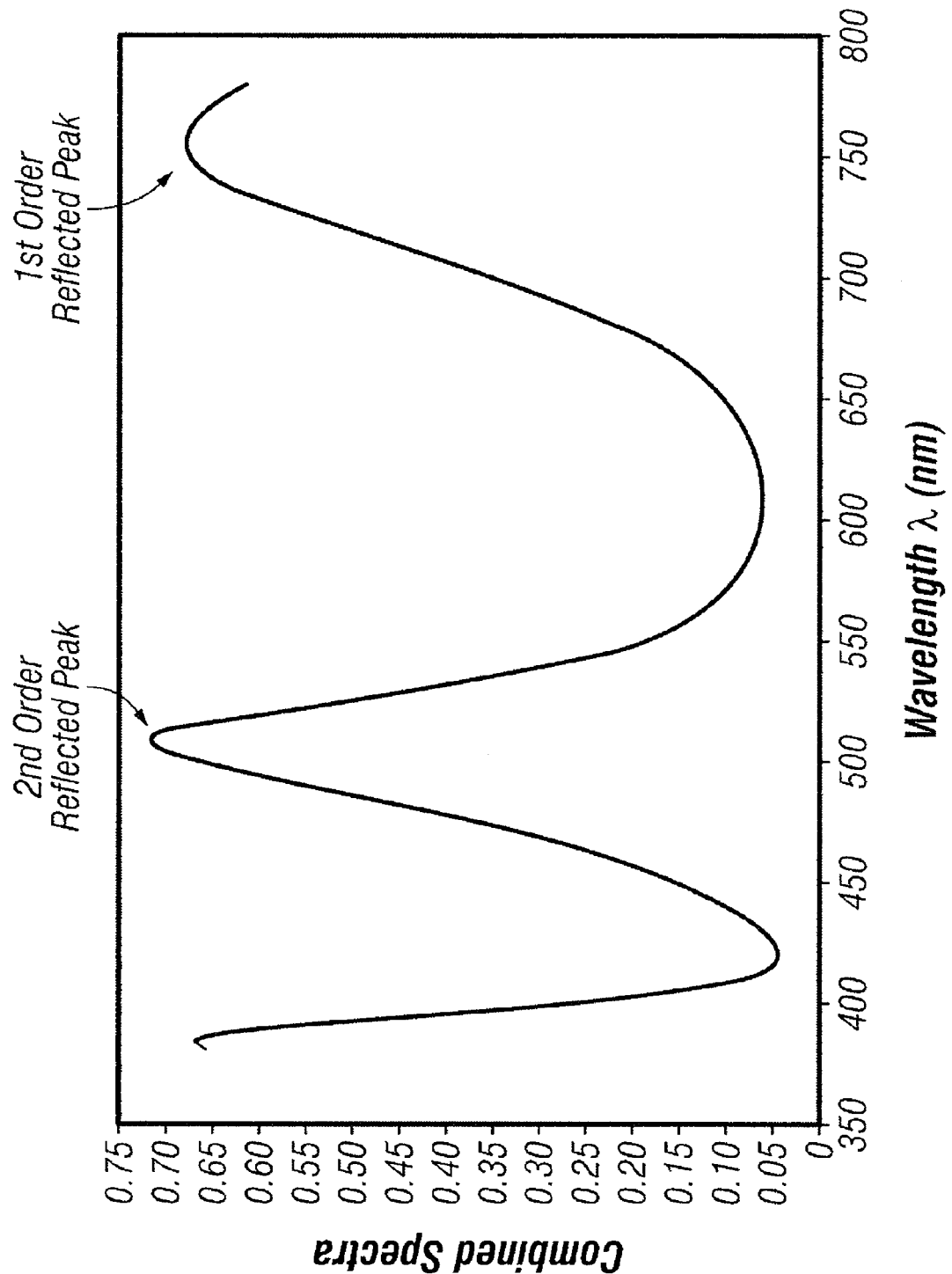
FIG. 10 shows the reflectivity of an example device in accordance with certain embodiments described herein.

In certain embodiments, the first portion 300 of light incident on the substrate 110 and the second portion 301 of light incident on the substrate 110 are infrared, visible, and/or ultraviolet light. In certain embodiments, the third portion 302 of light from the light source 140 is infrared, visible, and/or ultraviolet light. In one embodiment, substrate 110 comprises glass of approximately 10 mm thickness with a refractive index of approximately 1.52. In this embodiment, the layer 120 comprises Chromium of 70 Angstroms thickness, the layer 130 comprises Aluminum of 100 Angstroms thickness, and the layer 120 and the layer 130 are spaced by spacing dielectric layer 150 comprising Silicon Dioxide of 5000 Angstroms thickness, to create an interferometric cavity. When illuminated from direction 300 the device of the example embodiment primarily reflects light in both the infra red spectrum and the visible spectrum in direction 313 with a peak reflectivity of approximately 68% at wavelengths of approximately 755 nm and 72% at a wavelength of 510 nm measured normal to the device (FIG. 10).

In certain embodiments, the light source 140 comprises a backlight, as schematically illustrated by FIG. 8. The backlight of certain such embodiments comprises a light guide slab that receives light from a light generator (e.g., an LED, where light from the LED is injected along an edge of the light guide slab), guides the light along the light guide slab, and redirects and emits the light towards the device thereby providing illumination that may be substantially uniform or non-uniform to take advantage of device transmission and reflection properties to create patterns, graphics, or images with luminance or chromatic contrast when viewed from direction 313 or 314. The light guide slab can include extractor features located on a rear or front surface (with respect to the second layer 130) of the light guide slab which disrupt the propagation of light within the light guide slab and cause the light to be uniformly emitted across a front surface of the light guide slab towards a front surface of the device 100. In certain embodiments, the light source 140 comprises a fluorescent light generator. In other embodiments, the light source 140 comprises an incandescent light generator, an LED, or another type of light generator. In certain other embodiments, the light source 140 can comprise a substantially reflective surface which reflects or emits a substantial portion of the light which reaches the light source 140 after being transmitted through the substrate 110, the first layer 120, and the second layer 130. In certain embodiments, there may be a separation between the light source 140 and the other portions of the device 100. In certain such embodiments, for example, there may be a physical separation between the light source 140 and the layer 130. Additionally, in some embodiments, the light incident upon and modulated by the device 100 includes ambient or natural light, such as light from the sun, for example.

In certain embodiments, the light source 140 is responsive to the signal (e.g., from a controller) by changing between multiple states. For example, in certain embodiments, in response to the signal, the light source 140 can turn "on" and "off". In other embodiments, the light source 140 may be responsive to the signal by changing to emit light having different properties, such as, for example, light having different brightness levels or different colors. In one embodiment, the light source 140 is responsive to the signal by changing from emitting light having a first selected brightness to emitting light having a second selected brightness different from the first selected brightness. In certain embodiments, the light source 140 is responsive to the signal by changing from emitting light having a first selected color to emitting light having a second selected color different from the first selected color. In certain embodiments, the light source 140 is responsive to the signal by changing from emitting light of a first selected color, thereby modulating angular color shift and intensity over a predetermined range of angles (e.g., 0 to 30 degrees) from a direction perpendicular to the first layer 120 and the second layer 130 to emitting light exhibiting a second selected color, thereby modulating angular color shift and intensity over a predetermined range of angles (e.g., 0 to 30 degrees) from a direction perpendicular to the first layer 120 and the second layer 130 where the second selected color shift is different from the first selected angular color shift and intensity. By modulating the signal in certain embodiments, one or more properties of the light emitted in the first direction 313 can be modulated.

Light resulting from the interference of light reflected from a plurality of layers can be referred to as "interferometrically reflected" light. In certain embodiments, the first portion 300 of light and the second portion 301 of light interfere with one another to produce interferometrically reflected light which comprises a substantial portion of the light reflected from the device 100. In certain other embodiments, the reflected light emitted from the device 100 can comprise light from other reflections from other interfaces (e.g., the air-substrate interface), light reflected from other layers, and light from multiple reflections between these interfaces (e.g., light reflected multiple times between the first layer 120 and the second layer 130).

In certain embodiments, the first portion 300 of light and the second portion 301 of light interfere to produce light having a first color, and the third portion 302 of light has a second color different from the first color. In certain embodiments, the first portion 300 of light and the second portion 301 of light interfere to produce light having a first color, and the light emitted from the device 100 in the first direction 313 (e.g., the combination of the interferometrically reflected light and the third portion 302 of light) has a second color different from the first color.

In certain embodiments, the light emitted from the device 100 in the first direction 313 has a first color when the light source 140 emits light. The first color of such embodiments results from the combination of the interferometrically reflected light and the third portion 302 of light. In certain embodiments, the light emitted by the device 100 in the first direction 313 has a second color, which can be different from the first color, when the light source 140 does not emit light. The second color of such embodiments results from the interferometrically reflected light without the third portion 302 of light.

Figure 11A:
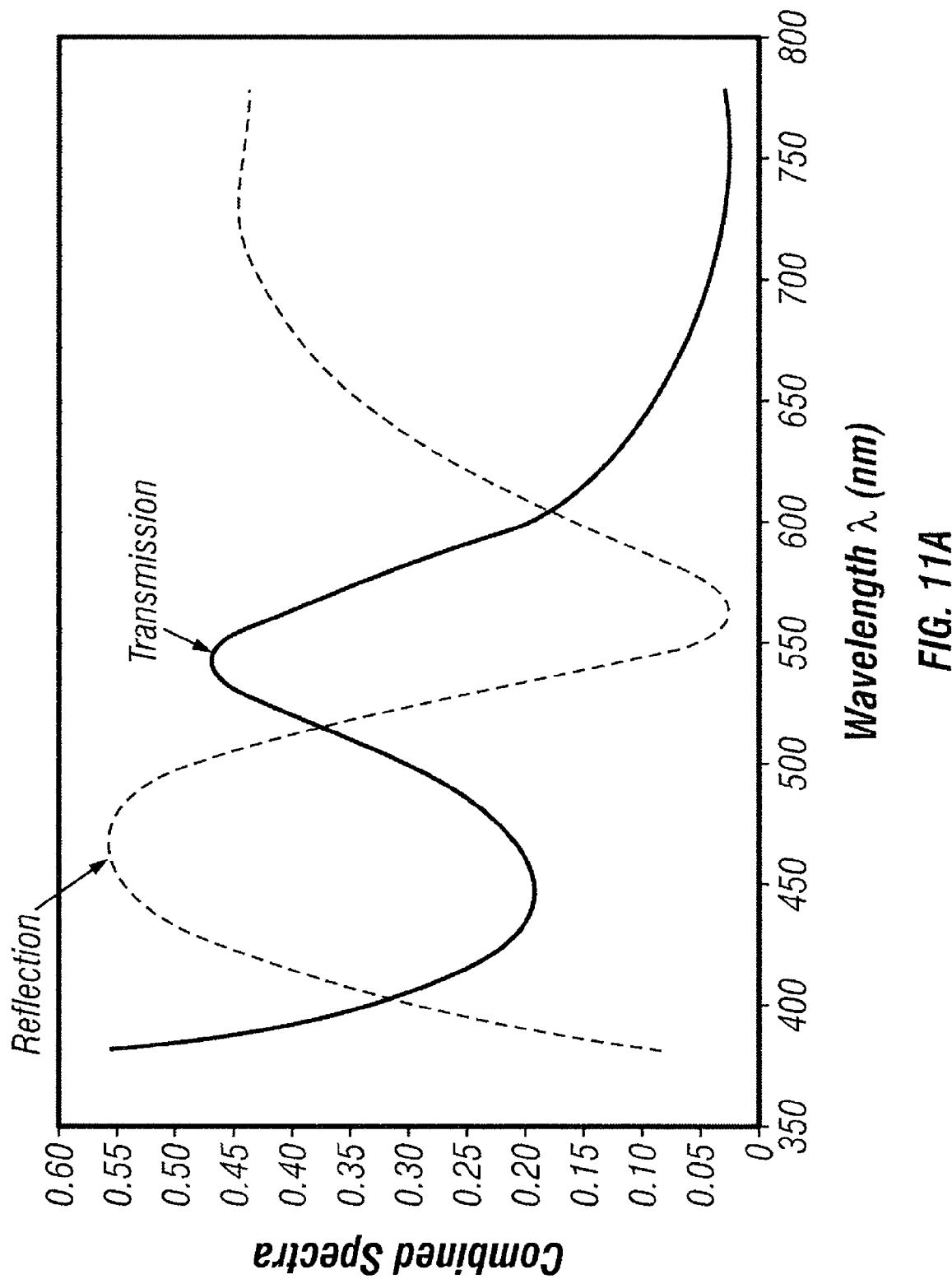
FIG. 11A shows the reflectivity and transmittance of an example device in accordance with certain embodiments described herein.

In certain embodiments, the light emitted by the device 100 in the first direction 313 has a first color when the light source 140 emits light and ambient light is incident on the device 100 (e.g., incident on the substrate 110). The first color of such embodiments results from the combination of the interferometrically reflected light and the third portion 302 of light. In certain embodiments, the light emitted by the device 100 in the first direction 313 has a second color, which can be different from the first color, when the light source 140 emits light and ambient light is not incident on the device 100. The second color of such embodiments results from the third portion 302 of light without the interferometrically reflected light. In certain embodiments, the light emitted by the device 100 in the first direction 313 has a third color, which can be different from either the first color or the second color, when the light source 140 does not emit light and ambient light is incident on the device 100. The third color of such embodiments results from the interferometrically reflected light without the third portion 302 of light. In one embodiment, substrate 110 comprises glass of approximately 10 mm thickness, layer 120 comprises Aluminum of 40 Angstroms thickness, layer 130 comprises Aluminum also of 40 Angstroms thickness, and layer 120 and 130 are spaced by spacing dielectric layer 150 comprising Silicon Dioxide of 3200 Angstroms thickness to create an interferometric cavity. When illuminated from direction 300 the device will reflect blue light in direction 313, normal to the device, with a peak wavelength of 470 nm and peak reflectivity of approximately 56% (not including losses through substrate materials or due to reflection at material/air interfaces). The example interferometric device described is semi-transparent and will transmit light in direction 302 when illuminated by light source 140. This embodiment will transmit green light with a peak wavelength of 540 nm and a transmission of approximately 45% (not including losses through substrate materials, or due to reflection at material/air interfaces), as shown by the plot of FIG. 11A and the CIE chromaticity diagram of FIG. 11B. The light emitted in direction 313 will comprise a combination of the interferometrically reflected light and light 302, which will vary in perceived color according to the intensity of the light source 140 and the intensity of the light incident on the device.

Figure 11B:
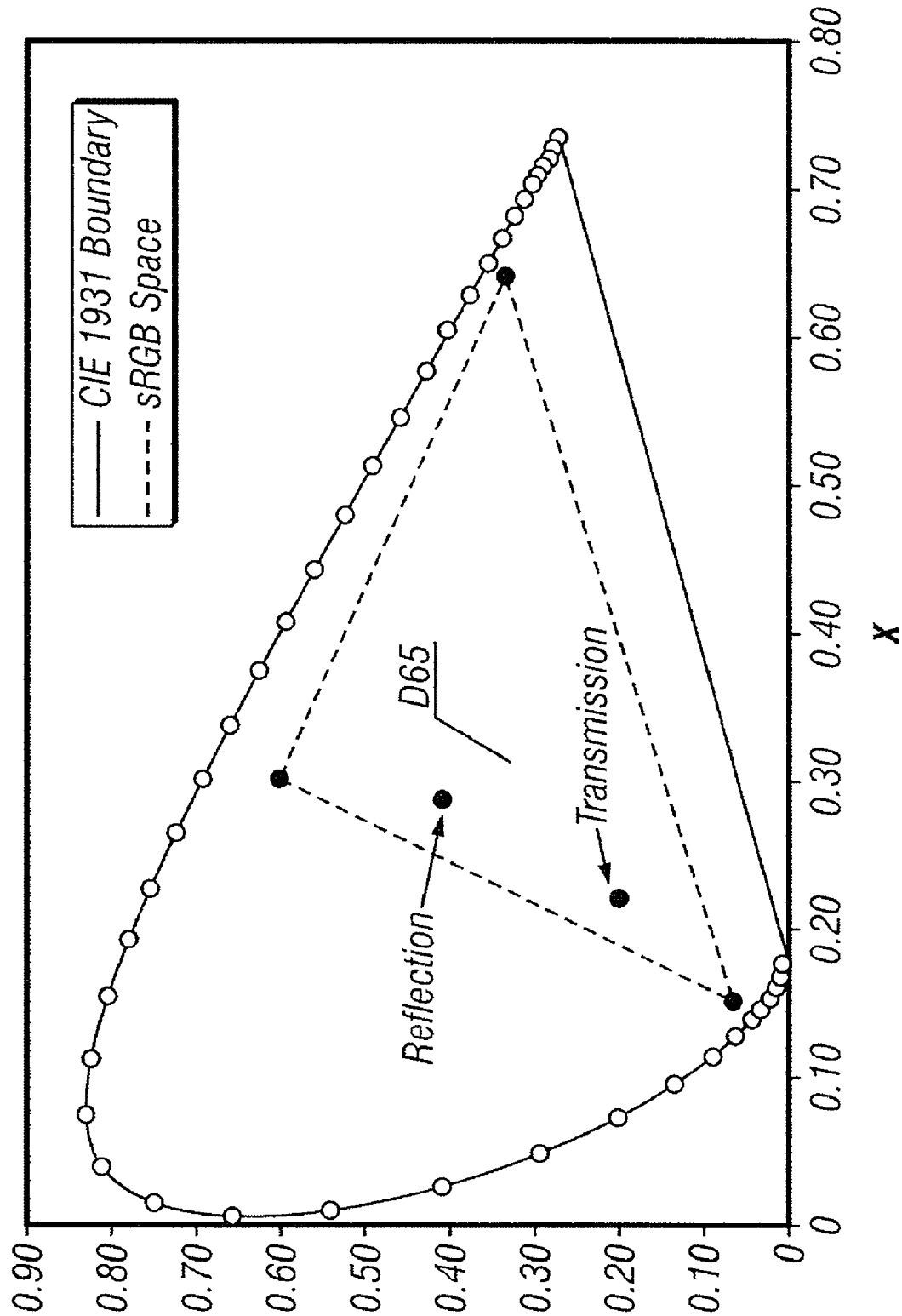
FIG. 11B shows a CIE chromaticity diagram of an example device in accordance with certain embodiments described herein.
Figure 12A:
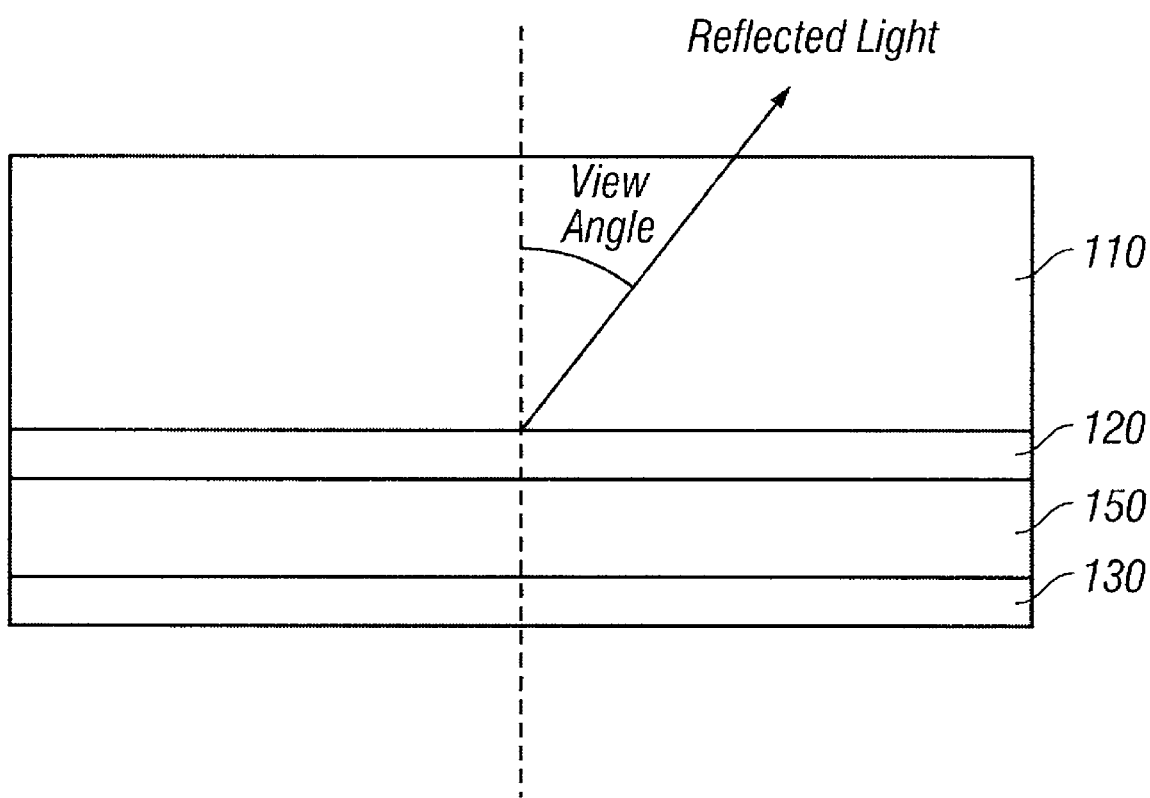
FIG. 12A schematically illustrates an example device in accordance with certain embodiments described herein.
Figure 12B:
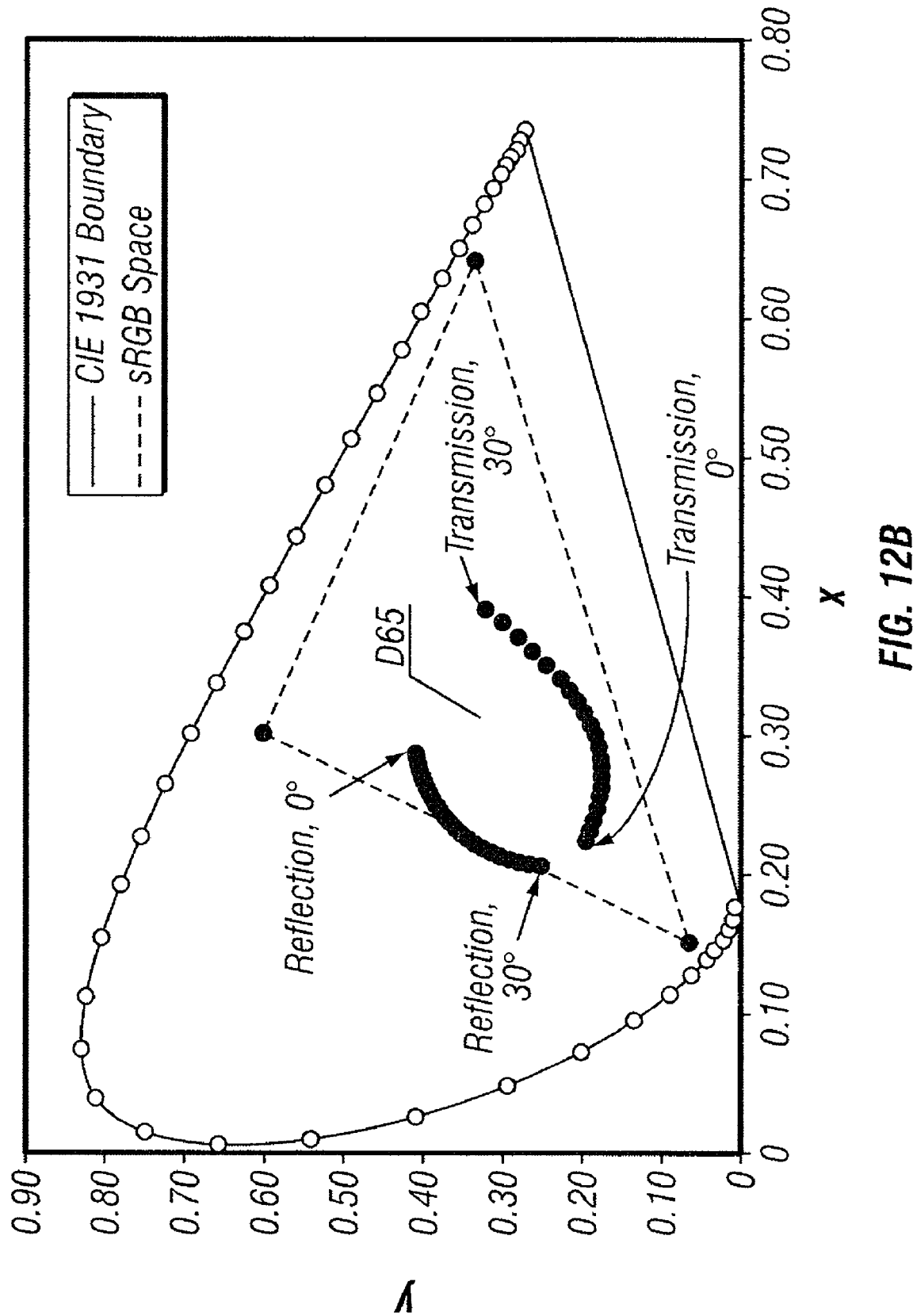
FIG. 12B shows a CIE chromaticity diagram of an example device for different viewing angles in accordance with certain embodiments described herein.

In certain embodiments, the first portion 300 of light and the second portion 301 of light interfere to produce light having a first color and which exhibits a first angular color shift, and the third portion 302 of light has a second color and exhibits a second angular color shift different from the first angular color shift. In certain embodiments, the first portion 300 of light and the second portion 301 of light interfere to produce light having a first color which exhibits a first angular color shift, and the light emitted from the device 100 in the first direction 313 (e.g., the combination of the interferometrically reflected light and the third portion 302 of light) has a second color and exhibits a second angular color shift different from the first angular color shift. In one embodiment, substrate 110 comprises glass of approximately 10 mm thickness, layer 120 comprises Aluminum of 40 Angstroms thickness, layer 130 comprises Aluminum also of 40 Angstroms thickness, and layer 120 and layer 130 are spaced by spacing dielectric layer 150 comprising Silicon Dioxide of 3200 Angstroms thickness to create an interferometric cavity. When illuminated from direction 300 the device will reflect blue light in direction 313, normal to the device, with a peak wavelength of 470 nm and peak reflectivity of approximately 56% (not including losses through substrate materials, or due to reflection at material/air interfaces). The interferometric device of the example embodiment is semi-transparent and will transmit light in direction 302 when illuminated by light source 140. This embodiment will transmit green light with a peak wavelength of 540 nm and a transmission of approximately 45% (not including losses through substrate materials, or due to reflection at material/air interfaces), as shown by FIG. 11A. FIG. 11B shows the same as a CIE chromaticity diagram. FIGS. 12A and 12B show how the reflected and transmitted color varies with view angle. FIG. 12B assumes that the viewer is within the substrate 110 and does not account for the substrate to air interface. A refractive index change at that interface will alter the perceived color shift. As a result, if the viewer is in air (N=1) and the substrate is glass (N=1.52), then the viewer will see a reduced amount of color shift for a given view angle with respect to the substrate.

In certain embodiments, the light emitted from the device 100 in the first direction 313 has a first color and exhibits a first angular color shift when the light source 140 emits light. The first angular color shift of such embodiments results from the combination of the interferometrically reflected light and the third portion 302 of light. In certain embodiments, the light emitted by the device 100 in the first direction 313 has a second color and exhibits a second angular color shift, which can be different from the first angular color shift, when the light source 140 does not emit light. The second angular color shift of such embodiments results from the interferometrically reflected light without the third portion 302 of light.

Figure 13:
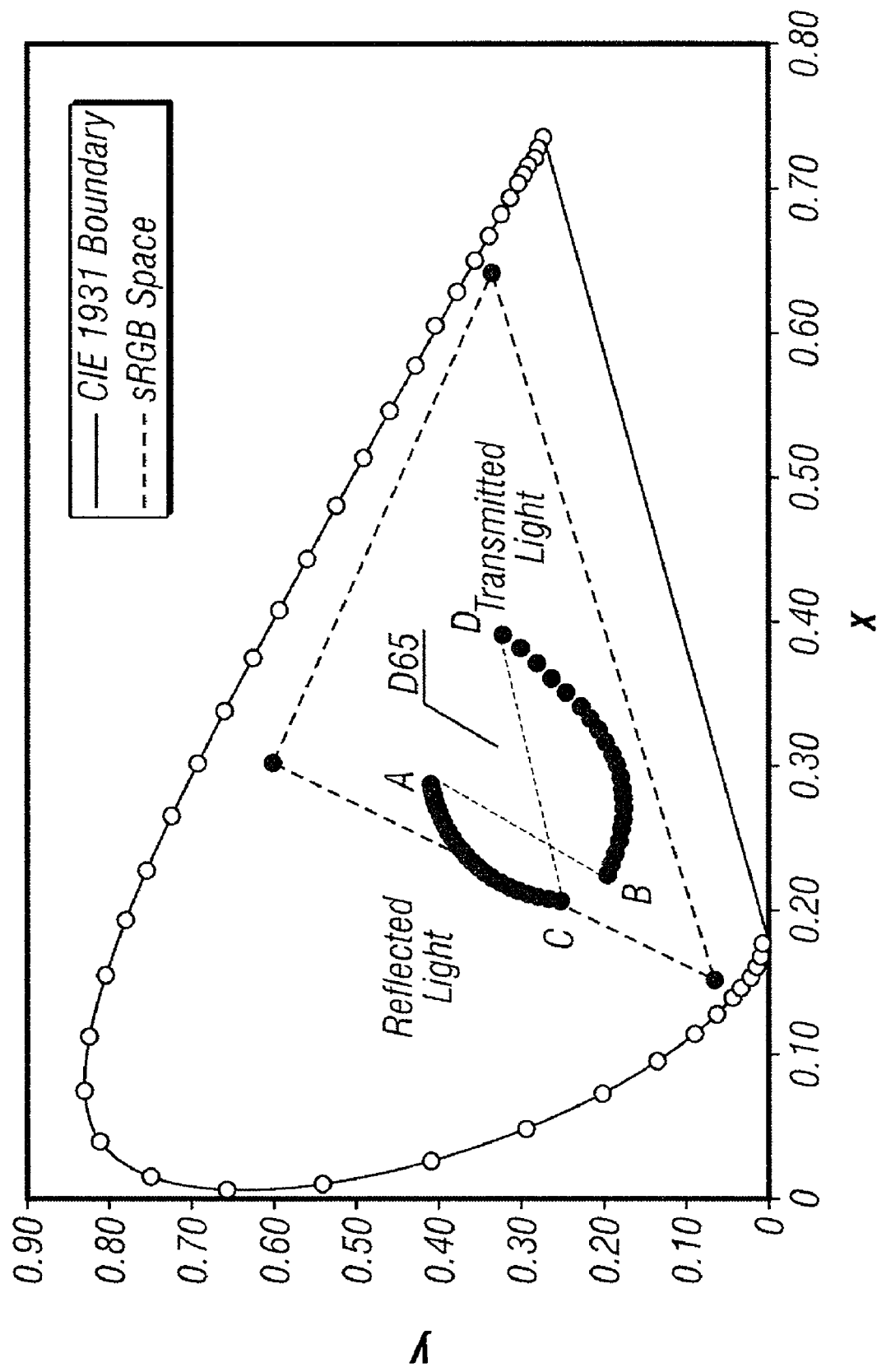
FIG. 13 shows a CIE chromaticity diagram of an example device for different viewing angles in accordance with certain embodiments described herein.

In certain embodiments, the light emitted by the device 100 in the first direction 313 has a first color and exhibits a first angular color shift when the light source 140 emits light and ambient light is incident on the device 100 (e.g., incident on the substrate 110). The first angular color shift of such embodiments results from the combination of the interferometrically reflected light and the third portion 302 of light. In certain embodiments, the light emitted by the device 100 in the first direction 313 has a second color and exhibits a second angular color shift, which can be different from the first angular color shift, when the light source 140 emits light and ambient light is not incident on the device 100. The second angular color shift of such embodiments results from the third portion 302 of light without the interferometrically reflected light. In certain embodiments, the light emitted by the device 100 in the first direction 313 has a first color and exhibits a third angular color shift, which can be different from either the first angular color shift or the second angular color shift, when the light source 140 does not emit light and ambient light is incident on the device 100. The third angular color shift of such embodiments results from the interferometrically reflected light without the third portion 302 of light. Referring again to the example embodiment described above with respect to FIGS. 12A-12B in which the substrate 110 comprises glass of approximately 10 mm thickness, layer 120 comprises Aluminum of 40 Angstroms thickness, layer 130 comprises Aluminum also of 40 Angstroms thickness, and layer 120 and layer 130 are spaced by spacing dielectric layer 150 comprising Silicon Dioxide of 3200 Angstroms thickness, a viewer will see 313 as the combination of the reflected light (300, 301) and transmitted light 302. FIG. 13 shows how the reflected and transmitted color variation with view angle (for a viewer within substrate 110, so ignoring additional reflections from substrate 110.) For a viewer normal to the IMOD, depending on the brightness of the light source 140 and the reflected portion of light, the perceived color will lie on a line from A to B as shown in FIG. 13. Similarly at an angle of 30 degrees, the color will lie on a line from C to D. This example also shows how an illuminated semi-transparent IMOD can be used to produce color that not only varies with view angle, but which is not a color that can be directly created by a purely reflective IMOD.

In certain embodiments, the device 100 is viewable from both the first direction 313 and in a second direction 314 generally opposite to the first direction 313. For example, the device 100 of certain such embodiments can be viewed from a first position on a first side of the device 100 and from a second position on a second side of the device 100. In certain embodiments, the light emitted from the device 100 in the second direction 314 comprises a fourth portion 306 of light, a fifth portion 307 of light, and a sixth portion 312 of light. The fourth portion 306 of light in certain embodiments is incident on the substrate 110, transmitted through the substrate 110, transmitted through the first layer 120, transmitted through the second layer 130, and emitted from the device 100 in the second direction 314. The fifth portion 307 of light in certain embodiments is incident on the second layer 130, transmitted through the second layer 130, reflected from the first layer 120, transmitted through the second layer 130, and emitted from the device 100 in the second direction 314. The sixth portion 312 of light in certain embodiments is incident on the second layer 130, reflected from the second layer 130, and emitted from the device 100 in the second direction 314. In certain embodiments, the fifth portion 307 of light comprises light emitted by the light source 140 and the sixth portion 312 of light comprises light emitted by the light source 140.

Figure 14A:
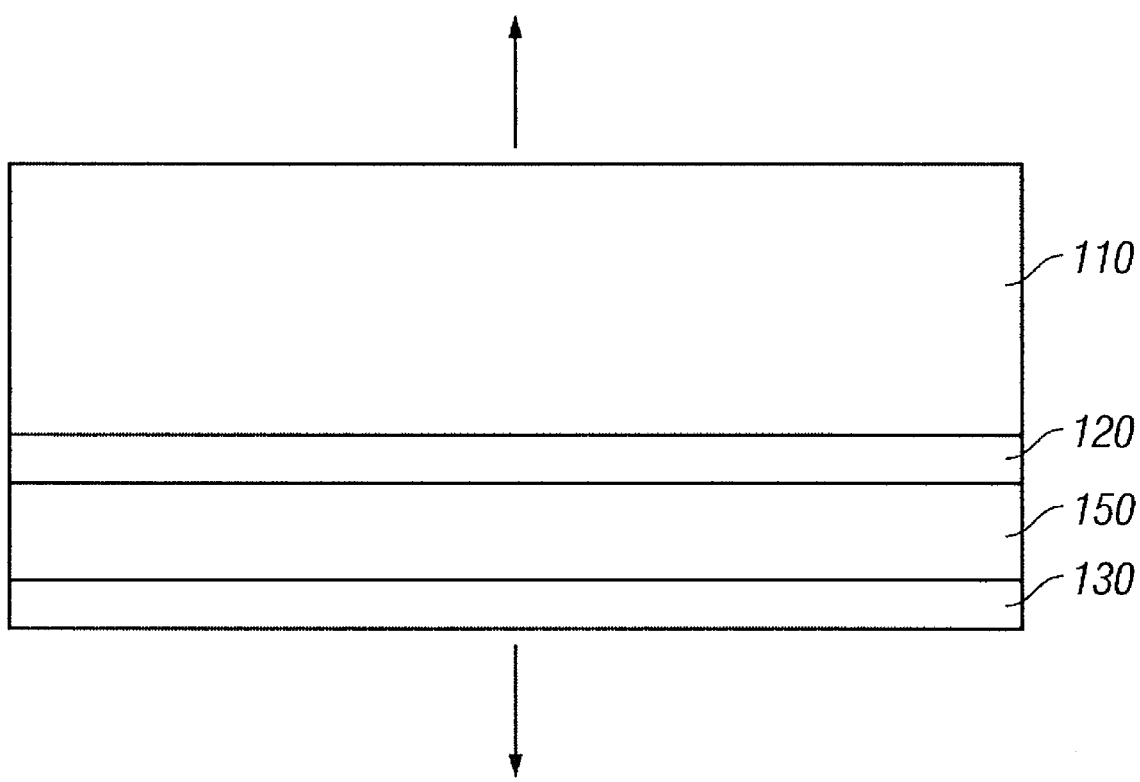
FIG. 14A schematically illustrates an example device in accordance with certain embodiments described herein.
Figure 14B:
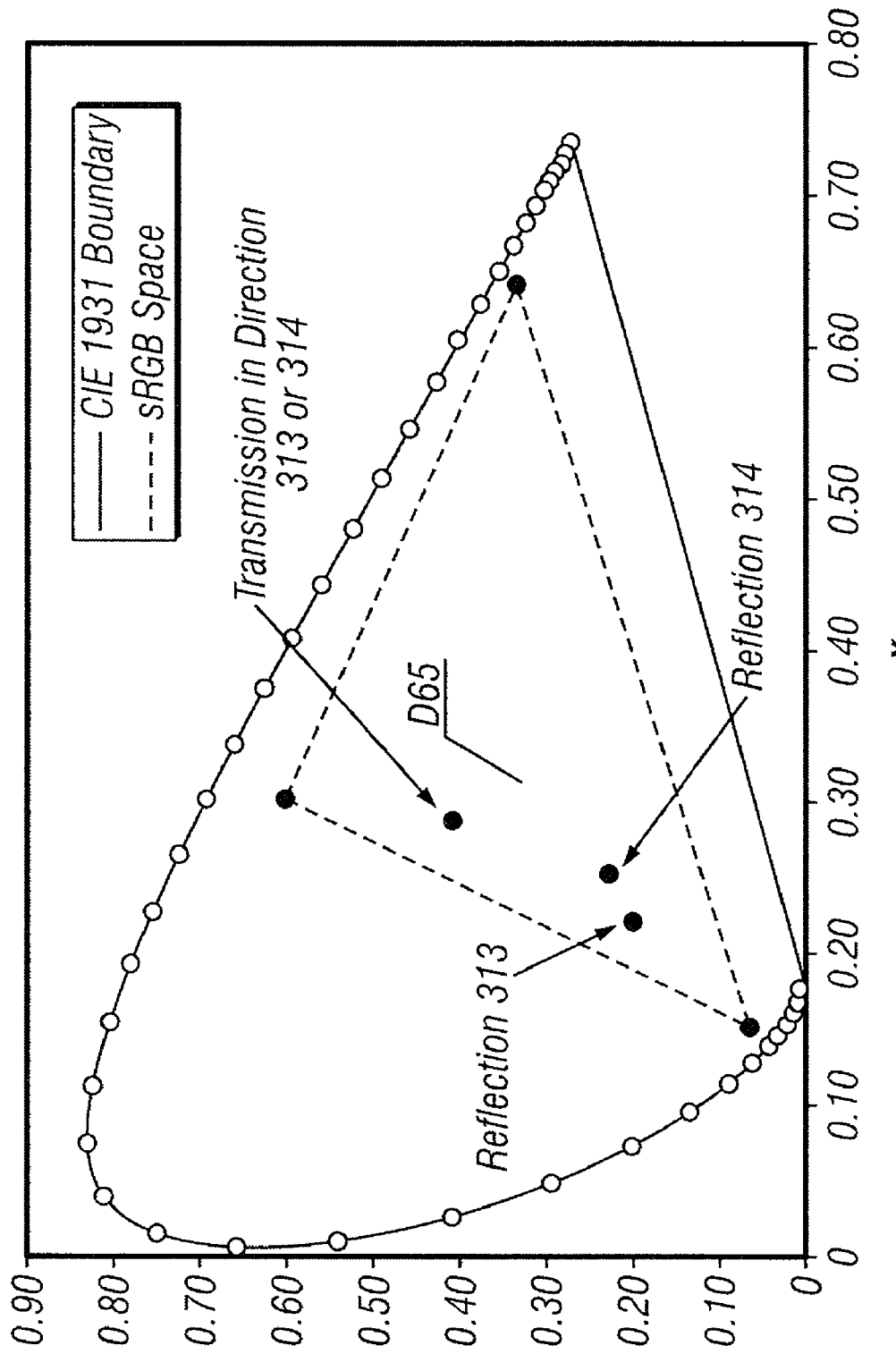
FIGS. 14B-14C show CIE chromaticity diagrams of two example devices in accordance with certain embodiments described herein.
Figure 14C:
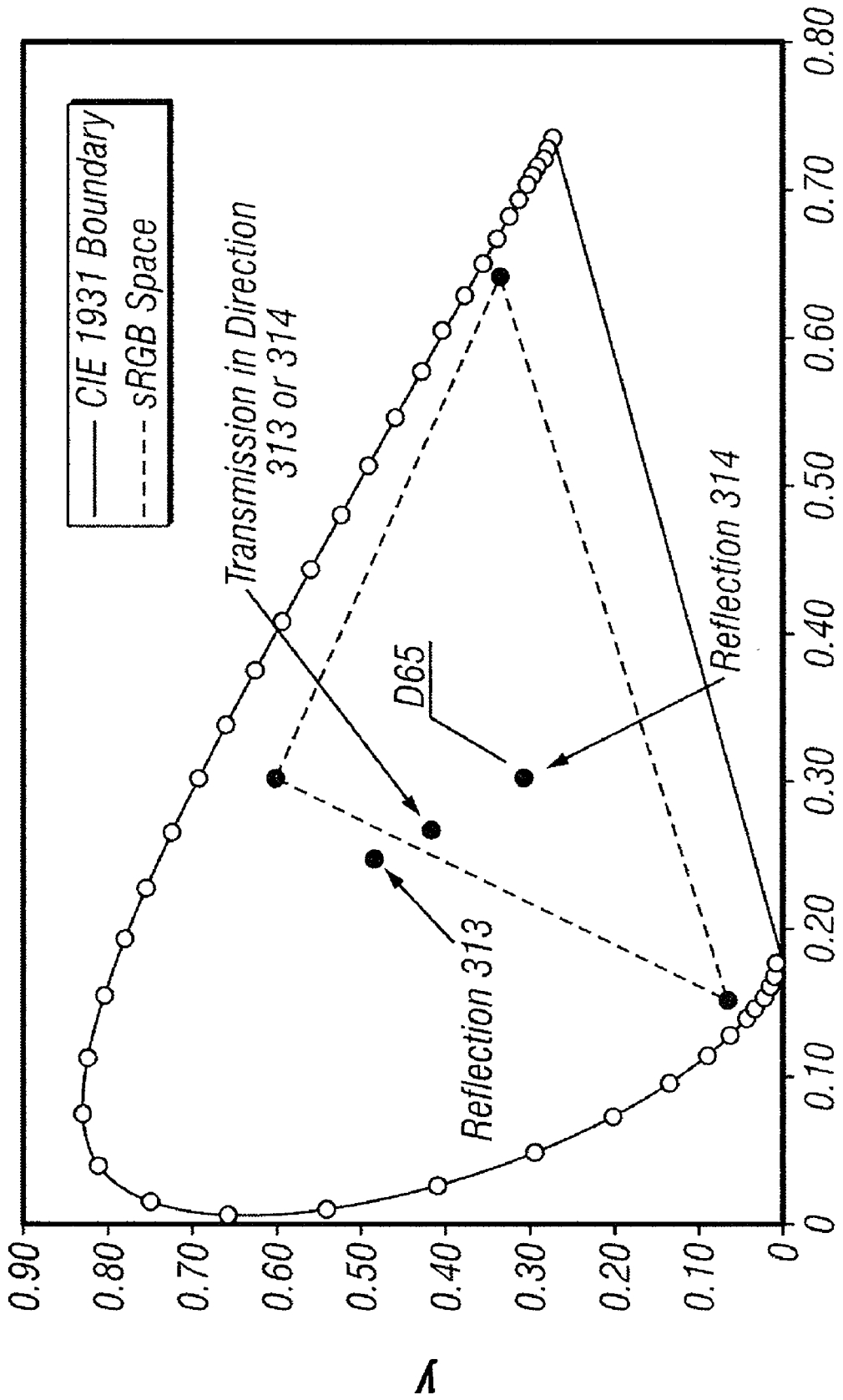

In certain embodiments, the light emitted from the device 100 in the first direction 313 has a first color, and the light emitted from the device 100 in the second direction 314 has a second color. In certain such embodiments, the first color and the second color are substantially the same, while in certain other such embodiments, the first color and the second color are different. In certain embodiments, the light emitted from the device 100 in the first direction 313 has a first color and exhibits a first angular color shift, and the light emitted from the device 100 in the second direction 314 has a second color and exhibits a second angular color shift. In certain such embodiments, the first angular color shift and the second angular color shift are substantially the same, while in certain other such embodiments, the first angular color shift and the second angular color shift are different. In one embodiment, substrate 110 comprises glass of approximately 10 mm thickness, layer 120 comprises Aluminum of 40 Angstroms thickness, layer 130 comprises Aluminum also of 40 Angstroms thickness, and layer 120 and layer 130 are spaced by spacing dielectric layer 150 comprising Silicon Dioxide of 3200 Angstroms thickness to create an interferometric cavity. This symmetrically designed IMOD will tend to exhibit similar reflected colors in direction 313 and 314 (FIGS. 14A-14B). In this example embodiment, layer 120 is positioned against glass and layer 130 is positioned in air (for simplicity, and not by way of limitation, there is no backlight 140 included in this example embodiment). The CIE Chromaticity diagram of FIG. 14B shows that the reflected colors in direction 313 and 314 are similar. In practice, the difference in refractive index between substrate 110 and the air surrounding layer 130 accounts for the slight difference in symmetry. If layer 130 were also positioned against glass, the device reflection would be symmetric. For simplicity, the viewer is assumed to be normal to the device and on side 313 the viewer is assumed to be within substrate 110, so that the substrate 110 to air interface is not included. The transmitted color is substantially the same for ray 306 and 302 in the example embodiment. In another embodiment, the substrate 110 comprises glass of approximately 10 mm thickness with a refractive index of approximately 1.52. Layer 120 comprises Chromium of 70 Angstroms thickness, layer 130 comprises Aluminum of 100 Angstroms thickness, and layer 120 and layer 130 are spaced by spacing dielectric layer 150 comprising Silicon Dioxide of 3400 Angstroms thickness. In this example, the layer 120 is positioned against glass and the layer 130 is positioned in air (for simplicity, and not by way of limitation, no backlight 140 is included in this example embodiment). The CIE Chromaticity diagram of FIG. 14C shows that the reflected colors in direction 313 and direction 314 are different. For simplicity, the viewer is assumed to be normal to the device and on side 313 the viewer is assumed to be within substrate 110, so the substrate 110 to air interface is not included. The transmitted color is substantially the same for ray 306 and 302 in the example embodiment.

In certain embodiments, the device 100 comprises a region 150 located between the first layer 120 and the second layer 130. The region 150 of certain embodiments comprises a dielectric layer and is at least partially optically transparent. In certain embodiments, at least a portion of the region 150 is filled with air. In certain such embodiments, at least one of the first layer 120 and the second layer 130 is selectively movable so as to change a spacing between the first layer 120 and the second layer 130. Thus, in certain embodiments, the first layer 120 and the second layer 130 form an actuable interferometric modulator as described herein. In certain embodiments, the device 100 is an actuatable element (e.g., a pixel or sub-pixel) of a display system. By selectively moving at least one of the first layer 120 and the second layer 130 so as to change a spacing between the first layer 120 and the second layer 130, in certain embodiments, one or more properties of the light emitted in the first direction 313 can be modulated.

In certain embodiments, the at least one of the first layer 120 and the second layer 130 which is selectively movable comprises a support structure which mechanically strengthens the layer. In some embodiments, the support structure comprises a transparent material. In other embodiments, the support structure comprises a non-transparent material (e.g., a metal ring) which is positioned so as to not affect the optical properties of the device.

Figure 15:
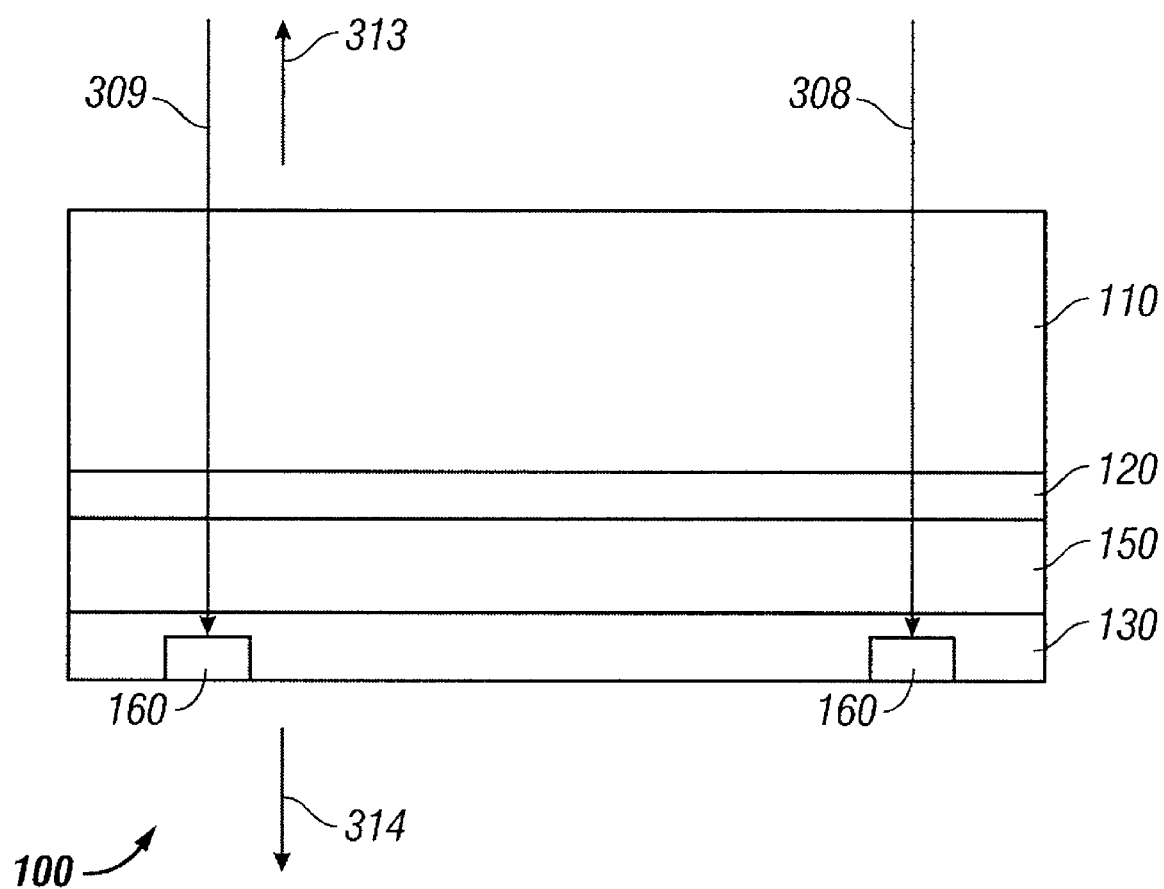
FIG. 15 schematically illustrates an example device comprising a fluorescent material in accordance with certain embodiments described herein.

FIG. 15 schematically illustrates an example device 100 comprising a fluorescent material 160 in accordance with certain embodiments described herein. The device 100 comprises a substrate 110, a first layer 120, and a second layer 130. The substrate is at least partially optically transparent. The first layer 120 is positioned over the substrate 110, and the first layer 120 is partially optically absorptive, partially optically reflective, and partially optically transmissive. The second layer 130 is positioned over the substrate 110 and is spaced from the first layer 120 with the first layer 120 located between the substrate 110 and the second layer 130. The second layer 130 is partially optically absorptive, partially optically reflective, and partially optically transmissive. The fluorescent material 160 is positioned relative to the substrate 110 such that the first layer 120 and at least a portion of the second layer 130 are located between the substrate 110 and the fluorescent material 160. In certain embodiments, the fluorescent material 160 is responsive to ultraviolet light incident on the substrate 110, transmitted through the substrate 110, transmitted through the first layer 130, and transmitted through the at least a portion of the second layer 130 by generating visible light. At least a portion of the visible light from the fluorescent material 160 in certain embodiments is transmitted through the second layer 130, the first layer 120, and the substrate 110 to contribute to the light emitted in the first direction 313. In certain such embodiments, the fluorescent material 160 serves as the light source 140.

Figure 16:
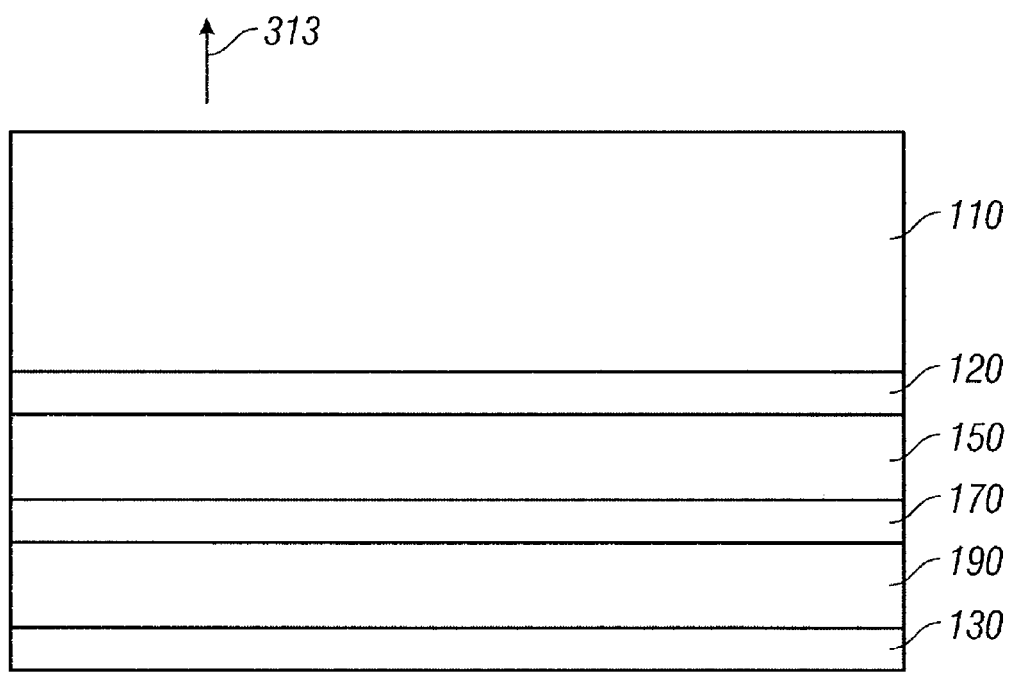
FIG. 16 schematically illustrates an example device comprising a third layer in accordance with certain embodiments described herein.

FIG. 16 schematically illustrates an example device 100 comprising a third layer 170 in accordance with certain embodiments described herein. In certain embodiments, the third layer 170 may comprise various materials such as aluminum, chromium, molybdenum, titanium, carbon, silver, gold, and other materials. The third layer 170 is over the substrate 110 and spaced from the first layer 120 and from the second layer 130. The third layer 170 is partially optically absorptive, partially optically reflective, and partially optically transmissive. In certain embodiments, the third layer 170 has a thickness in a range from between 20 and 300 Angstroms thick. In certain embodiments, the third layer 170 comprises chromium. In certain embodiments, the third layer 170 is substantially optically absorptive. In other embodiments, the third layer 170 is substantially optically reflective. In yet other embodiments, the third layer 170 is substantially optically transmissive.

As shown schematically by FIG. 16, in certain embodiments, the third layer 170 is located between the first layer 120 and the second layer 130. The device 100 of certain embodiments further comprises a region 150 (e.g., an at least partially optically transparent dielectric layer or a region filled with air) located between the third layer 170 and the first layer 120, and a region 190 (e.g., an at least partially optically transparent dielectric layer or a region filled with air) located between the third layer 170 and the second layer 130.

Figure 17:
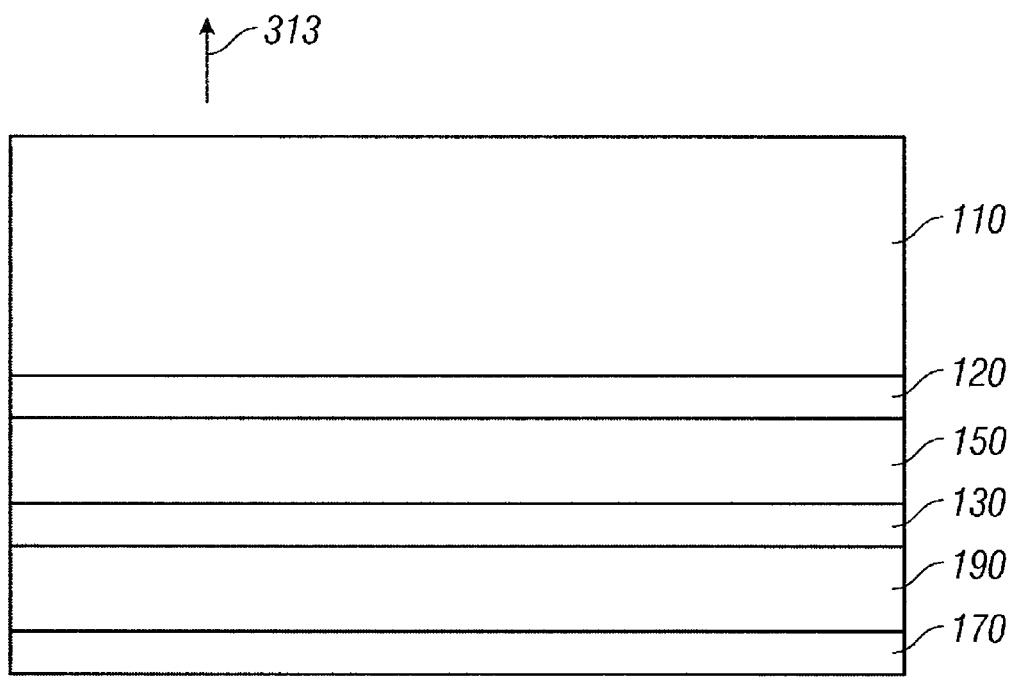
FIG. 17 schematically illustrates another example device comprising a third layer in accordance with certain embodiments described herein.

FIG. 17 schematically illustrates another example device 100 comprising a third layer 170 in accordance with certain embodiments described herein. The third layer 170 is positioned such that the second layer 130 is located between the first layer 120 and the third layer 170. The device 100 of certain embodiments further comprises a region 150 (e.g., an at least partially optically transparent dielectric layer or a region filled with air) located between the first layer 120 and the second layer 130, and a region 190 (e.g., an at least partially optically transparent dielectric layer or a region filled with air) located between the second layer 130 and the third layer 170.

Figure 18A:
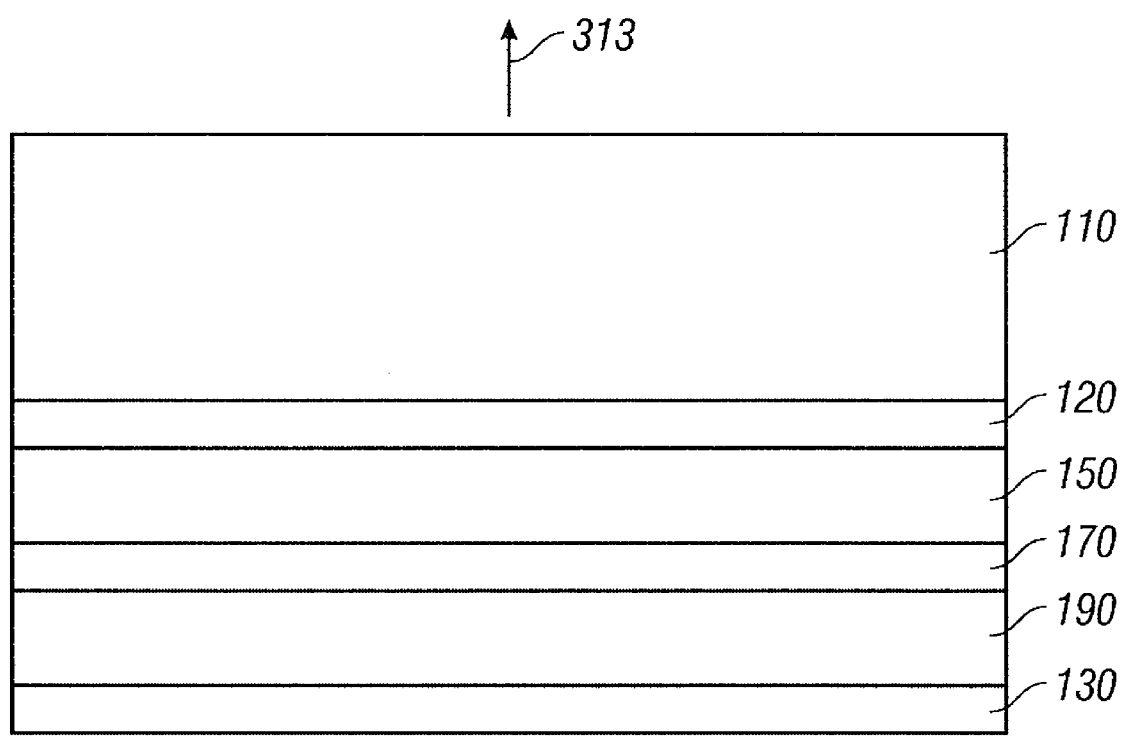
FIG. 18A schematically illustrates an example device in accordance with certain embodiments described herein.
Figure 18B:
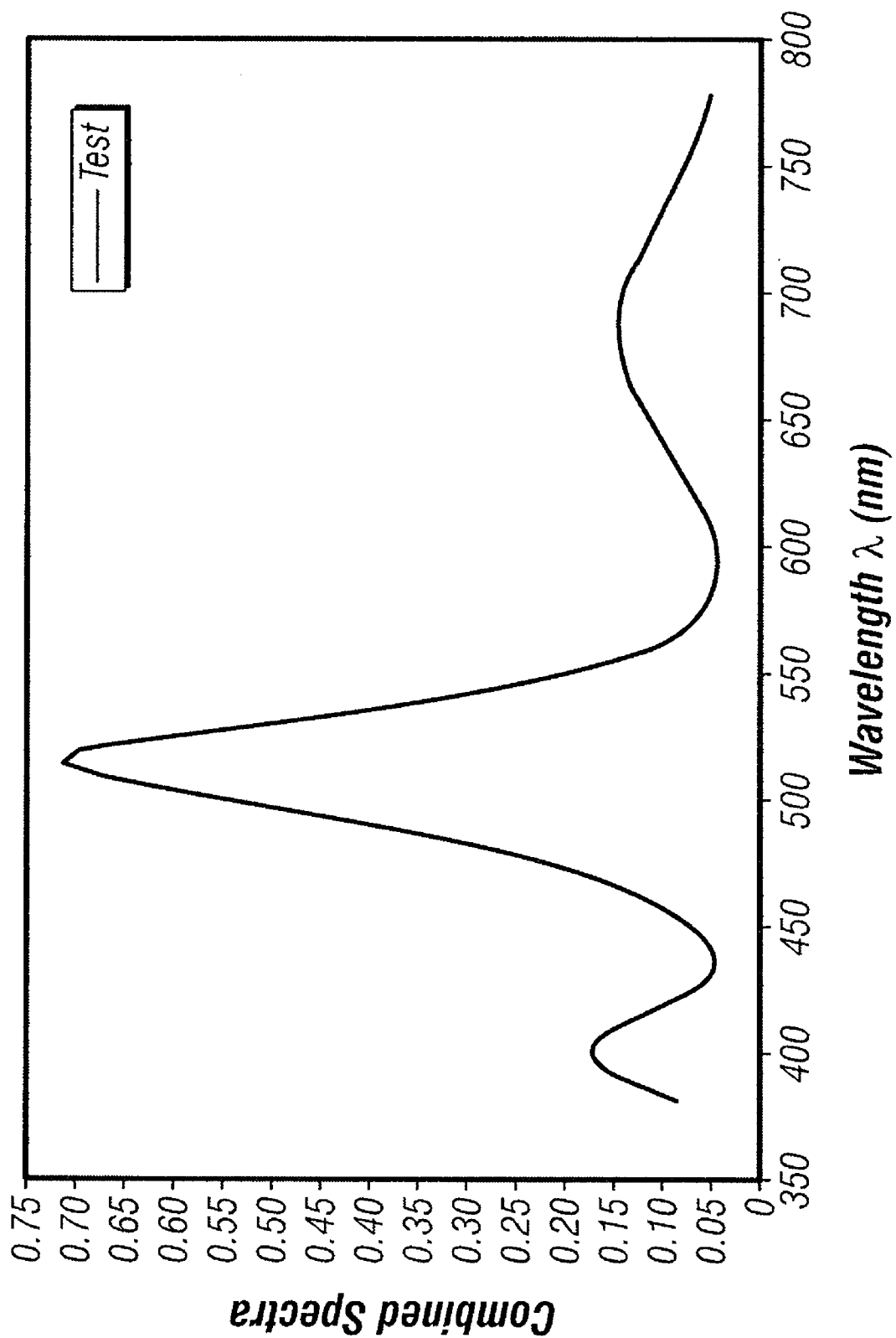
FIG. 18B shows the reflectivity of an example device in accordance with certain embodiments described herein.
Figure 18C:
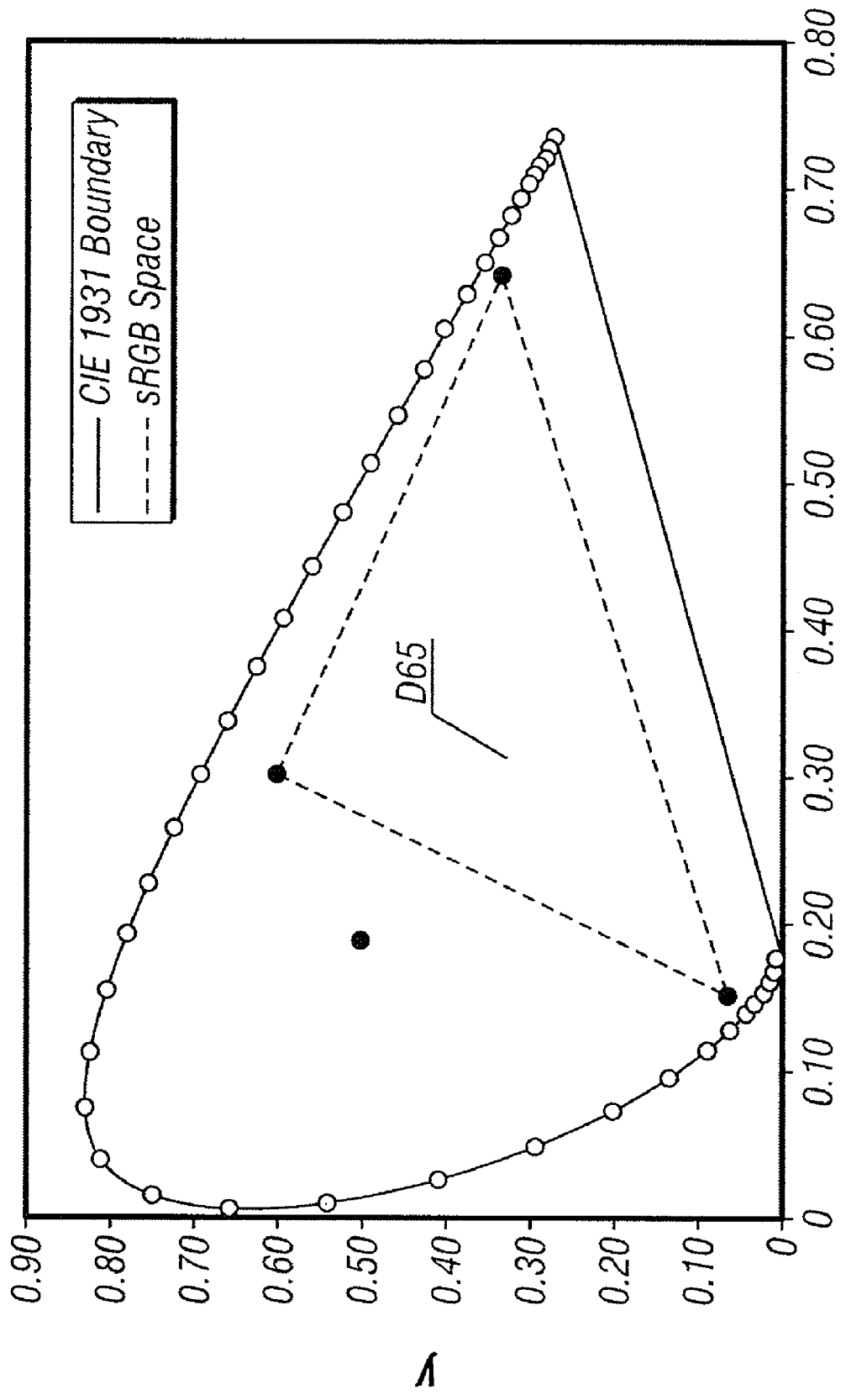
FIG. 18C shows a CIE chromaticity diagram of an example device in accordance with certain embodiments described herein.

The combination of the layers 120, 150, 130, 170, 190 can comprise a dual cavity interferometric modulator in certain embodiments. The additional layers 170, 190 of material as compared to FIG. 8 can provide flexibility in design such that the modulator can be designed to reflect or transmit additional colors. In certain embodiments, the layers 150, 190 can be described as spacer layers and layers 120, 170 can be described absorber layers. In other embodiments, the layer 170 may be an absorber layer and layers 120, 130 may act as partial reflector layers. In some embodiments, the layers 150, 190 have equal thicknesses. In other embodiments, the layers 150, 190 have different thicknesses. In one embodiment, substrate 110 comprises glass of approximately 10 mm thickness with a refractive index of approximately 1.52, the layers 120, 170 comprise Chromium of 70 Angstroms thickness, layer 130 comprises Aluminum of 100 Angstroms thickness, and spacing dielectric layers 150, 190 comprise Silicon Dioxide of 3400 Angstroms thickness (FIG. 18A). FIGS. 18B-18C show the reflected color normal to the substrate in direction 313 (assuming no backlight). Comparing this example to FIGS. 9B and 9C for a viewer standing in air, and including a front surface reflection from substrate 110, the peak wavelength is almost unchanged at 520 nm, but shows a sharper peak and correspondingly more saturated color as shown by the CIE chromaticity diagram of FIG. 9C, for example.

Figure 19:
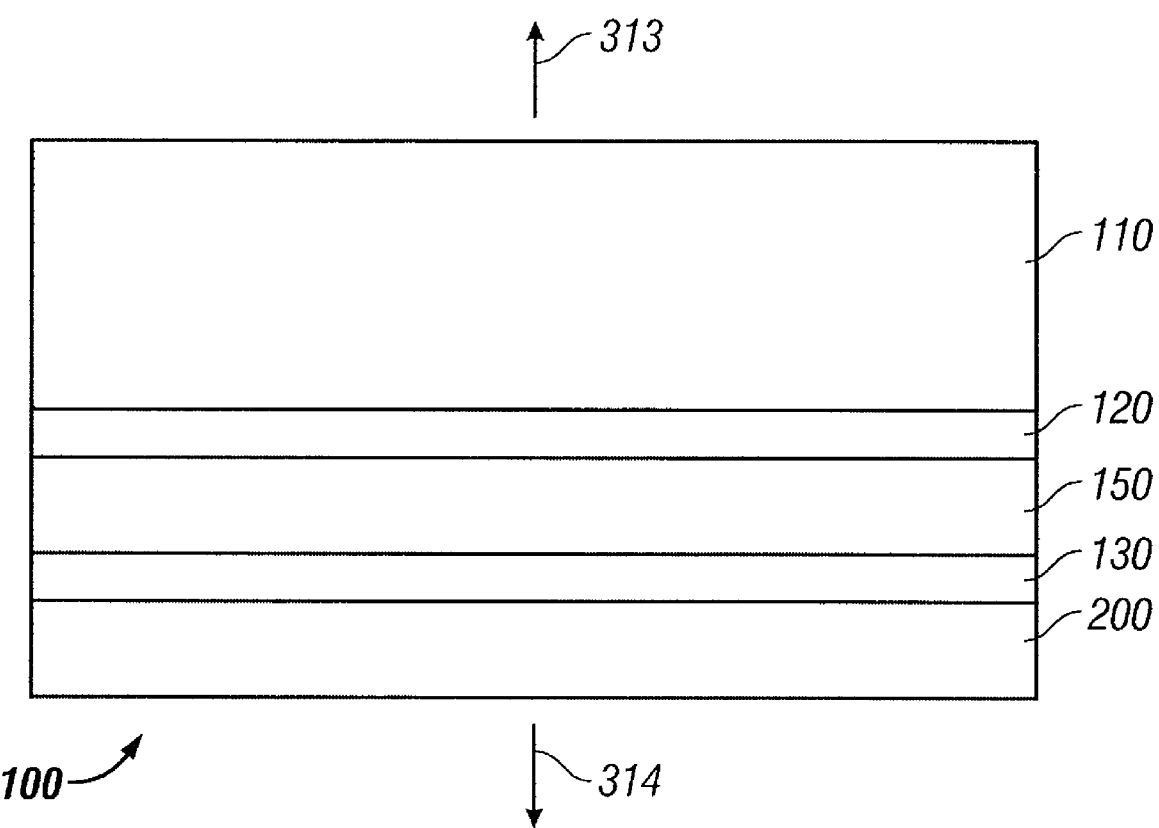
FIG. 19 schematically illustrates an example device comprising a passivation layer in accordance with certain embodiments described herein.

FIG. 19 schematically illustrates an example device 100 comprising a passivation layer 200 in accordance with certain embodiments described herein. The passivation layer 200 is positioned such that the second layer 130 is located between the passivation layer 200 and the substrate 110. In certain embodiments, the passivation layer 200 comprises an at least partially optically transparent dielectric material (e.g., silicon dioxide) and has a thickness in a range between about 300 Angstroms and about 4000 Angstroms. In certain embodiments, the light emitted from the device 100 in the first direction 313 has a color which is dependent on the thickness of the passivation layer 200 (e.g., due to the effect of the passivation layer 200 on the interferometrically reflected light and/or on the light transmitted through the device 100 in the first direction 313). In certain such embodiments, the thickness of the passivation layer 200 is selected to tailor the color of the light emitted from the device 100 in the first direction 313 to be a selected color. For example, the passivation layer 200 can be configured to have a selected thickness within the range described to provide both the desired passivation and the desired tailoring of the color emitted from the device 100 in the first direction 313.

In certain embodiments, the light emitted from the device 100 in the first direction 313 is dependent on an index of refraction of the passivation layer 200. In some embodiments, the index of refraction of the passivation layer 200 is substantially different from the index of refraction of the surrounding medium. In certain embodiments, the passivation layer 200 comprises silicon dioxide. In other embodiments, the passivation layer 200 comprises another type of oxide or a polymer.

Figure 20A:
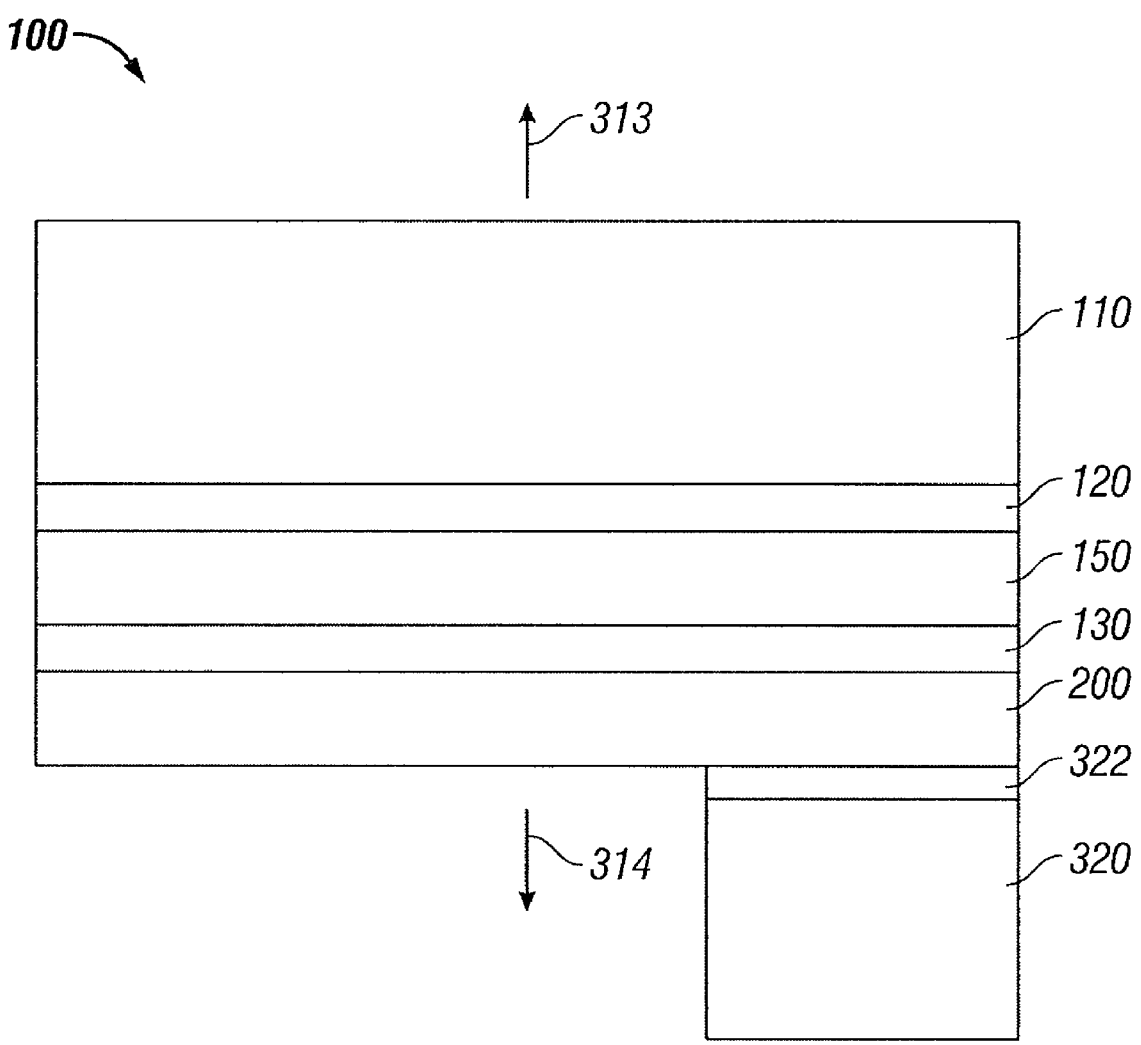
FIG. 20A schematically illustrates an example device in accordance with certain embodiments described herein.
Figure 20B:
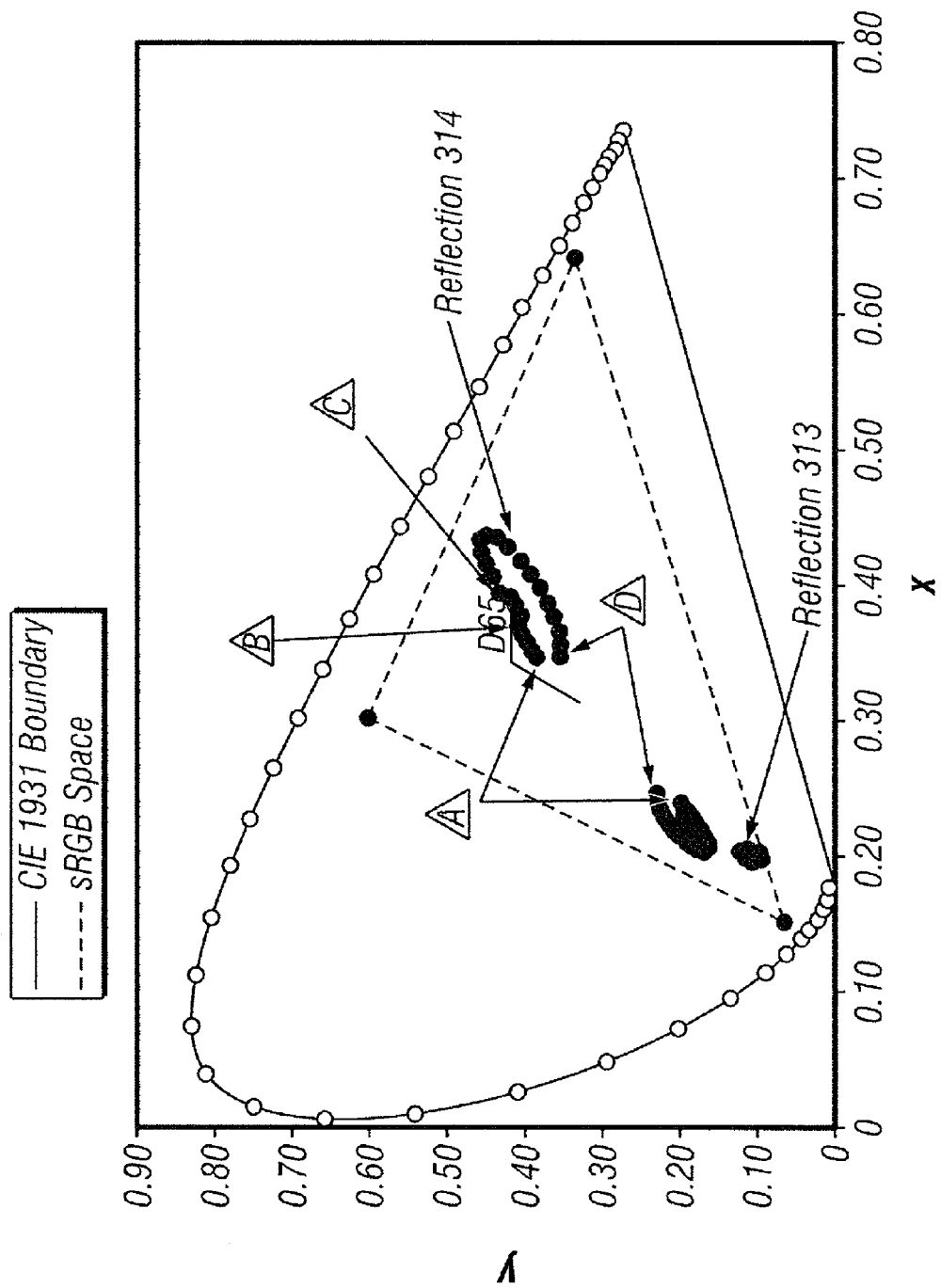
FIG. 20B shows a CIE chromaticity diagram of example devices in accordance with certain embodiments described herein.

In certain embodiments, an additional layer is in contact with the passivation layer 200 such that the passivation layer 200 is positioned between the region 150 and the additional layer. In some embodiments, the color of the light emitted from the device in the first direction 313 and 314 can be tailored by the index of refraction of the additional layer. In certain embodiments, the additional layer comprises an adhesive material such as glue or tape. In some embodiments, the additional layer comprises ink. In one embodiment, for example, as shown by FIG. 20A, the substrate 110 comprises glass of approximately 10 mm thickness with a refractive index of approximately 1.52. An IMOD is constructed on the substrate so that layer 120 comprises Chromium of 70 Angstroms thickness, the layer 130 comprises Aluminum of 60 Angstroms thickness, and the layer 120 and the layer 130 are spaced by spacing dielectric layer 150 comprising Silicon Dioxide of 2700 Angstroms thickness. In the example embodiment, layer 200 comprises Silicon Dioxide. The layer 200 side of the IMOD is bonded to pieces of PET with an adhesive index matched to the PET, with a refractive index of 1.61, so that some areas of the IMOD are bonded and some are not. When viewed from direction 314 and direction 313, the reflected and transmitted color will vary, both between areas bonded with PSA, and those in air, and if the thickness of layer 200 is varied. FIG. 20B shows this effect for embodiments where the air is adjacent to the layer 200 and where the layer 200 is varied from 1200 Angstroms to 2700 Angstroms (labels A and D). FIG. 20B also shows this effect for an embodiment where the layer 200 is bonded to material having a refractive index of 1.61 and where the layer 200 is varied from 1200 Angstroms to 2700 Angstroms (labels B and C). FIG. 20B assumes that the viewer is normal to the device 100. In the example embodiment, and as shown by FIG. 20B, the "color tuning" effect seen from direction 314 is relatively large. A "color tuning" effect is also seen from direction 313 and in the transmitted color. As shown, there is a narrower range of variation of color with variation of the layer 200 from 1200 Angstroms to 2700 Angstroms with the layer 200 adjacent to the PSA. The portion of FIG. 20B identified by the label "Reflection 313" represents the total range of variation of color from direction 313 with variation of the layer 200 from 1200 Angstroms to 2700 Angstroms and for a change from air to a PSA interface.

Figure 21:
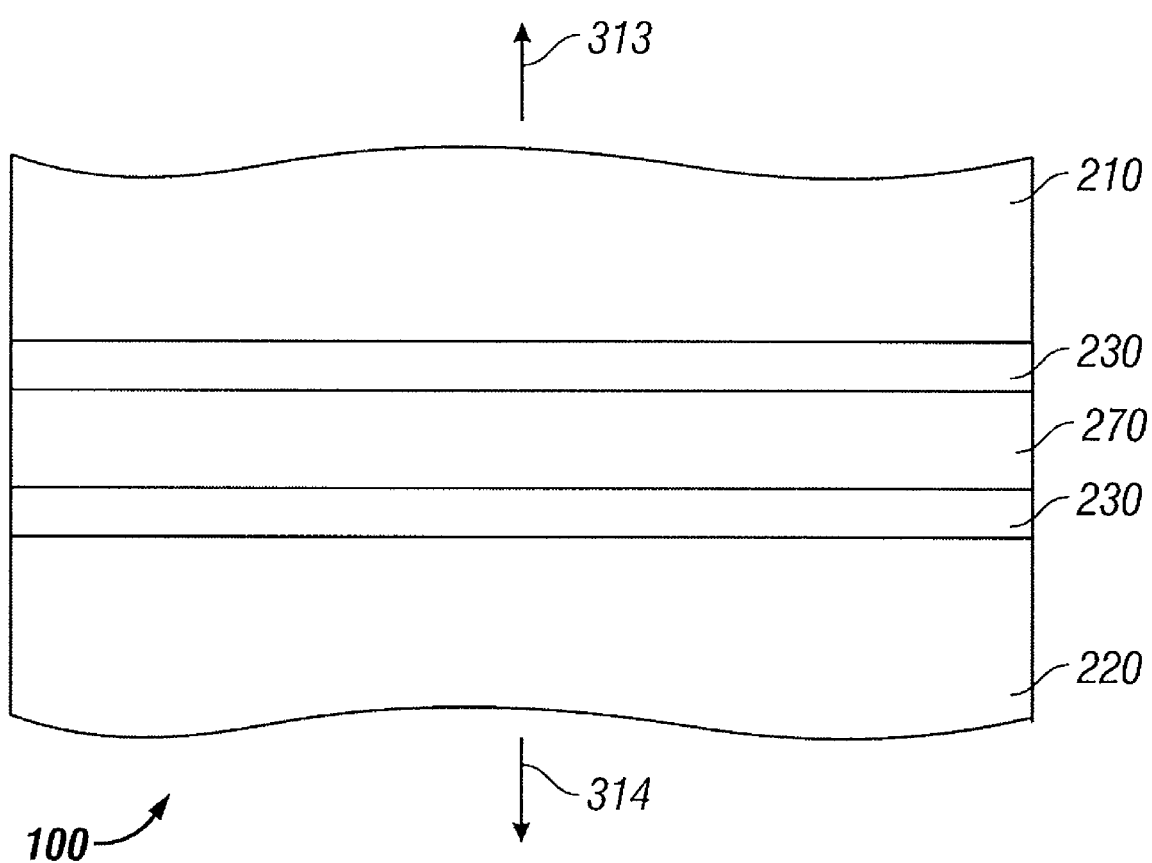
FIG. 21 schematically illustrates an example device comprising a first glass layer and a second glass layer in accordance with certain embodiments described herein.

FIG. 21 schematically illustrates an example device 100 comprising a first glass layer 210 and a second glass layer 220 in accordance with certain embodiments described herein. The structure 270 comprises the substrate 110, the first layer 120, and the second layer 130 and spacer layer 150. The structure 270 comprising the substrate 110, the first layer 120, and the second layer 130 and spacer layer 150 is laminated and located between the first glass layer 210 and the second glass layer 220. In certain embodiments, one or more adhesive layers 230 are used to laminate the structure comprising the substrate 110, the first layer 120, and the second layer 130 with the first glass layer 210 and the second glass layer 220. In certain embodiments, at least one of the first glass layer 210 and the second glass layer 220 comprises textured glass. The substrate 110, the first layer 120, the second layer 130, and the spacer layer 150 comprise an IMOD, which may be designed to exhibit specific colors in directions 313, 314 and 302, 306. As an interferometric device it can exhibit on axis colors that color shift as the viewer changes angle relative to the structure. A textured laminate can be designed with either specific or random angular features on the surface so that light emerging toward a viewer through planar areas of the substrate will emerge at a different angle relative to the IMOD compared to light emerging through a textured feature. Therefore the viewer will see different colors across the textured surface. Examples of textured laminates can be found in U.S. patent application Ser. No. 12/220,947, titled "DEVICES AND METHODS FOR ENHANCING COLOR SHIFT OF INTERFEROMETRIC MODULATORS", filed Jul. 29, 2008, which is incorporated in its entirety by reference herein.

Figure 22:
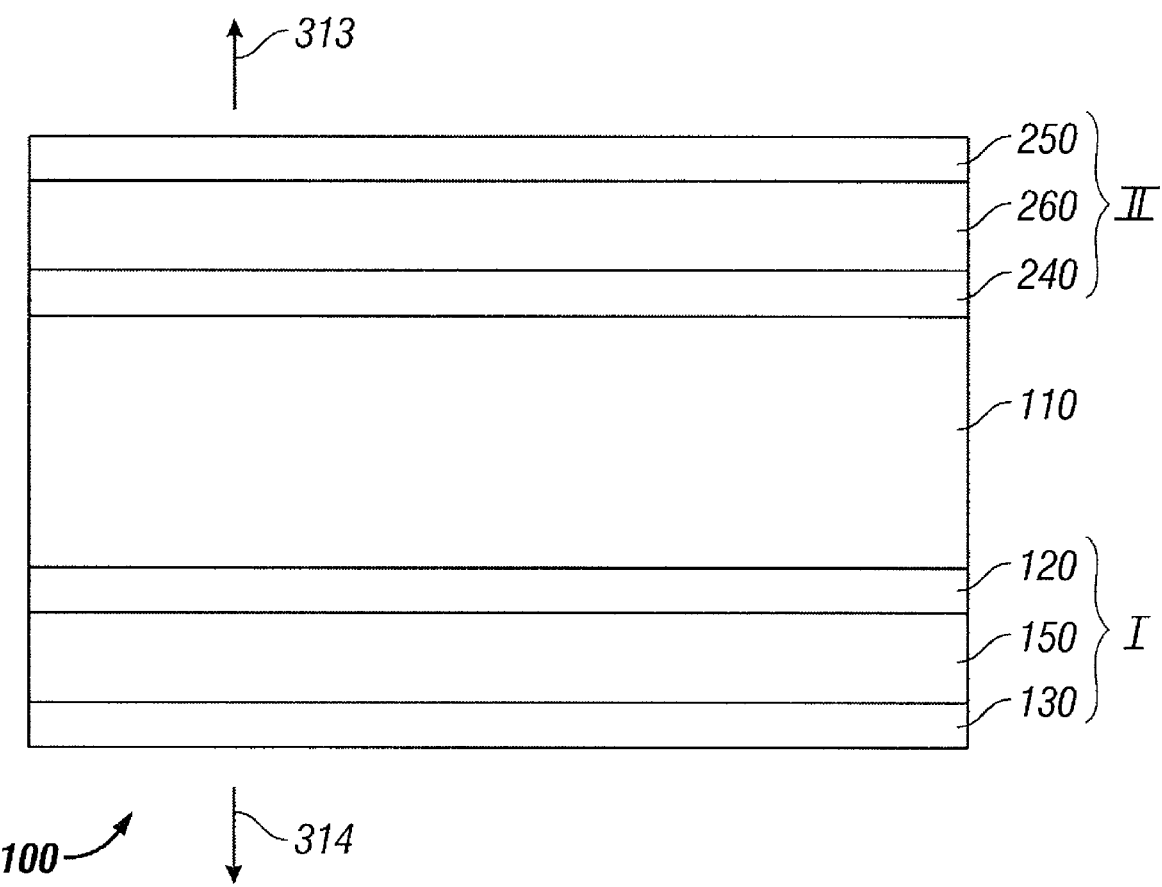
FIG. 22 schematically illustrates an example device having a first layer, a second layer, a third layer, and a fourth layer in accordance with certain embodiments described herein.

FIG. 22 schematically illustrates an example device 100 having a first layer 120, a second layer 130, a third layer 240, and a fourth layer 250 in accordance with certain embodiments described herein. The first layer 120 and the second layer 130 are over a first surface of the substrate 110. The third layer 240 and the fourth layer 250 are over a second surface of the substrate 110. The third layer 240 is partially optically absorptive, partially optically transmissive, and partially optically reflective. The fourth layer 250 is spaced from the third layer 240, with the third layer 240 located between the substrate 110 and the fourth layer 250. The fourth layer 250 is partially optically absorptive, partially optically transmissive, and partially optically reflective. In certain embodiments, the device 100 further comprises a light source 140 positioned relative to the substrate 110 such that the first layer 120 and the second layer 130 are located between the substrate 110 and the light source 140.

Figure 23:
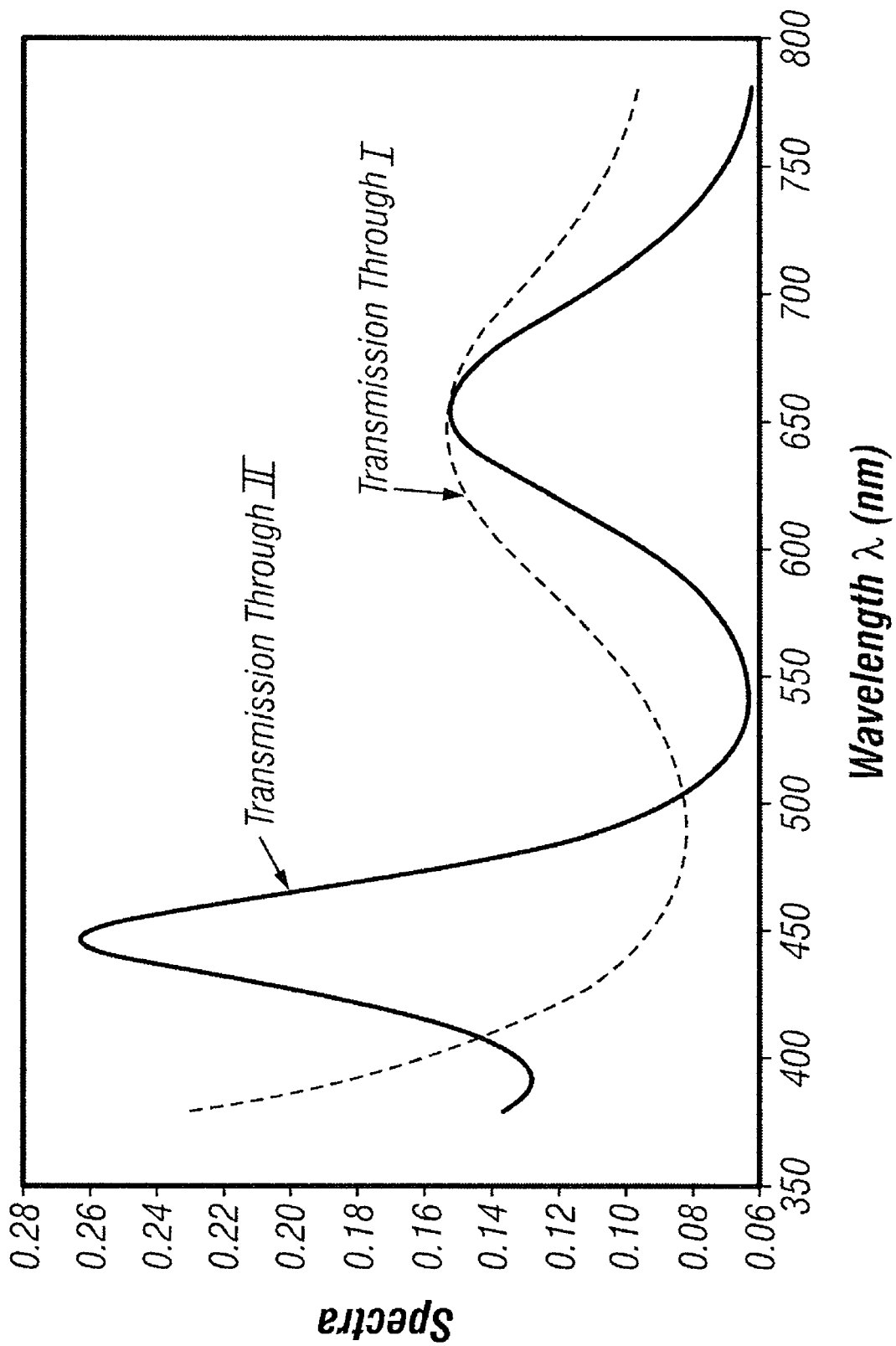
FIG. 23 shows the transmittance of an example device in accordance with certain embodiments described herein.

As schematically illustrated by FIG. 22, in certain embodiments, the device 100 further comprises a spacer 260 (e.g., an at least partially optically transparent dielectric layer or a region filled with air) located between the third layer 240 and the fourth layer 250. In certain embodiments, one or both of the spacer 150 located between the first layer 120 and the second layer 130 and the spacer 260 located between the third layer 240 and the fourth layer 250 comprises a region filled with air. The structure comprising layers 120, 150, 130 and the structure comprising layers 260, 250, 240 may each be described as individual IMODs in certain embodiments. The structure comprising layers 120, 150, 130 will be described herein as IMOD I and the structure comprising layers 260, 250, 240 will be described herein as IMOD II. These descriptions are for the purposes of illustration and are not limiting. In one embodiment, for example, substrate 110 comprises of glass of approximately 10 mm thickness with a refractive index of approximately 1.52, the layer 120 comprises Chromium of 70 Angstroms thickness, the layer 130 comprises Aluminum of 40 to 100 Angstroms thickness, and the layer 120 and the layer 130 are spaced by spacing dielectric layer 150 comprising Silicon Dioxide of 1000 to 5000 Angstroms thickness. As has been described herein, the spacer 150 can be selected to provide a specific transmitted and reflected color, with the layer 120 (e.g., absorber layer) and the layer 130 (e.g., reflector layer) selected to provide the desired brightness and color saturation. Layers 250, 240 and spacer 260 may be selected in a similar way. Each of IMODs I and II are independent but, depending on the level of transmission, the IMODs can interact so the viewer will see colors that are a combination of the two. In one embodiment, for example, layer 120 comprises Chromium of 70 Angstroms thickness, the layer 130 comprises Aluminum of 60 Angstroms thickness, and the layer 120 and the layer 130 are spaced by a spacing dielectric layer 150 comprising Silicon Dioxide of 2000 Angstroms thickness. In the example embodiment, the layer 240 comprises Chromium of 70 Angstroms thickness, the layer 250 comprises Aluminum of 60 Angstroms thickness, and the layer 240 and the layer 250 are spaced by spacing dielectric layer 260 comprising Silicon Dioxide of 4250 Angstroms thickness. The resulting on axis transmission plots for IMODs I and II are shown in FIG. 23 (front reflections are excluded in FIG. 23). IMOD I has a first order red transmission response, IMOD II is magenta, but the effect of overlaying them as described will be for IMOD II to act as a filter for the red IMOD I, increasing its color saturation.

In certain embodiments, a plurality of devices, including one or more devices 100, can be arranged in a manner generally similar to the embodiments described above with respect to, for example, FIGS. 1-5. In certain embodiments, the plurality of devices can have different interferometric and/or transmissive performance. For example, a plurality of devices can be arranged in a row/column array. Contrast among these different devices can be used to generate a viewable image. For example, in certain embodiments, multiple devices can be formed from a patterned layered structure over the substrate 110. A first device 100, for example, can comprise a first layer 120 and a second layer 130 as described herein, and can be the source of both interferometrically reflected light and light transmitted through the first device 100. A second device can comprise a first layer that is partially optically absorptive, partially optically transmissive, and partially optically reflective (e.g., a chromium layer) and a second layer spaced from the first layer such that the second layer is located between the substrate 110 and the first layer. The second layer can be at least partially optically reflective and substantially optically non-transmissive. In certain such embodiments, the first layer and the second layer are portions of an interferometric modulator as described herein.

In certain embodiments, the first device 100 exhibits a first color which is the result of a first portion 300 of light, a second portion 301 of light, and a third portion 302 of light being emitted in a first direction 313 from the device 100 as described herein. In certain embodiments, the first portion 300 of light and the second portion 301 of light interfere to produce light having a first color, and the third portion 302 of light has a second color different from the first color.

In certain embodiments, the second device exhibits a second color which is the result of a fourth portion of light incident on the substrate 110, transmitted through the substrate 110, transmitted through the first layer of the second device, reflected by the second layer of the second device, transmitted through the first layer of the second device, transmitted through the substrate 110, and emitted from the device in the first direction 313, and a fifth portion of light incident on the substrate 110, transmitted through the substrate 110, reflected by the first layer of the second device, transmitted through the substrate 110, and emitted from the second device in the first direction 313. The fourth portion of light and the fifth portion of light interfere to produce light having the second color. In certain embodiments, the second color is different from the first color.

In certain embodiments, the plurality of devices further comprises an anti-reflection coating on a surface of the substrate 110 such that the substrate 110 is located between the anti-reflective coating and the first layer 120 of the first device 100 and the first layer of the second device. In certain embodiments, the first layer 120 of the first device 100 is contiguous with the first layer of the second device (e.g., the first layer 120 of the first device 100 and the first layer of the second device can be portions of a common layer). For example, an Chromium layer can have one or more portions that have a thickness less than 1000 Angstroms serving as the first layer 120 of the first device 100, and also serving as the first layer of the second device.

In certain embodiments, the plurality of devices further comprises a third device which is substantially transmissive to light incident on the third device. In certain such embodiments, the first device 100 exhibits a first color, the second device exhibits a second color different from the first color, and the third device exhibits a third color different from both the first color and the second color. Contrast among the first, second, and third devices can be used to generate a viewable image.

Figure 24A:
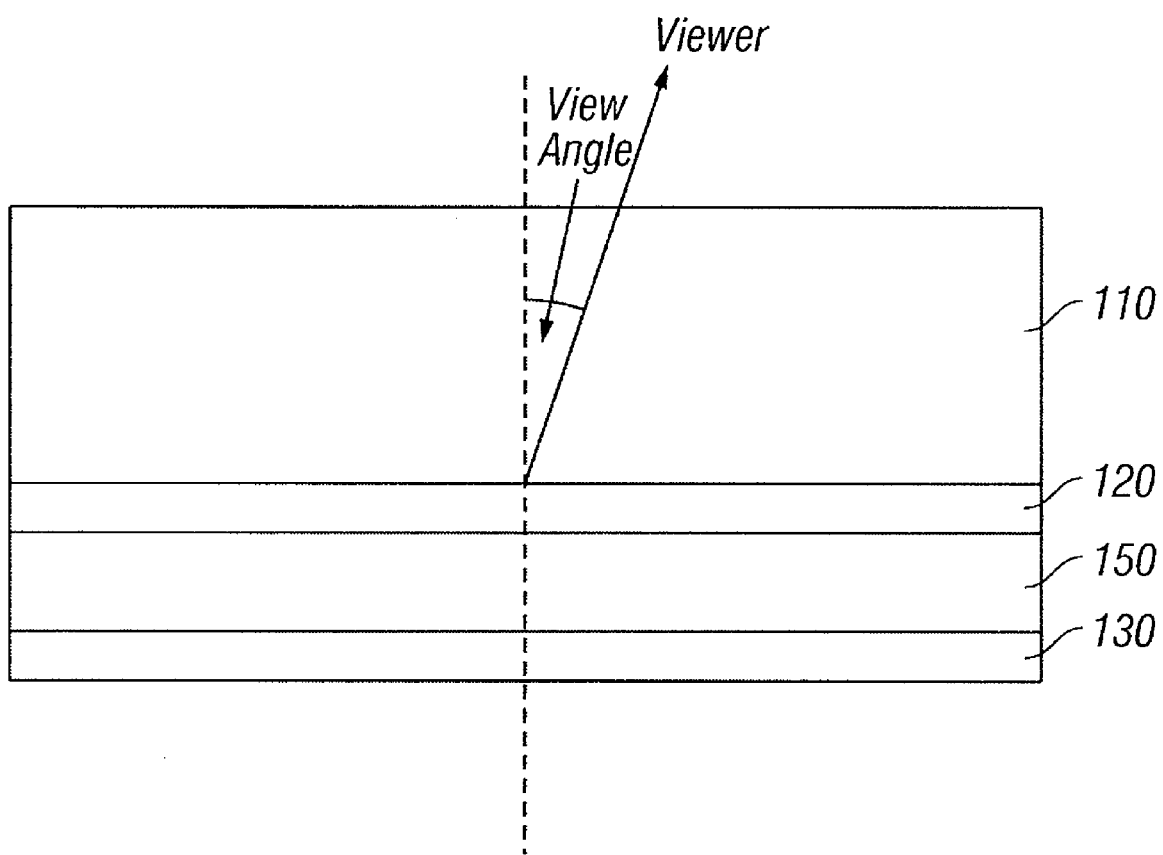
FIG. 24A schematically illustrates an example device in accordance with certain embodiments described herein.
Figure 24B:
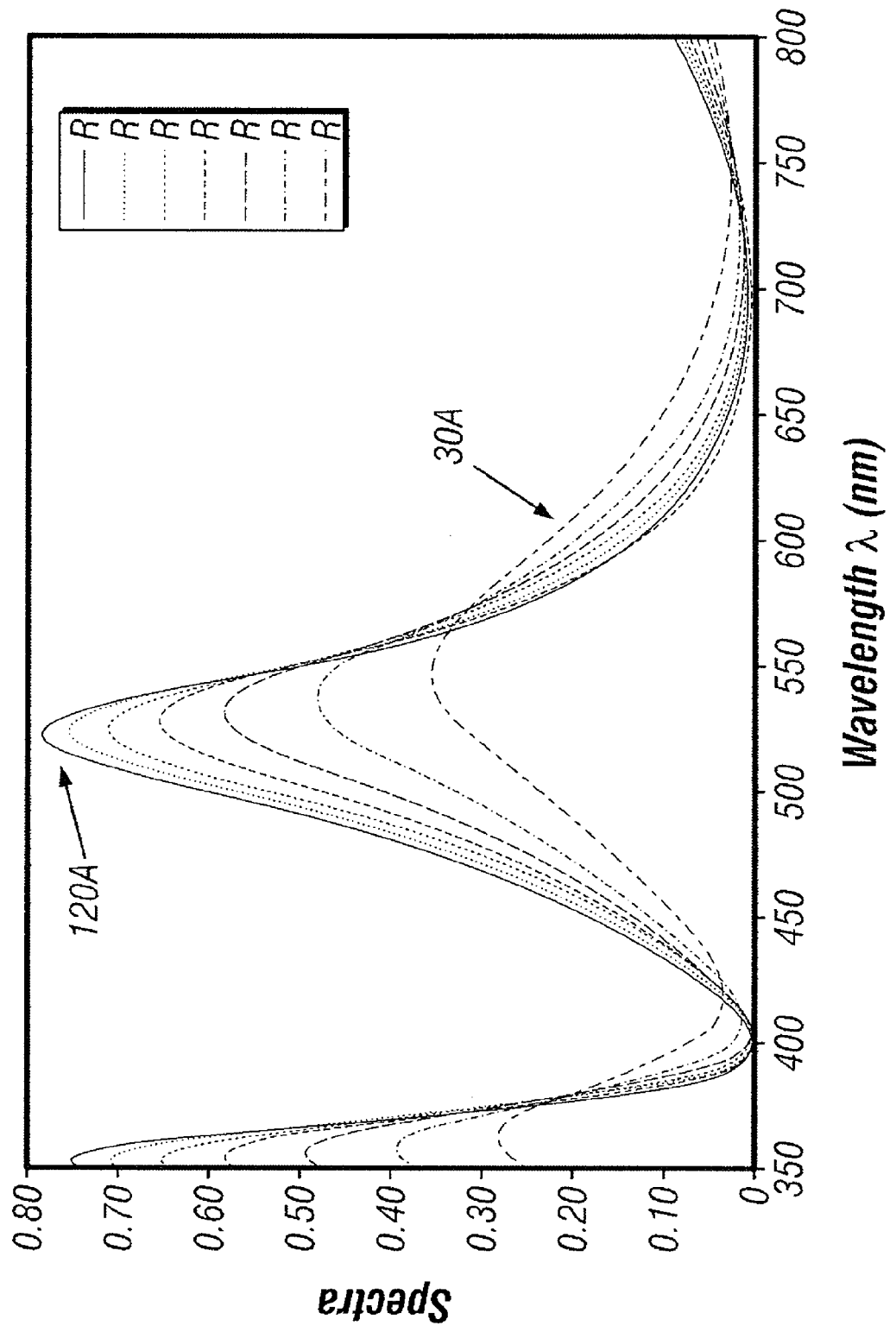
FIG. 24B shows the reflectivity of example devices in accordance with certain embodiments described herein.
Figure 24C:
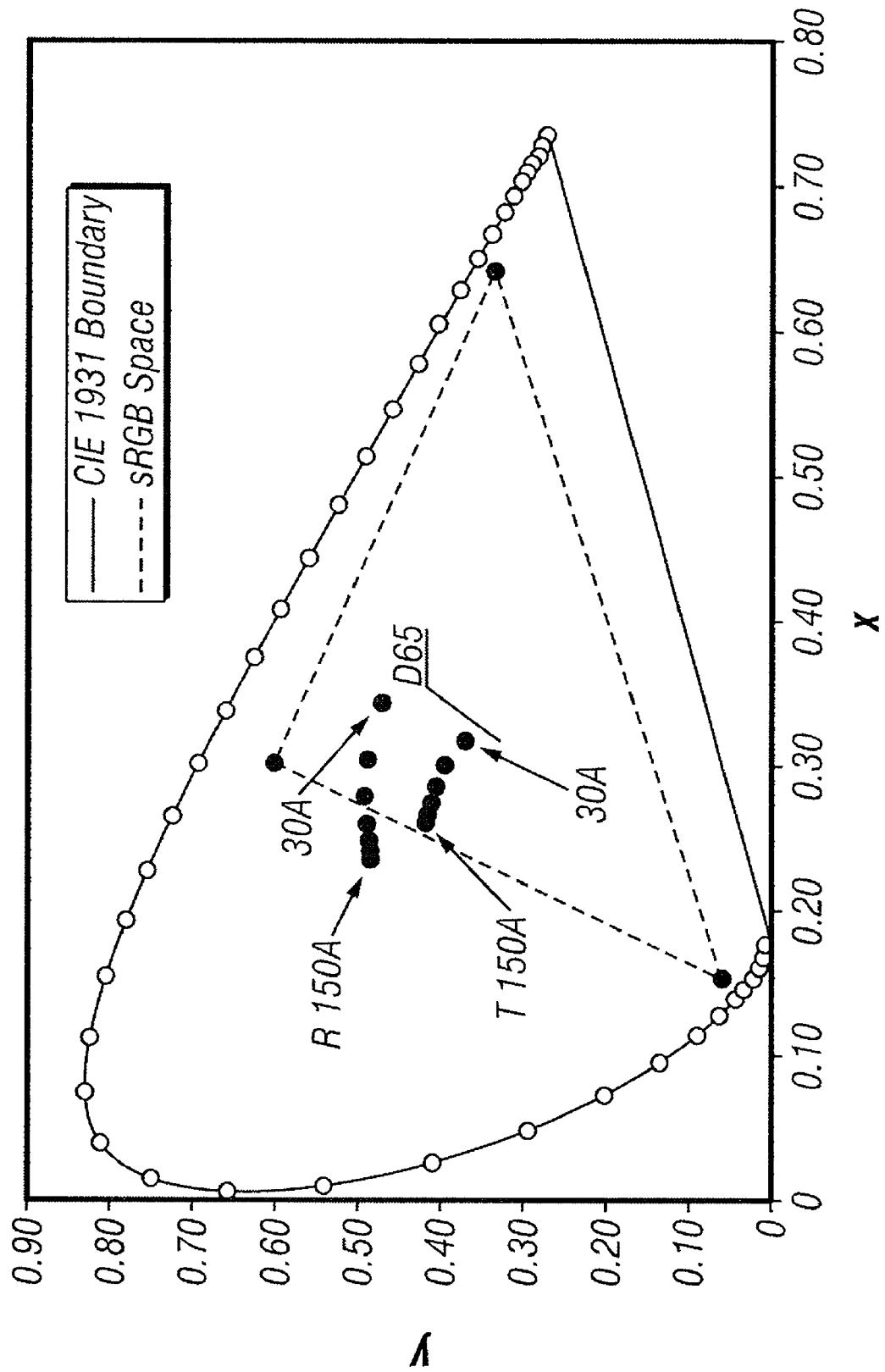
FIG. 24C shows a CIE chromaticity diagram of example devices in accordance with certain embodiments described herein.
Figure 24D:
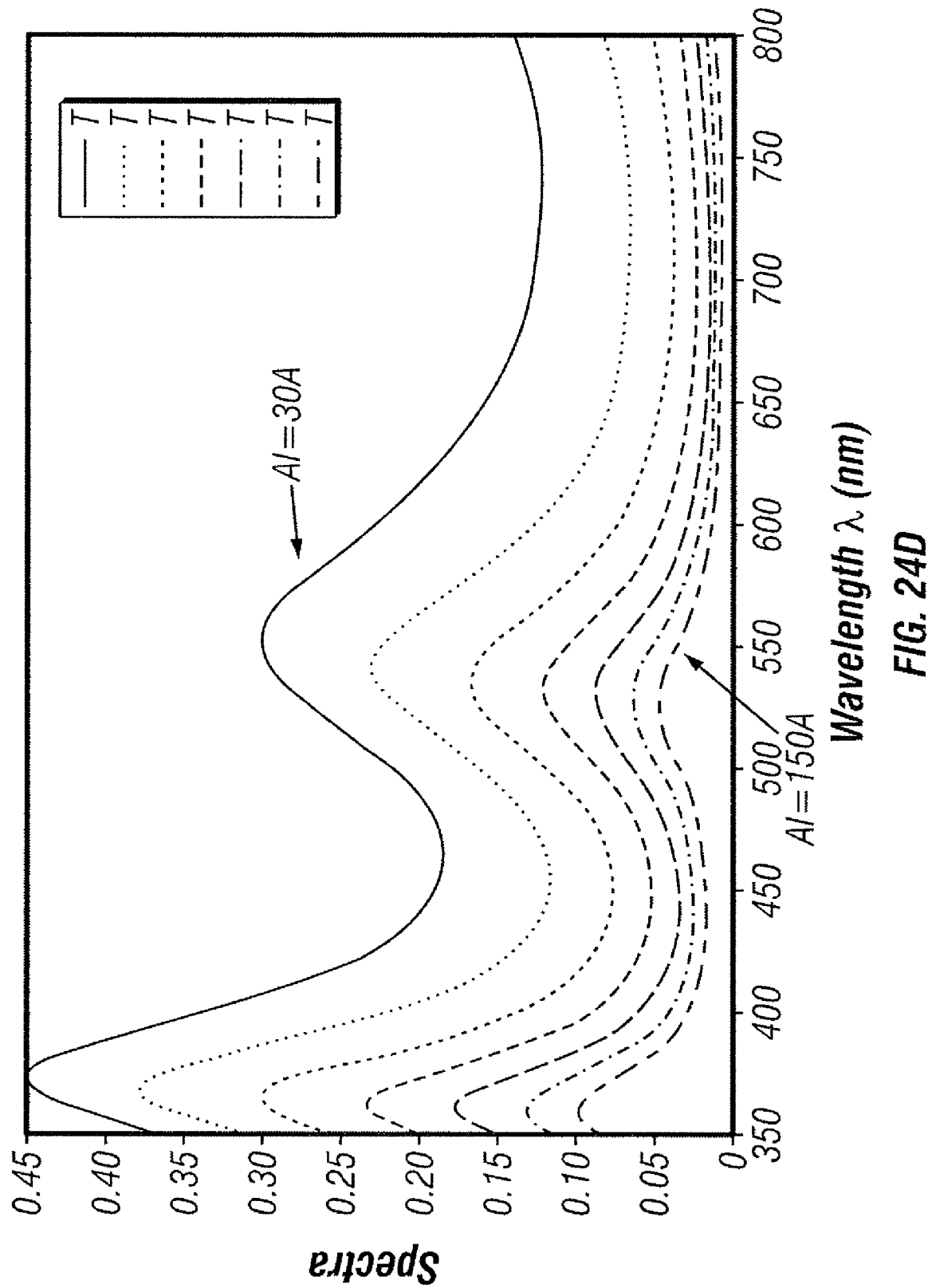
FIG. 24D shows the transmittance of example devices in accordance with certain embodiments described herein.
Figure 24E:
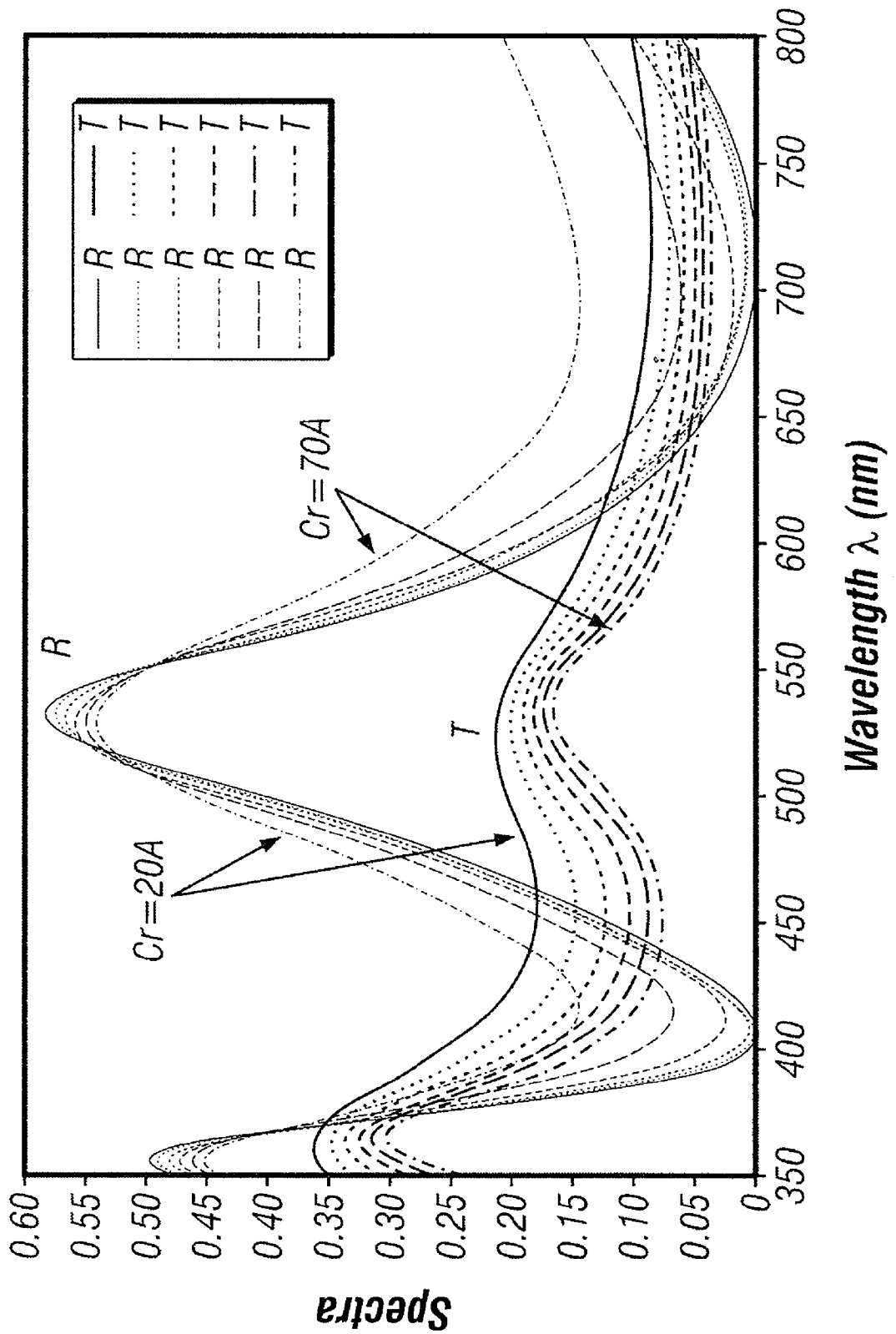
FIG. 24E shows the reflectivity and transmittance of example devices in accordance with certain embodiments described herein.
Figure 24F:
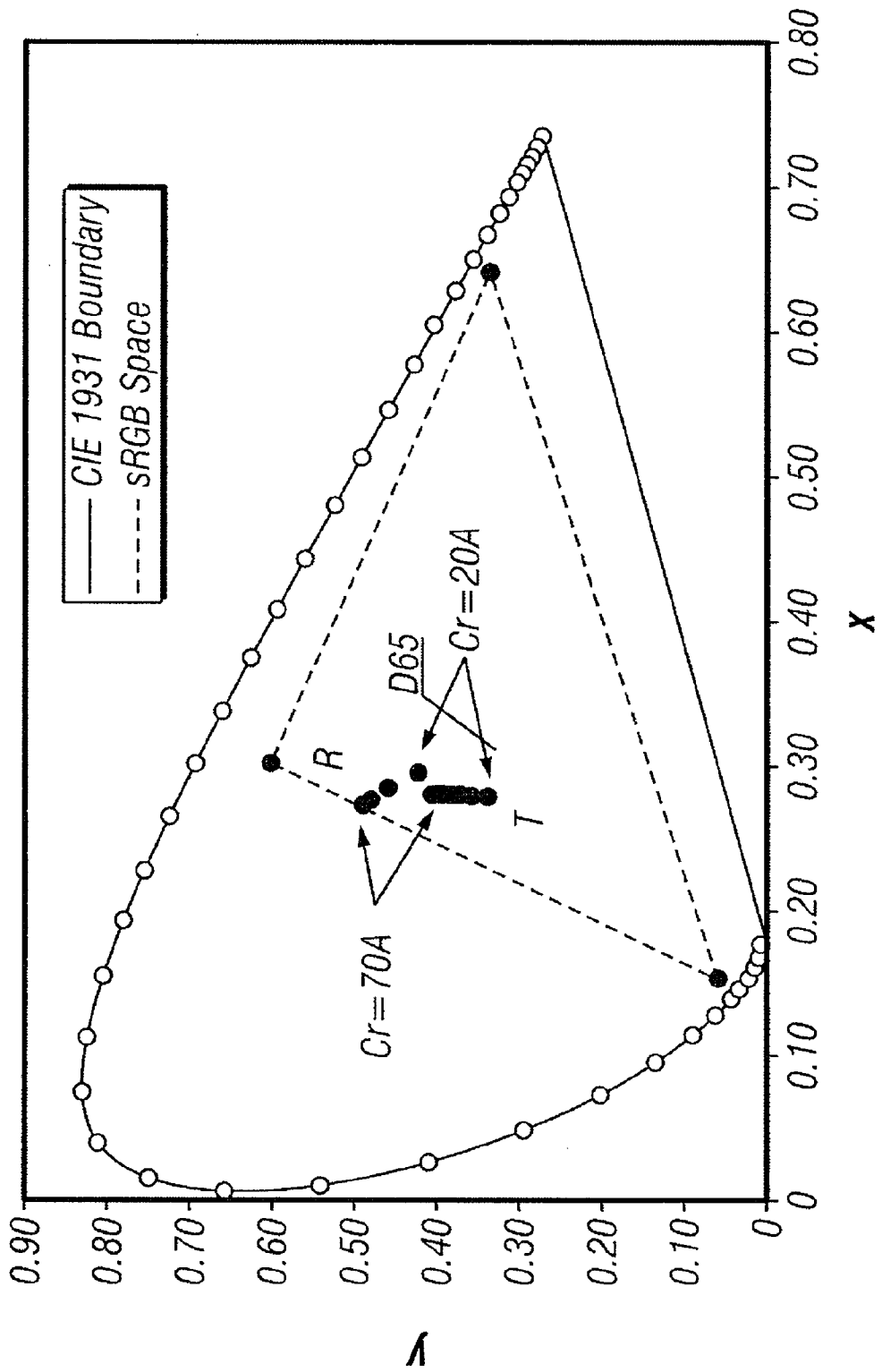
FIG. 24F shows a CIE chromaticity diagram of example devices in accordance with certain embodiments described herein.

The effect of varying reflector and absorber thickness will now be illustrated with reference to certain embodiments of the device 100 of FIG. 24A wherein substrate 110 comprises glass of approximately 10 mm thickness with a refractive index of approximately 1.52, the layer 120 comprises Chromium of 20 to 80 Angstroms thickness, the layer 130 comprises Aluminum of 30 to 150 Angstroms, and the layer 120 and the layer 130 are spaced by spacing dielectric layer 150 comprising Silicon Dioxide of 90 to 450 Angstroms thickness. For simplicity, the view is on axis from within substrate 110 (e.g., ignoring the substrate to air interface). FIGS. 24B-24D illustrate the reflectivity, a CIE chromaticity diagram, and the transmittance, respectively, of example embodiments of the device 100 of FIG. 24A wherein the layer 120 comprises Chromium of 70 Angstroms thickness, the spacer layer 150 comprises Silicon Dioxide of 3400 Angstroms thickness, and the reflector layer 130 comprises Aluminum and is varied from between 30 and 150 Angstroms thickness. As illustrated by FIGS. 24B-24D, the effect is relatively larger on the reflectivity and transmittance and there is relatively less effect on the color saturation. FIGS. 24E-24F show the reflectivity/transmittance and a CIE chromaticity diagram, respectively, of embodiments of the device 100 of FIG. 24A where the reflector layer 130 comprises Aluminum 60 Angstroms thick, the spacer layer 150 comprises Silicon Dioxide 3400 Angstroms thick, and the absorber layer 120 comprises Chromium and is varied from 20 Angstroms to 70 Angstroms thickness. The effect on the color is different than the embodiment illustrated with respect to FIGS. 24B-24D and there is a relatively greater impact on color saturation.

Figure 25A:
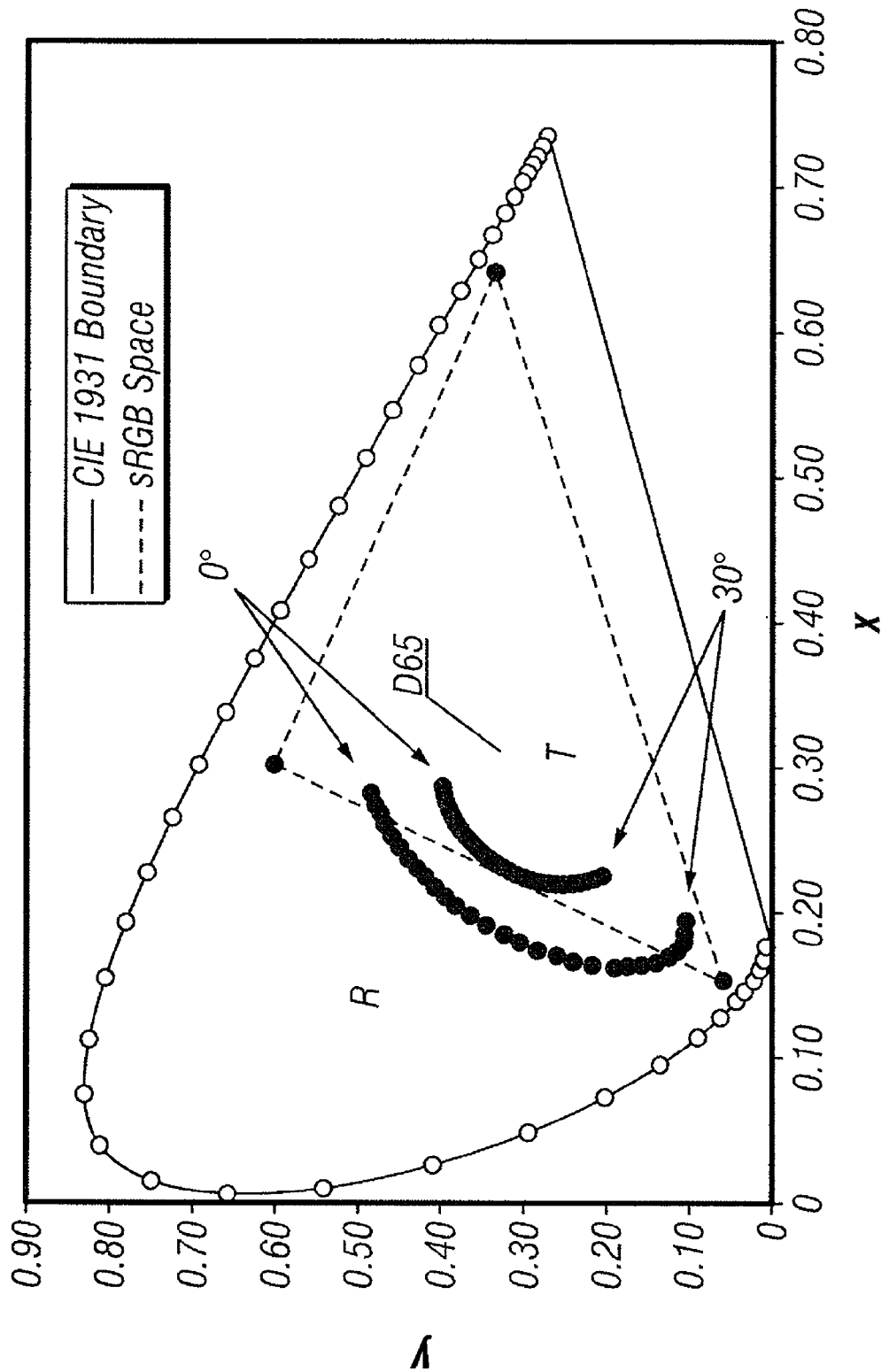
FIGS. 25A-D show CIE chromaticity diagrams of example devices for different viewing angles in accordance with certain embodiments described herein.

One aspect of an IMOD device is angular color shift. FIG. 25A shows a CIE chromaticity diagram of another embodiment of a device 100 (on glass) where the absorber layer 120 comprises Chromium 70 Angstroms thick, the spacer layer 150 comprises Silicon Dioxide 3400 Angstroms thick, and the reflector layer 130 comprises Aluminum 60 Angstroms thick. The example embodiment exhibits a second order color with peak reflectivity of 535 nm on axis in direction 313. View angle (from within substrate 110, for simplicity and not by way of limitation) is varied from 0 to 30 degrees in the example embodiment.

Figure 25B:
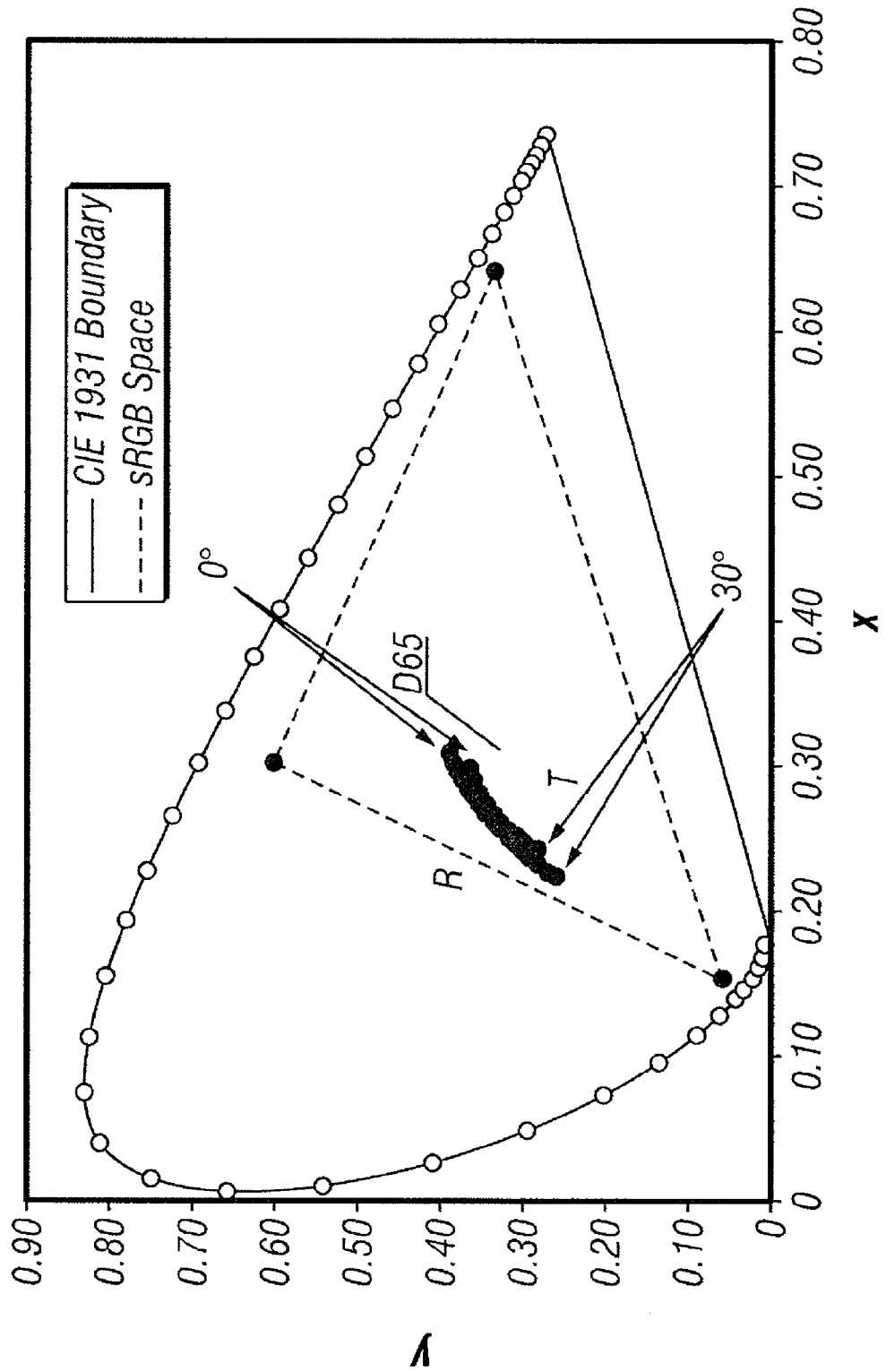
Figure 25C:
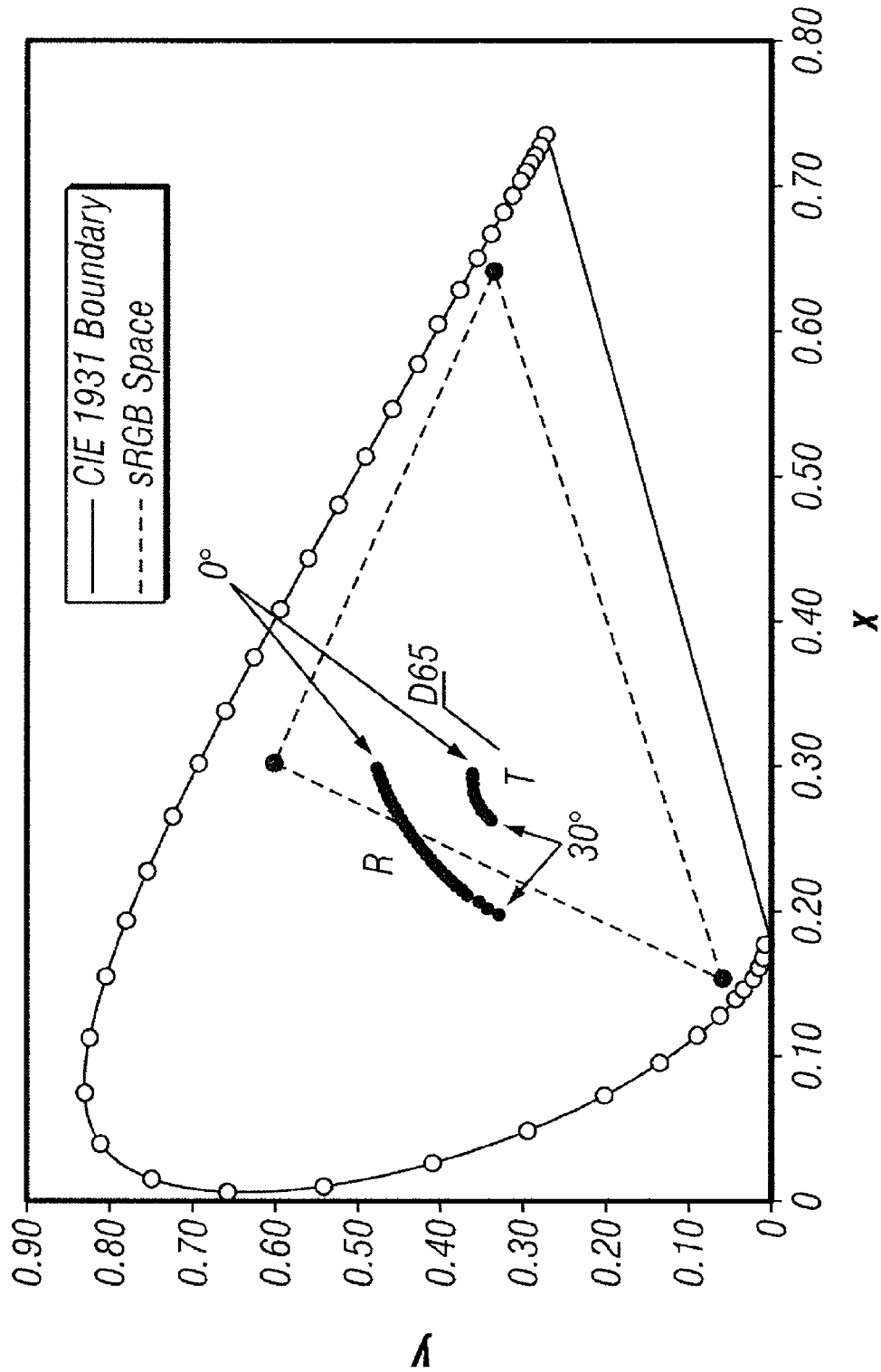
Figure 25D:
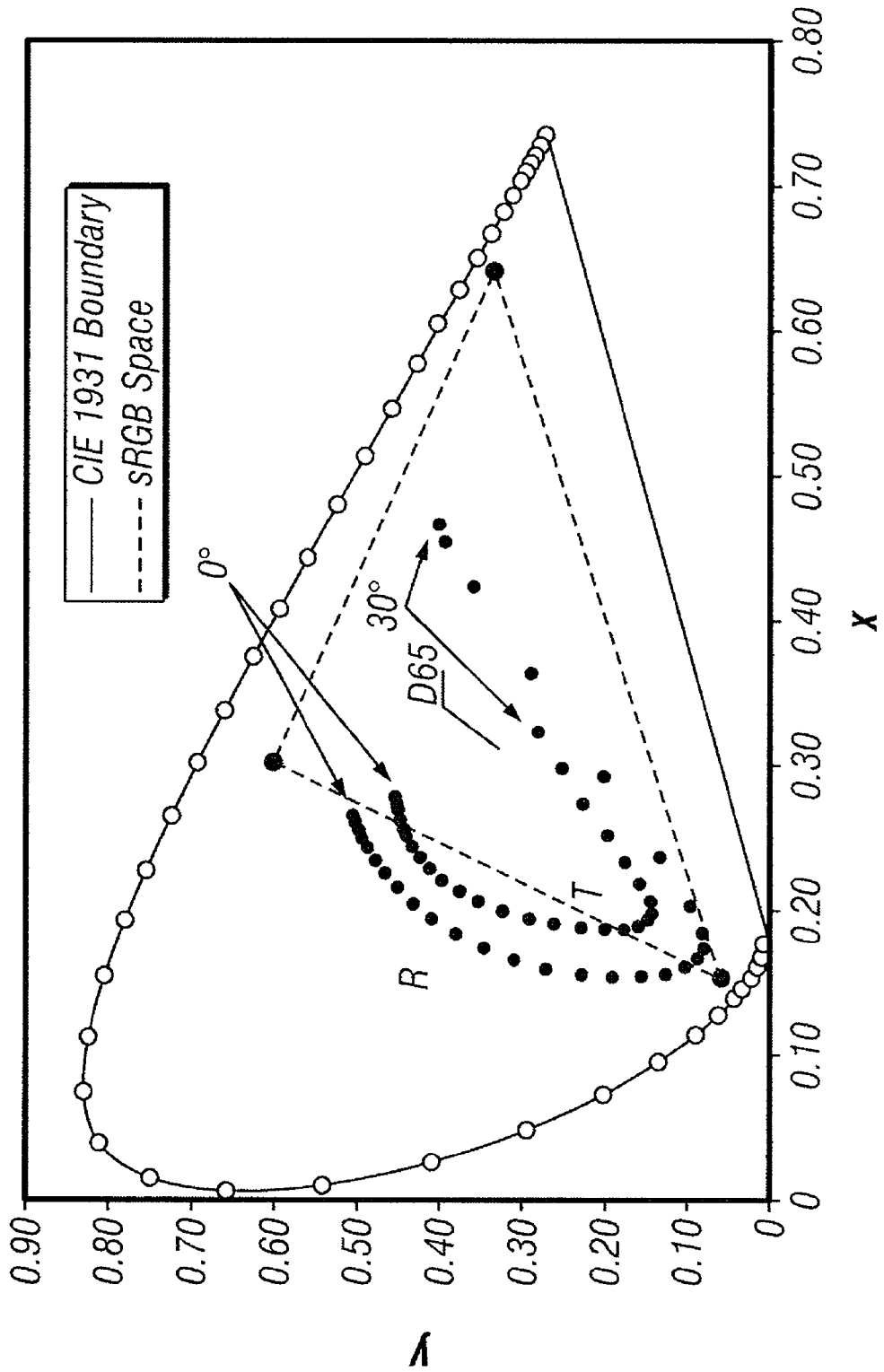

FIG. 25B shows a CIE chromaticity diagram of another example embodiment wherein the absorber layer 120 and the reflector layer 130 comprise the same materials having the same thicknesses as the embodiment described with respect to FIG. 25A but where the spacer layer 150 is 1580 Angstroms thick. The embodiment illustrated with respect to FIG. 25B has a green reflection peaking at 535 nm, similar to the embodiment illustrated with respect to FIG. 25A, but as a first order color response, it exhibits less angular color shift. FIGS. 25C-25D illustrate example embodiments of the device 100 wherein the absorber layer 120 and the reflector layer 130 comprise the same materials having the same thicknesses as the embodiments described with respect to FIGS. 25A-B, but where the spacer layer 150 comprises Zinc Oxide (which has higher refractive index than Silicon Dioxide) and air (lower index), respectively. The spacer thickness for the embodiments of FIGS. 25C-25D is adjusted in each case to provide the same peak reflected wavelength (535 nm) on axis. Each figure shows the effect (viewed from within substrate 110 for simplicity, and not by way of limitation) of varying the view angle from 0 to 30 degrees. As illustrated, the embodiments having lower index spacers exhibit more color shift. For example, the higher index spacer layer 150 (e.g., Zinc Oxide) of FIG. 25C has the same peak reflectivity of 535 nm at 0 degrees viewing angle, but exhibits less color shift than the lower index spacer layer 150 (e.g., Silicon Dioxide) of the embodiment of FIG. 25B. This provides another design parameter for a semi transparent IMOD. In certain embodiments, the IMOD may also be combined with texture to accentuate the color shift effect, or diffusive materials which can be used to de-emphasize the color shift effect, depending on the aesthetic desired.

Figure 26:
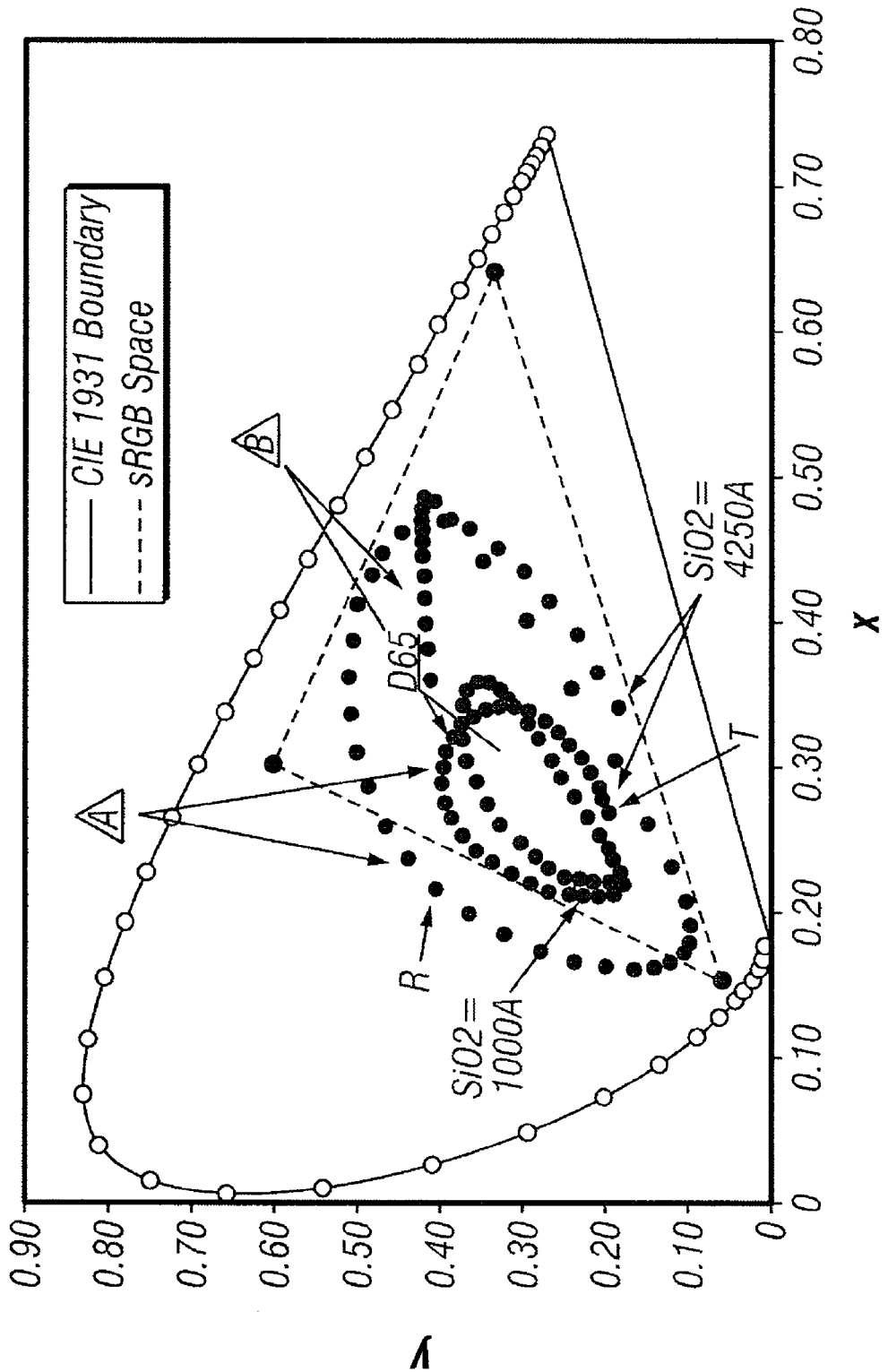
FIG. 26 shows a CIE chromaticity diagram of example devices in accordance with certain embodiments described herein.

FIG. 26 illustrates another embodiment of the device 100 wherein the absorber layer 120 and the reflector layer 130 comprise the same materials having the same thicknesses as the embodiments described with respect to FIGS. 24A-24D, viewed on axis, but wherein the spacer layer 150 is varied from 1000 Angstroms to 4250 Angstroms, through first and second order colors. FIG. 26 shows that as the spacer thickness varies the color will vary over a relatively wide range, and identifies colors that are first order (less saturated) or second order (more saturated). Colors at the extreme end of the range depicted (for example the magentas with spacer layers 150 approximately 4000 Angstroms or more) may also include third order colors, in addition to second order colors.

Although certain embodiments and examples are discussed above, it is understood that the inventive subject matter extends beyond the specifically disclosed embodiments to other alternative embodiments and/or uses of the embodiments and obvious modifications and equivalents thereof. Thus, for example, in any method or process disclosed herein, the acts or operations making up the method/process may be performed in any suitable sequence and are not necessarily limited to any particular disclosed sequence. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A device comprising:
    a substrate that is at least partially optically transparent;
    a first layer over the substrate, wherein the first layer is partially optically absorptive, partially optically reflective, and partially optically transmissive;
    a second layer over the substrate and spaced from the first layer, the first layer located between the substrate and the second layer, wherein the second layer is partially optically absorptive, partially optically reflective, and partially optically transmissive, the second layer having a thickness in the range of 30 to 300 Angstroms; and
    a light source responsive to a signal and positioned relative to the substrate such that the first layer and the second layer are located between the substrate and the light source, wherein light emitted from the device in a first direction comprises
        a first portion of light incident on the substrate, transmitted through the substrate, transmitted through the first layer, reflected by the second layer, transmitted through the first layer, transmitted through the substrate, and emitted from the substrate in the first direction;
        a second portion of light incident on the substrate, transmitted through the substrate, reflected by the first layer, transmitted through the substrate, and emitted from the substrate in the first direction; and
        a third portion of light from the light source incident on the second layer, transmitted through the second layer, transmitted through the first layer, transmitted through the substrate, and emitted from the substrate in the first direction; and wherein the light emitted from the device in the first direction has a first color when the light source emits light and a second color when the light source does not emit light, the second color different from the first color.

2. The device of claim 1, wherein the substrate comprises a glass or plastic material.

3. The device of claim 1, wherein the second layer comprises aluminum and has a thickness less than 300 Angstroms.

4. The device of claim 1, further comprising a dielectric layer located between the first layer and the second layer, the dielectric layer at least partially optically transparent.

5. The device of claim 1, wherein at least one of the first layer and the second layer is selectively movable so as to change a spacing between the first layer and the second layer.

6. The device of claim 1, wherein the first portion of light and the second portion of light interfere to produce light having a first color and the third portion of light has a second color different from the first color.

7. The device of claim 1, wherein the first portion of light and the second portion of light interfere to produce light having a first color and the light emitted from the device in the first direction has a second color different from the first color.

8. The device of claim 1, wherein the light emitted by the device has a first color when the light source emits light and ambient light is incident on the device, a second color when the light source emits light and ambient light is not incident on the device, and a third color when the light source does not emit light and ambient light is incident on the device.

9. The device of claim 1, wherein the light source is responsive to the signal by changing from emitting light having a first selected color to emitting light having a second selected color different from the first selected color.

10. The device of claim 1, further comprising a third layer over the substrate and spaced from the first layer and from the second layer, wherein the third layer is partially optically absorptive, partially optically reflective, and partially optically transmissive.

11. The device of claim 10, wherein the third layer is located between the first layer and the second layer.

12. The device of claim 1, further comprising a first glass layer and a second glass layer, wherein the substrate, the first layer, and the second layer comprise a structure laminated and located between the first glass layer and the second glass layer and wherein at least one of the first glass layer and the second glass layer comprises textured glass.

13. The device of claim 1, wherein the first layer has a thickness in the range of 50 to 60 Angstroms.

14. The device of claim 1, wherein the light source is responsive to the signal by changing from emitting light having a first selected brightness to emitting light having a second selected brightness different from the first selected brightness.

15. A device comprising:
a substrate that is at least partially optically transparent;
a first layer over the substrate, wherein the first layer is partially optically absorptive, partially optically reflective, and partially optically transmissive;
a second layer over the substrate and spaced from the first layer, the first layer located between the substrate and the second layer, wherein the second layer is partially optically absorptive, partially optically reflective, and partially optically transmissive; and
a light source responsive to a signal and positioned relative to the substrate such that the first layer and the second layer are located between the substrate and the light source, wherein light emitted from the device in a first direction comprises
a first portion of light incident on the substrate, transmitted through the substrate, transmitted through the first layer, reflected by the second layer, transmitted through the first layer, transmitted through the substrate, and emitted from the substrate in the first direction;
a second portion of light incident on the substrate, transmitted through the substrate, reflected by the first layer, transmitted through the substrate, and emitted from the substrate in the first direction; and
a third portion of light from the light source incident on the second layer, transmitted through the second layer, transmitted through the first layer, transmitted through the substrate, and emitted from the substrate in the first direction, wherein the first portion of light and the second portion of light interfere to produce light having a first color and exhibiting a first angular color shift and the third portion of light has a second color and exhibits a second angular color shift different from the first angular color shift.

16. The device of claim 15, wherein the first portion of light and the second portion of light interfere to produce light having a first color and exhibiting a first angular color shift and the light emitted from the device in the first direction has a second color and exhibits a second angular color shift different from the first angular color shift.

17. The device of claim 15, wherein the light emitted from the device in the first direction has a first color and exhibits a first angular color shift when the light source emits light and a second color and second angular color shift when the light source does not emit light, the second angular color shift different from the first angular color shift.

18. The device of claim 15, wherein the light emitted by the device has a first color and exhibits a first angular color shift when the light source emits light and ambient light is incident on the device, a second color and a second angular color shift when the light source emits light and ambient light is not incident on the device, and a third color and a third angular color shift when the light source does not emit light and ambient light is incident on the device.

19. A device comprising:
a substrate that is at least partially optically transparent;
a first layer over the substrate, wherein the first layer is partially optically absorptive, partially optically reflective, and partially optically transmissive;
a second layer over the substrate and spaced from the first layer, the first layer located between the substrate and the second layer, wherein the second layer is partially optically absorptive, partially optically reflective, and partially optically transmissive; and
a light source responsive to a signal and positioned relative to the substrate such that the first layer and the second layer are located between the substrate and the light source, wherein light emitted from the device in a first direction comprises
a first portion of light incident on the substrate, transmitted through the substrate, transmitted through the first layer, reflected by the second layer, transmitted through the first layer, transmitted through the substrate, and emitted from the substrate in the first direction;
a second portion of light incident on the substrate, transmitted through the substrate, reflected by the first layer, transmitted through the substrate, and emitted from the substrate in the first direction; and
a third portion of light from the light source incident on the second layer, transmitted through the second layer, transmitted through the first layer, transmitted through the substrate, and emitted from the substrate in the first direction, and wherein light emitted from the device in a second direction generally opposite to the first direction comprises
a fourth portion of light incident on the substrate, transmitted through the substrate, transmitted through the first layer, transmitted through the second layer, and emitted from the device in the second direction;
a fifth portion of light incident on the second layer, transmitted through the second layer, reflected from the first layer, transmitted through the second layer, and emitted from the device in the second direction; and
a sixth portion of light incident on the second layer, reflected from the second layer, and emitted from the device in the second direction.

20. The device of claim 19, wherein the fifth portion of light comprises light emitted by the light source and the sixth portion of light comprises light emitted by the light source.

21. The device of claim 19, wherein the light emitted from the device in the first direction has a first color, and the light emitted from the device in the second direction has a second color, the second color different from the first color.

22. The device of claim 19, wherein the light emitted from the device in the first direction and the light emitted from the device in the second direction have substantially the same color.

23. A device comprising:
a first means for partially absorbing light, partially reflecting light, and partially transmitting light;
a second means for partially absorbing light, partially reflecting light, and partially transmitting light, the second means spaced from the first means and having a thickness in the range of 30 to 300 Angstroms; and
a means for generating light, wherein light emitted from the device in a first direction comprises
a first portion of light incident on the first means, transmitted through the first means, reflected by the second means, transmitted through the first means, and emitted from the device in the first direction;
a second portion of light incident on the first means, reflected by the first means, and emitted from the device in the first direction; and
a third portion of light generated by the light generation means, incident on the second means, transmitted through the second means, transmitted through the first means, and emitted from the device in the first direction; and wherein the light emitted from the device in the first direction has a first color when the light source emits light and a second color when the light source does not emit light, the second color different from the first color.

24. The device of claim 23, wherein the light generation means comprises a light source responsive to a signal and positioned relative to the substrate such that the first layer and the second layer are located between the substrate and the light source.

25. A method of displaying an image, the method comprising:
providing a device comprising:
a substrate that is at least partially optically transparent;
a first layer over the substrate, wherein the first layer is partially optically absorptive, partially optically transmissive, and partially optically reflective; and
a second layer over the substrate and spaced from the first layer, the first layer located between the substrate and the second layer, wherein the second layer is partially optically absorptive, partially optically transmissive, and partially optically reflective, the second layer having a thickness in the range of 30 to 300 Angstroms;
positioning a light source responsive to a signal relative to the substrate such that the first layer and the second layer are located between the substrate and the light source;
emitting light from the device in a first direction, the emitted light comprising
a first portion of light incident on the substrate, transmitted through the substrate, transmitted through the first layer, reflected by the second layer, transmitted through the first layer, transmitted through the substrate, and emitted from the device in the first direction;
a second portion of light incident on the substrate, transmitted through the substrate, reflected by the first layer, transmitted through the substrate, and emitted from the device in the first direction; and
a third portion of light from the light source incident on the second layer, transmitted through the second layer, transmitted through the first layer, transmitted through the substrate, and emitted from the device in the first direction; and wherein the light emitted from the device in the first direction has a first color when the light source emits light and a second color when the light source does not emit light, the second color different from the first color.

26. The method of claim 25, further comprising selectively moving at least one of the first layer and the second layer so as to change a spacing between the first layer and the second layer.

27. The method of claim 25, further comprising modulating the signal so as to modulate one or more properties of the light emitted in the first direction.

28. A method of displaying an image, the method comprising:
providing a device comprising
a substrate that is at least partially optically transparent;
a first layer over the substrate, wherein the first layer is partially optically absorptive, partially optically transmissive, and partially optically reflective; and
a second layer over the substrate and spaced from the first layer, the first layer located between the substrate and the second layer, wherein the second layer is partially optically absorptive, partially optically transmissive, and partially optically reflective;
positioning a light source responsive to a signal relative to the substrate such that the first layer and the second layer are located between the substrate and the light source;
emitting light from the device in a first direction, the emitted light comprising
a first portion of light incident on the substrate, transmitted through the substrate, transmitted through the first layer, reflected by the second layer, transmitted through the first layer, transmitted through the substrate, and emitted from the device in the first direction;
a second portion of light incident on the substrate, transmitted through the substrate, reflected by the first layer, transmitted through the substrate, and emitted from the device in the first direction; and
a third portion of light from the light source incident on the second layer, transmitted through the second layer, transmitted through the first layer, transmitted through the substrate, and emitted from the device in the first direction; and
emitting light from the device in a second direction generally opposite to the first direction comprising
a fourth portion of light incident on the substrate, transmitted through the substrate, transmitted through the first layer, transmitted through the second layer, and emitted from the device in the second direction;
a fifth portion of light incident on the second layer, transmitted through the second layer, reflected from the first layer, transmitted through the second layer, and emitted from the device in the second direction; and
a sixth portion of light incident on the second layer, reflected from the second layer, and emitted from the device in the second direction.

* * * * *